(12) United States Patent
Smith et al.

(10) Patent No.: US 9,440,688 B2
(45) Date of Patent: Sep. 13, 2016

(54) REAR-MOUNTED RETRACTABLE AERODYNAMIC STRUCTURE FOR CARGO BODIES

(71) Applicant: STEMCO LP, Charlotte, NC (US)

(72) Inventors: Andrew F. Smith, Redwood City, CA (US); Jared A. Niemiec, Belmont, CA (US); Jeffrey J. Grossmann, San Francisco, CA (US); Robert R. Cholnoky, Darien, CT (US); Michael W. Polidori, Hayward, CA (US); Barrie J. Dickinson, San Mateo, CA (US)

(73) Assignee: STEMCO LP, Charlotte, NC (US)

( * ) Notice: Subject to any disclaimer, the term of this patent is extended or adjusted under 35 U.S.C. 154(b) by 0 days.

(21) Appl. No.: 14/571,195

(22) Filed: Dec. 15, 2014

(65) Prior Publication Data

US 2015/0197292 A1    Jul. 16, 2015

Related U.S. Application Data

(63) Continuation of application No. 13/623,466, filed on Sep. 20, 2012, now abandoned.

(60) Provisional application No. 61/537,047, filed on Sep. 20, 2011, provisional application No. 61/577,923, filed on Dec. 20, 2011, provisional application No. 61/600,579, filed on Feb. 17, 2012.

(51) Int. Cl.
    *B62D 35/00*      (2006.01)
(52) U.S. Cl.
    CPC ........... *B62D 35/001* (2013.01); *B62D 35/007* (2013.01)
(58) Field of Classification Search
    CPC ............................. B62D 35/00; B62D 35/001
    USPC .............................. 296/180.1–180.5; 180/903
    See application file for complete search history.

(56) References Cited

U.S. PATENT DOCUMENTS

| 227,401 A | 5/1880 | Charles et al. |
|---|---|---|
| 609,789 A | 8/1898 | George |

(Continued)

FOREIGN PATENT DOCUMENTS

| CA | 2315339 A1 | 2/2001 |
|---|---|---|
| DE | 2911084 A1 | 9/1980 |

(Continued)

OTHER PUBLICATIONS

Notification of Transmittal of the International Search Report and the Written Opinion of the International Searching Authority, or the Declaration relating to PCT Application No. PCT/US06/24642 (Jul. 27, 2007).

(Continued)

*Primary Examiner* — Hilary Gutman
(74) *Attorney, Agent, or Firm* — Perkins Coie LLP

(57) ABSTRACT

An aerodynamic structure attached to the sides and top of a truck cargo body (either a stand-alone trailer or a "straight truck" with the cab and cargo area as a fixed vehicle) at the aftmost region, which rear typically contains a rolling door assembly, which rolls upwardly. An aerodynamic structure is permanently attached to the sides and top of the trailer in a manner that extend past the aftmost plane of the truck cargo body and retract to the aftmost plane of the truck cargo body when subjected to a force, allowing this device to be backed into structures. The retracted orientation allows for the rear of the trailer to be fully accessible for loading and unloading, and does not reduce the size of the opening of the trailer. The various embodiments of the invention allow for automated deployment once the force used to compress the structure is removed.

21 Claims, 40 Drawing Sheets

(56) References Cited

U.S. PATENT DOCUMENTS

| | | |
|---|---|---|
| 797,077 A | 8/1905 | Angus et al. |
| 891,537 A | 6/1908 | Graff |
| 1,352,679 A | 9/1920 | Myers |
| 1,364,053 A | 12/1920 | Quintin |
| 1,390,793 A | 9/1921 | Kyle et al. |
| 1,517,365 A | 12/1924 | Kleine |
| 1,543,877 A | 6/1925 | Saunders |
| 1,584,275 A | 5/1926 | Chalkley |
| 1,714,609 A | 5/1929 | Massey |
| 1,871,390 A | 8/1932 | Reynolds |
| 1,871,396 A | 8/1932 | Stalker |
| 1,875,276 A | 8/1932 | Steigert |
| 1,879,594 A | 9/1932 | Trey |
| 1,912,138 A | 5/1933 | Hoover |
| 1,913,169 A | 6/1933 | Martin |
| 2,037,942 A | 4/1936 | Stalker |
| 2,199,883 A | 5/1940 | Ishiwata |
| 2,208,075 A | 7/1940 | Jabelmann |
| 2,237,141 A | 4/1941 | Gale et al. |
| 2,338,533 A | 1/1944 | Pash et al. |
| 2,344,515 A | 3/1944 | Massey |
| 2,547,528 A | 4/1951 | Lewis |
| 2,569,354 A | 9/1951 | Tracy et al. |
| 2,569,983 A | 10/1951 | Favre |
| 2,737,411 A | 3/1956 | Potter |
| 2,772,624 A | 12/1956 | Carnes |
| 2,780,980 A | 2/1957 | Kennedy |
| 2,887,243 A | 5/1959 | Forrest, Sr. |
| 2,933,344 A | 4/1960 | Shumaker |
| 2,938,680 A | 5/1960 | Greene et al. |
| 2,964,352 A | 12/1960 | Werner |
| 3,010,754 A | 11/1961 | Shumaker |
| 3,016,700 A | 1/1962 | Howald |
| 3,053,351 A | 9/1962 | Fulcher et al. |
| 3,074,079 A | 1/1963 | Isaacson et al. |
| 3,112,135 A | 11/1963 | Conrad et al. |
| 3,178,131 A | 4/1965 | Laing |
| 3,214,215 A | 10/1965 | Hansen |
| 3,276,811 A | 10/1966 | Schmidt |
| 3,342,523 A | 9/1967 | Lutgen |
| 3,346,186 A | 10/1967 | Fulton et al. |
| 3,415,566 A | 12/1968 | Kerrigan |
| 3,425,740 A | 2/1969 | De Vaughn |
| 3,455,594 A | 7/1969 | Hall et al. |
| 3,496,687 A | 2/1970 | Greenberg et al. |
| 3,526,365 A | 9/1970 | Ursery et al. |
| 3,711,146 A | 1/1973 | Madzsar et al. |
| 3,743,343 A | 7/1973 | Grote, Sr. et al. |
| 3,791,468 A | 2/1974 | Bryan, Jr. |
| 3,807,787 A | 4/1974 | Gotz |
| 3,834,752 A | 9/1974 | Cook et al. |
| 3,934,922 A | 1/1976 | MacCready, Jr. et al. |
| 3,941,334 A | 3/1976 | Cole |
| 3,951,445 A | 4/1976 | Tatom |
| 3,960,402 A | 6/1976 | Keck |
| 3,971,586 A | 7/1976 | Saunders |
| 3,977,716 A | 8/1976 | Whited et al. |
| 3,994,451 A | 11/1976 | Cole |
| 3,994,452 A | 11/1976 | Cole et al. |
| 3,999,797 A | 12/1976 | Kirsch et al. |
| 4,006,932 A | 2/1977 | McDonald et al. |
| 4,021,069 A | 5/1977 | Hersh |
| 4,035,013 A | 7/1977 | Abbott, III |
| 4,053,124 A | 10/1977 | Cole et al. |
| 4,113,299 A | 9/1978 | Johnson et al. |
| 4,117,900 A | 10/1978 | Amick et al. |
| 4,126,974 A | 11/1978 | Hardin et al. |
| 4,142,755 A | 3/1979 | Keedy et al. |
| 4,154,149 A | 5/1979 | Holford et al. |
| 4,174,863 A | 11/1979 | Gotz |
| 4,210,354 A | 7/1980 | Canning |
| 4,214,787 A | 7/1980 | Chain |
| 4,236,745 A | 12/1980 | Davis |
| 4,248,103 A | 2/1981 | Halsall et al. |
| 4,257,641 A | 3/1981 | Keedy |
| 4,269,444 A | 5/1981 | Emory |
| 4,316,630 A | 2/1982 | Evans |
| 4,320,920 A | 3/1982 | Goudey |
| 4,349,155 A | 9/1982 | Donguy |
| 4,357,045 A | 11/1982 | Kinford, Jr. |
| 4,375,898 A | 3/1983 | Stephens |
| 4,379,582 A | 4/1983 | Miwa |
| 4,383,407 A | 5/1983 | Inman et al. |
| 4,384,630 A | 5/1983 | Steiner |
| 4,386,801 A | 6/1983 | Chapman et al. |
| 4,421,354 A | 12/1983 | Lemaster |
| 4,433,865 A | 2/1984 | Crompton, Jr. |
| RE31,565 E | 4/1984 | Beaulieu |
| 4,451,074 A | 5/1984 | Scanlon |
| D274,322 S | 6/1984 | Hayes et al. |
| 4,457,550 A | 7/1984 | Gielow et al. |
| 4,458,936 A | 7/1984 | Mulholland |
| 4,458,937 A | 7/1984 | Beckmann et al. |
| 4,462,628 A | 7/1984 | Gregg |
| 4,486,046 A | 12/1984 | Whitney et al. |
| 4,489,889 A | 12/1984 | Inman et al. |
| 4,508,380 A | 4/1985 | Sankrithi |
| 4,518,188 A | 5/1985 | Witten |
| 4,525,123 A | 6/1985 | Curci et al. |
| 4,601,508 A | 7/1986 | Kerian |
| 4,611,847 A | 9/1986 | Sullivan |
| 4,640,541 A | 2/1987 | FitzGerald et al. |
| 4,653,788 A | 3/1987 | Di Giusto |
| 4,678,118 A | 7/1987 | Fukami et al. |
| 4,682,808 A | 7/1987 | Bilanin |
| 4,688,841 A | 8/1987 | Moore |
| 4,702,509 A | 10/1987 | Elliot, Sr. |
| 4,706,910 A | 11/1987 | Walsh et al. |
| 4,722,500 A | 2/1988 | Bray |
| 4,741,569 A | 5/1988 | Sutphen |
| 4,746,160 A | 5/1988 | Wiesemeyer |
| 4,773,692 A | 9/1988 | Schleicher et al. |
| 4,784,429 A | 11/1988 | Hodges et al. |
| 4,810,022 A | 3/1989 | Takagi et al. |
| 4,818,015 A | 4/1989 | Scanlon |
| 4,944,550 A | 7/1990 | Drown et al. |
| 4,951,994 A | 8/1990 | Miwa |
| 4,976,349 A | 12/1990 | Adkins |
| 4,978,162 A | 12/1990 | Labbe |
| 5,000,508 A | 3/1991 | Woods |
| 5,058,945 A | 10/1991 | Elliott, Sr. et al. |
| 5,108,145 A | 4/1992 | Harris |
| 5,156,195 A | 10/1992 | Wehler et al. |
| 5,190,342 A | 3/1993 | Marlowe et al. |
| 5,199,762 A | 4/1993 | Scheele et al. |
| 5,236,347 A | 8/1993 | Andrus |
| 5,237,887 A | 8/1993 | Appleberry et al. |
| 5,240,306 A | 8/1993 | Flemming |
| 5,280,990 A | 1/1994 | Rinard |
| 5,317,880 A | 6/1994 | Spears |
| 5,332,280 A | 7/1994 | DuPont et al. |
| 5,348,366 A | 9/1994 | Baker et al. |
| 5,375,903 A | 12/1994 | Lechner |
| 5,498,059 A | 3/1996 | Switlik |
| 5,570,924 A | 11/1996 | Few et al. |
| 5,609,384 A | 3/1997 | Loewen et al. |
| 5,823,610 A | 10/1998 | Ryan et al. |
| 5,842,734 A | 12/1998 | Lechner |
| 5,857,648 A | 1/1999 | Dailey et al. |
| 5,908,217 A | 6/1999 | Englar |
| 5,947,548 A | 9/1999 | Carper et al. |
| 6,045,095 A | 4/2000 | Parrish, IV |
| 6,092,861 A | 7/2000 | Whelan |
| 6,170,904 B1 | 1/2001 | Schaedlich et al. |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham |
| 6,309,010 B1 | 10/2001 | Whitten |
| 6,375,126 B1 | 4/2002 | Sakurai et al. |
| 6,382,708 B1 | 5/2002 | Erdelitsch et al. |
| 6,409,252 B1 | 6/2002 | Andrus |
| 6,418,710 B1 | 7/2002 | Perrier et al. |
| 6,457,766 B1 | 10/2002 | Telnack |

(56) References Cited

U.S. PATENT DOCUMENTS

| | | |
|---|---|---|
| 6,467,833 B1 | 10/2002 | Travers |
| 6,485,087 B1 | 11/2002 | Roberge et al. |
| 6,561,575 B2 | 5/2003 | Fairburn et al. |
| 6,565,112 B2 | 5/2003 | Hanson et al. |
| 6,595,578 B1 | 7/2003 | Calsoyds et al. |
| 6,616,218 B2 | 9/2003 | Bauer et al. |
| 6,644,720 B2 | 11/2003 | Long et al. |
| 6,666,498 B1 | 12/2003 | Whitten |
| 6,669,270 B1 | 12/2003 | Card et al. |
| 6,742,616 B2 | 6/2004 | Leban et al. |
| 6,779,834 B1 | 8/2004 | Keller |
| 6,789,839 B1 | 9/2004 | Samuelson |
| 6,799,791 B2 | 10/2004 | Reiman et al. |
| 6,846,035 B2 | 1/2005 | Wong et al. |
| 6,854,788 B1 | 2/2005 | Graham |
| 6,877,793 B2 | 4/2005 | Cory |
| 6,886,882 B2 | 5/2005 | Farlow et al. |
| 6,915,611 B2 | 7/2005 | Reiman et al. |
| 6,959,958 B2 | 11/2005 | Basford |
| 6,974,178 B2 | 12/2005 | Ortega et al. |
| 7,008,004 B2 | 3/2006 | Ortega et al. |
| 7,008,005 B1 | 3/2006 | Graham |
| 7,118,164 B2 | 10/2006 | Frank et al. |
| 7,147,270 B1 | 12/2006 | Andrus et al. |
| 7,192,077 B1 | 3/2007 | Hilleman |
| 7,207,620 B2 | 4/2007 | Cosgrove et al. |
| 7,240,958 B2 | 7/2007 | Skopic |
| 7,243,980 B2 | 7/2007 | Vala |
| 7,374,229 B1 | 5/2008 | Noll et al. |
| 7,374,230 B2 | 5/2008 | Breidenbach et al. |
| 7,380,868 B2 | 6/2008 | Breidenbach et al. |
| 7,404,592 B2 | 7/2008 | Reiman et al. |
| 7,484,791 B1 | 2/2009 | Chen |
| 7,549,695 B2 | 6/2009 | Royer et al. |
| 7,578,541 B2 | 8/2009 | Layfield et al. |
| 7,618,086 B2 | 11/2009 | Breidenbach et al. |
| 7,625,034 B1 | 12/2009 | Fitzgerald |
| 7,641,262 B2 | 1/2010 | Nusbaum |
| 7,740,304 B1 | 6/2010 | Breu et al. |
| 7,748,771 B2 | 7/2010 | Distel et al. |
| 7,780,224 B2 | 8/2010 | Roush |
| 7,789,412 B2 | 9/2010 | Algüera et al. |
| 7,789,453 B2 | 9/2010 | Roush et al. |
| 7,794,011 B2 | 9/2010 | Kjellgren et al. |
| 7,806,464 B2 | 10/2010 | Cardolle |
| 7,850,224 B2 | 12/2010 | Breidenbach et al. |
| 7,854,468 B2 | 12/2010 | Vogel et al. |
| 7,862,102 B1 | 1/2011 | Benton |
| 7,950,720 B2 | 5/2011 | Skopic |
| 7,992,923 B2 | 8/2011 | Dayton |
| 8,079,634 B2 | 12/2011 | Visser et al. |
| 8,100,461 B2 | 1/2012 | Smith et al. |
| 8,251,436 B2 | 8/2012 | Henderson et al. |
| 8,360,509 B2 | 1/2013 | Smith et al. |
| 8,608,228 B2 | 12/2013 | Visentin |
| 9,126,638 B2 | 9/2015 | Breidenbach |
| 9,145,177 B2 | 9/2015 | Smith et al. |
| 9,180,919 B2 | 11/2015 | Breidenbach |
| 2002/0005655 A1 | 1/2002 | Bauer et al. |
| 2002/0021023 A1 | 2/2002 | Leban et al. |
| 2002/0030384 A1 | 3/2002 | Basford et al. |
| 2003/0057736 A1 | 3/2003 | Long et al. |
| 2003/0205913 A1 | 11/2003 | Leonard et al. |
| 2004/0118055 A1 | 6/2004 | Reiman et al. |
| 2004/0119319 A1 | 6/2004 | Reiman et al. |
| 2004/0256885 A1 | 12/2004 | Bui |
| 2005/0040637 A1 | 2/2005 | Wood et al. |
| 2005/0146161 A1 | 7/2005 | Uland |
| 2005/0159075 A1 | 7/2005 | Isobe et al. |
| 2005/0204681 A1 | 9/2005 | Zeigler et al. |
| 2006/0157623 A1 | 7/2006 | Voglsinger et al. |
| 2006/0252361 A1 | 11/2006 | Henderson, II |
| 2006/0273625 A1 | 12/2006 | Andrus et al. |
| 2007/0001481 A1 | 1/2007 | Breidenbach |
| 2007/0120397 A1 | 5/2007 | Layfield et al. |
| 2007/0126261 A1 | 6/2007 | Breidenbach |
| 2007/0200390 A1 | 8/2007 | Lotarev et al. |
| 2007/0228772 A1 | 10/2007 | Froeschle et al. |
| 2007/0246969 A1 | 10/2007 | Smith et al. |
| 2008/0048468 A1 | 2/2008 | Holubar |
| 2008/0061597 A1 | 3/2008 | Reiman et al. |
| 2008/0061598 A1 | 3/2008 | Reiman et al. |
| 2008/0093886 A1 | 4/2008 | Nusbaum et al. |
| 2008/0217957 A1 | 9/2008 | Schoon et al. |
| 2008/0272617 A1 | 11/2008 | Roush et al. |
| 2008/0290686 A1 | 11/2008 | Royer et al. |
| 2008/0303310 A1 | 12/2008 | Breidenbach et al. |
| 2008/0309122 A1 | 12/2008 | Smith et al. |
| 2009/0096250 A1 | 4/2009 | Kohls et al. |
| 2009/0140542 A1 | 6/2009 | Breidenbach et al. |
| 2009/0146453 A1 | 6/2009 | Ortega et al. |
| 2009/0179456 A1 | 7/2009 | Holubar et al. |
| 2009/0200834 A1 | 8/2009 | Vogel et al. |
| 2009/0212594 A1 | 8/2009 | Breidenbach et al. |
| 2009/0212595 A1 | 8/2009 | Heppel et al. |
| 2009/0212596 A1 | 8/2009 | Reiman et al. |
| 2009/0230726 A1 | 9/2009 | Reiman et al. |
| 2009/0236872 A1 | 9/2009 | Wood |
| 2010/0066123 A1 | 3/2010 | Ortega et al. |
| 2010/0106380 A1 | 4/2010 | Salari et al. |
| 2010/0164249 A1 | 7/2010 | Nusbaum |
| 2010/0201153 A1* | 8/2010 | Pesotini, Jr. ............... 296/180.4 |
| 2010/0222671 A1 | 9/2010 | Cohen et al. |
| 2010/0225143 A1* | 9/2010 | Skopic ........................ 296/180.2 |
| 2011/0037291 A1 | 2/2011 | Pickering et al. |
| 2011/0068605 A1 | 3/2011 | Domo et al. |
| 2011/0084516 A1 | 4/2011 | Smith et al. |
| 2011/0084517 A1 | 4/2011 | Vogel et al. |
| 2011/0095564 A1 | 4/2011 | Chen |
| 2011/0095565 A1 | 4/2011 | Chen |
| 2011/0095566 A1 | 4/2011 | Chen |
| 2011/0115254 A1* | 5/2011 | Skopic ........................ 296/180.3 |
| 2012/0086233 A1 | 4/2012 | Visser et al. |
| 2012/0104792 A1 | 5/2012 | Smith et al. |
| 2012/0223544 A1* | 9/2012 | Benton ........................ 296/180.1 |
| 2012/0235441 A1 | 9/2012 | Dayton et al. |
| 2013/0076064 A1* | 3/2013 | Smith et al. ............... 296/180.1 |
| 2013/0106136 A1 | 5/2013 | Smith et al. |
| 2013/0175824 A1 | 7/2013 | Smith et al. |
| 2013/0249241 A1 | 9/2013 | Baker et al. |
| 2014/0117713 A1 | 5/2014 | Baker et al. |
| 2014/0217775 A1 | 8/2014 | Breidenbach et al. |
| 2014/0319870 A1 | 10/2014 | Breidenbach et al. |
| 2014/0346807 A1 | 11/2014 | Breidenbach et al. |
| 2015/0266520 A1 | 9/2015 | Breidenbach |

FOREIGN PATENT DOCUMENTS

| | | |
|---|---|---|
| DE | 2922130 A1 | 12/1980 |
| DE | 19640965 A1 | 4/1997 |
| DE | 29705882 U1 | 7/1997 |
| DE | 29623407 U1 | 7/1998 |
| DE | 10228658 A1 | 1/2004 |
| DE | 10240504 A1 | 3/2004 |
| DE | 10316105 A1 | 10/2004 |
| EP | 1870321 A1 | 12/2007 |
| FR | 2623155 A1 | 5/1989 |
| JP | 06010157 A | 1/1994 |
| WO | 2008024386 A2 | 2/2007 |
| WO | 2007079306 A2 | 7/2007 |
| WO | 2008144025 A3 | 1/2009 |
| WO | 2014011886 A1 | 1/2014 |

OTHER PUBLICATIONS

International Search Report and Written Opinion of the International Searching Authority of the European Patent Office for PCT/US2012/056365, mailed Feb. 27, 2013. 10 pages.

International Search Report and Written Opinion of the International Searching Authorityof the European Patent Office for PCT/US2008/006374 mailed Nov. 14, 2008. 14 pages.

International Search Report and Written Opinion of the International Searching Authorityof the European Patent Office for PCT/US2011/055758 mailed Mar. 2, 2012. 13 pages.

(56) References Cited

OTHER PUBLICATIONS

International Search Report and Written Opinion of the International Searching Authorityof the European Patent Office for PCT/US2013/050083, mailed Oct. 24, 2013. 9 pages.
International Search Report and Written Opinion of the International Searching Authorityof the United States Patent Office for PCT/US12/62237, mailed Jan. 15, 2013. 8 pages.
Ken Visser, "Drag Reduction of Tractor Trailers", Clarkson University, Nov. 2005, 4 pages.
Machine translation of DE19524825 printed from the internet Nov. 3, 2010.
McCallen, et al., "Progress in Reducing Aerodynamic Drag for Higher Efficiency of Heavy Duty Trucks (Class 7-8)", Lawrence Livermore National Laboratory, Apr. 1999, 14 pages.
Ortega, et al., "An Experimental Study of Drag Reduction Devices for a Trailer Underbody and Base", Lawrence Livermore National Laboratory, Jun. 4, 2004, 17 pages.
Randal Scott Funderburk, "An Investigation of a Drag Reducing Device for Tractor-Trailers", A Thesis in Mechanical Engineering, May 1996, 128 pages.
Randall L. Peterson, "Drag Reduction Obtained by the Addition of a Boattail to a Box Shaped Vehicle", NASA Contractor Report 163113, Aug. 1981, 32 pages.
Salari, "Heavy Vehicle Drag Reduction Devices: Computational Evaluation & Design", DOE Heavy Vehicle Systems Review, Apr. 2006, 24 pages.
U.S. Department of Energy, "Heavy Vehicle Systems Optimization", FreedomCAR and Vehicle Technologies Program, 2004 Annual Progress Report, Feb. 2005, 206 pages.
U.S. Appl. No. 61/070,669, titled "Rounded Cargo Doors for Trailers and Trucks", filed Mar. 25, 2008 by Mark Roush.
U.S. Appl. No. 61/070,670, titled "Drag Reduction Arrangement for Cargo Trucks and Trailers", filed Mar. 25, 2008 by Mark Roush.

\* cited by examiner

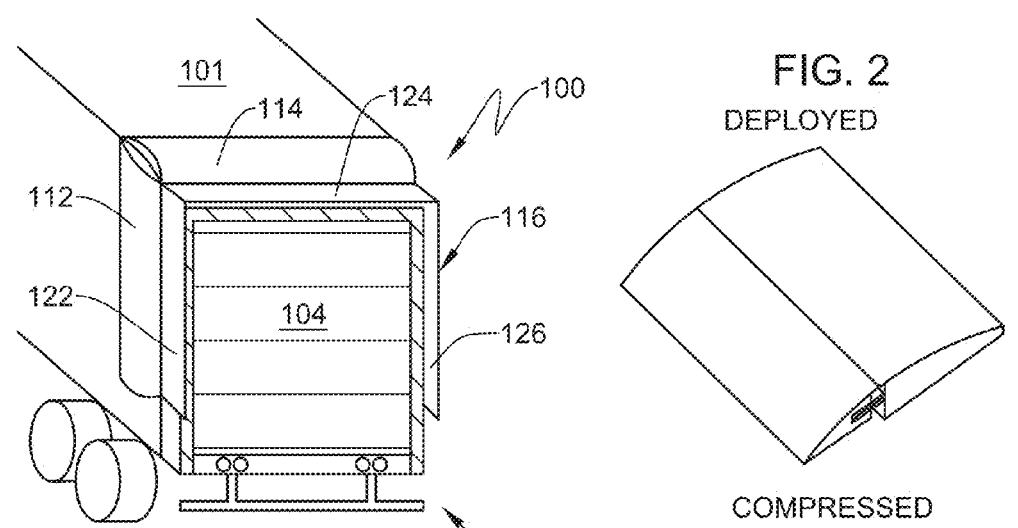
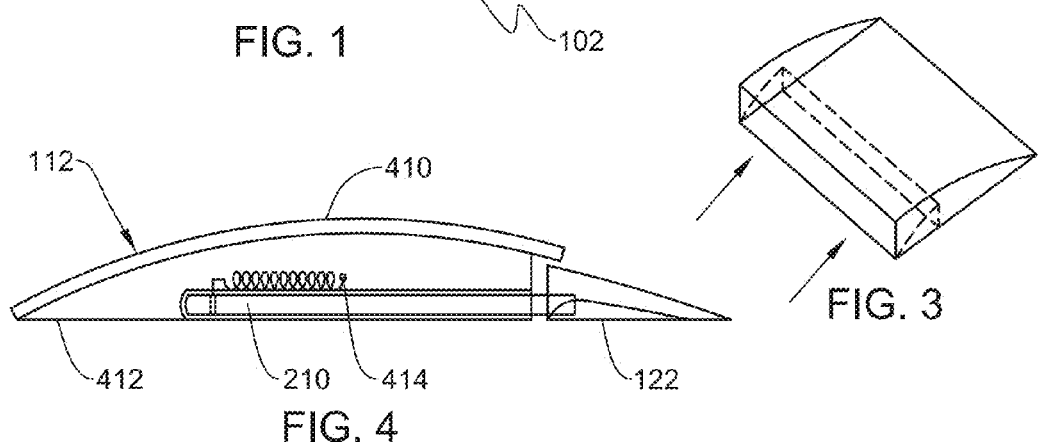
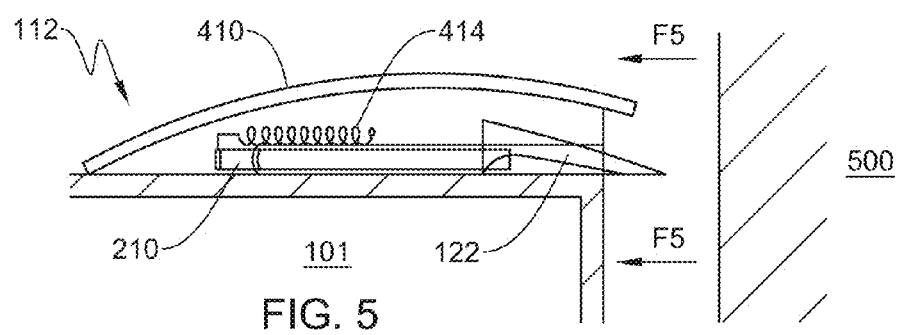

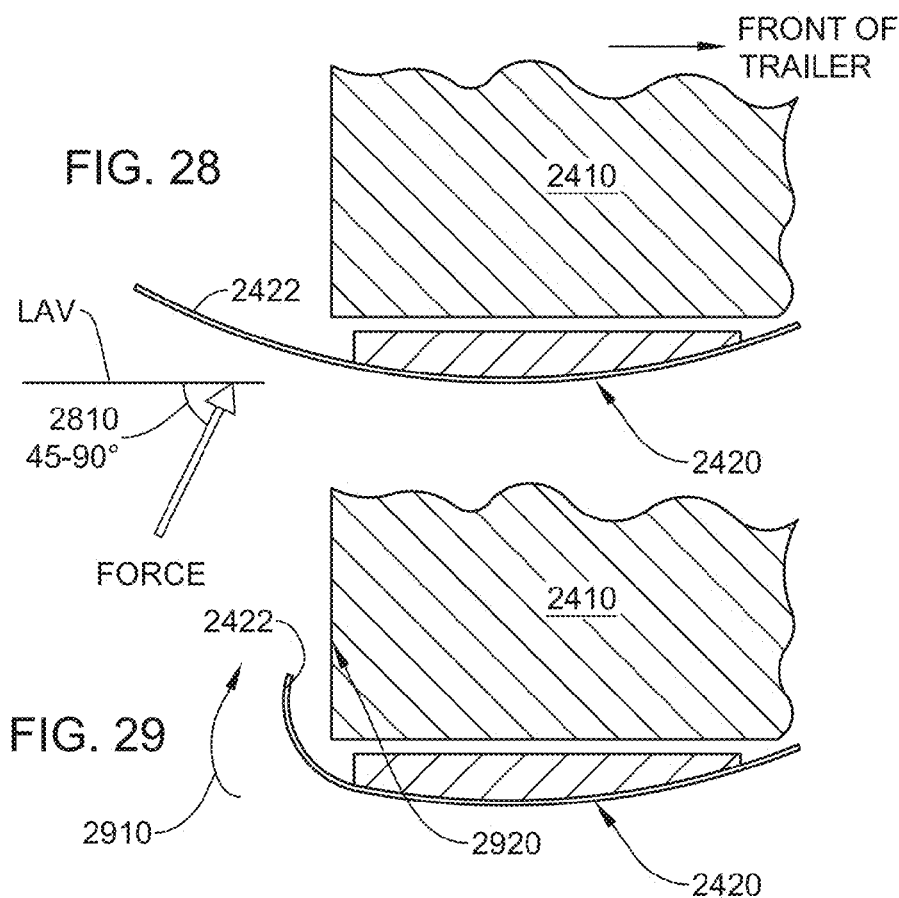
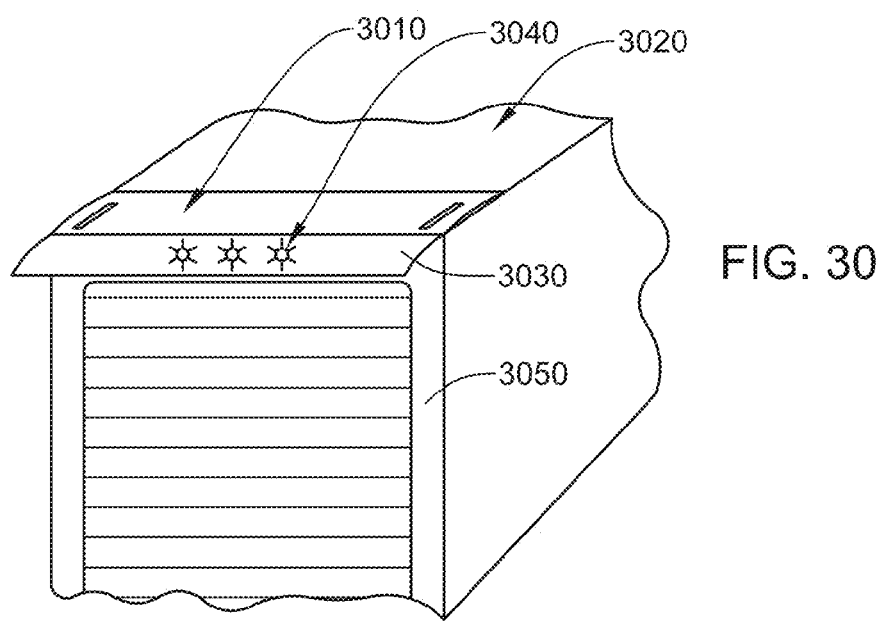

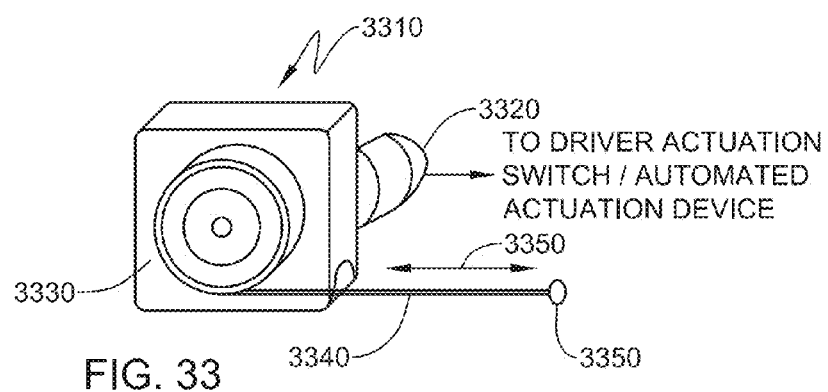
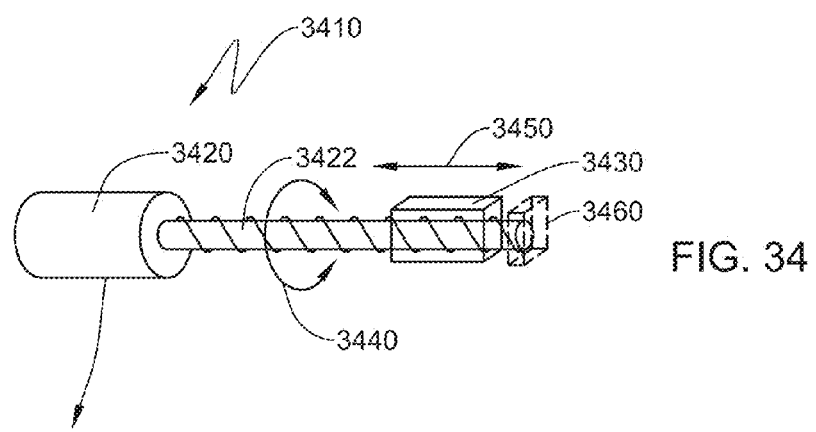
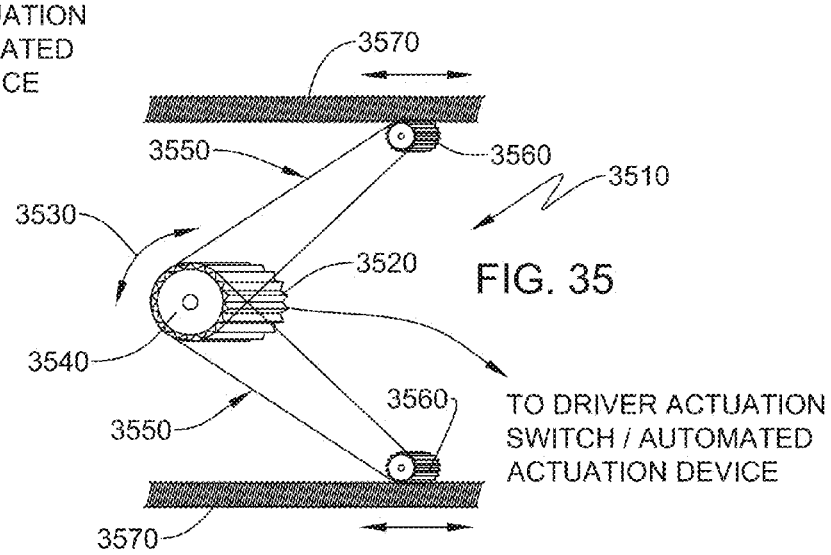

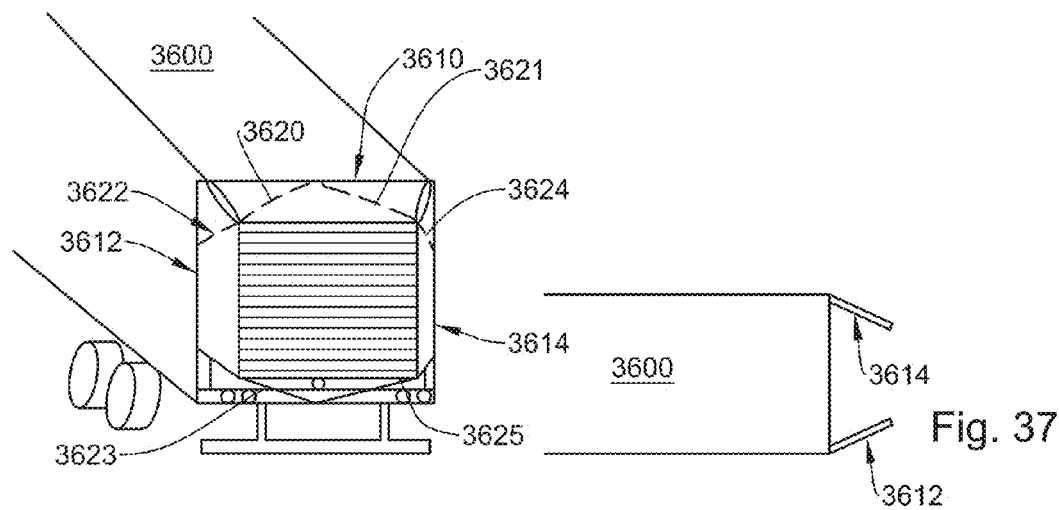
Fig. 36
Fig. 37
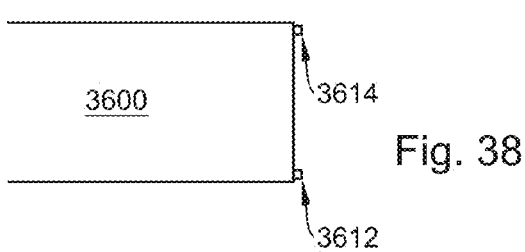
Fig. 38
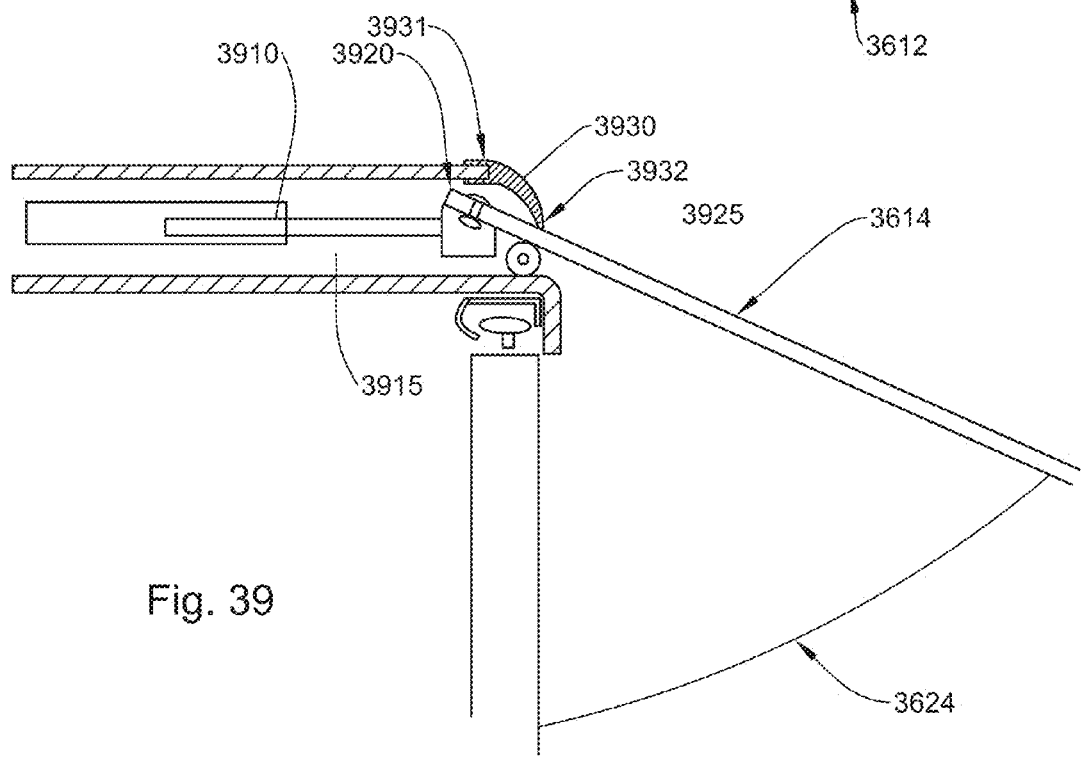
Fig. 39

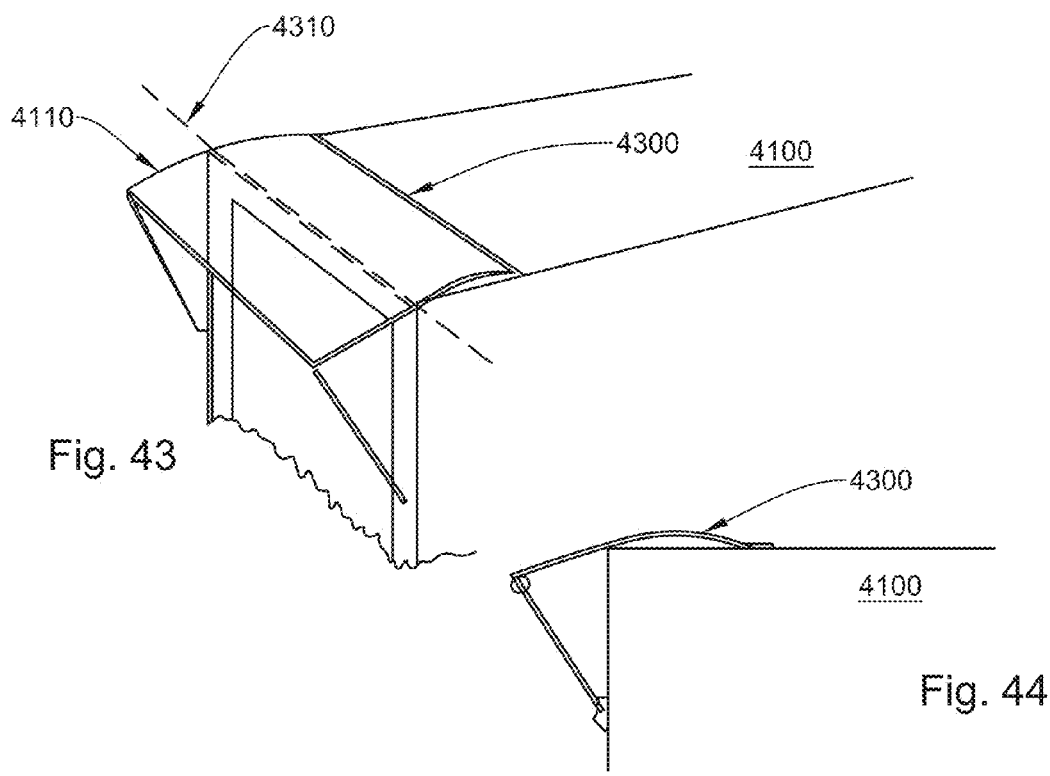
Fig. 43
Fig. 44
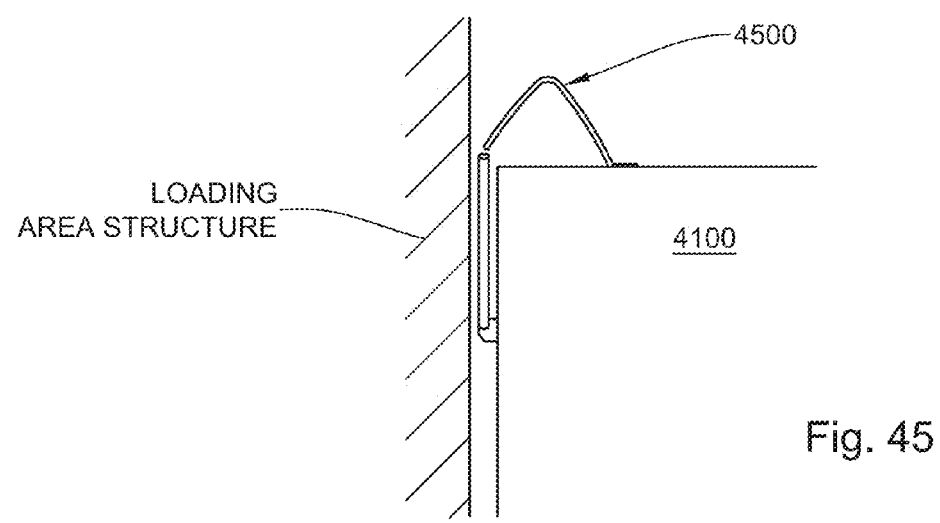
Fig. 45

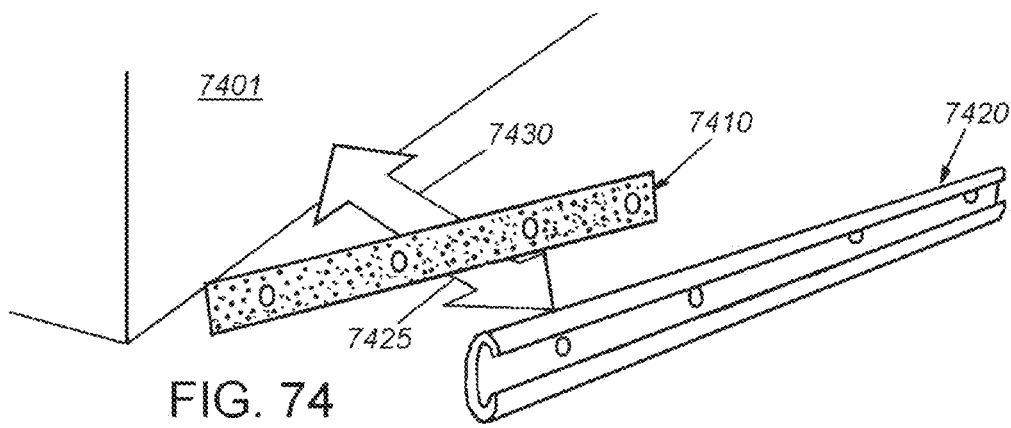
FIG. 74
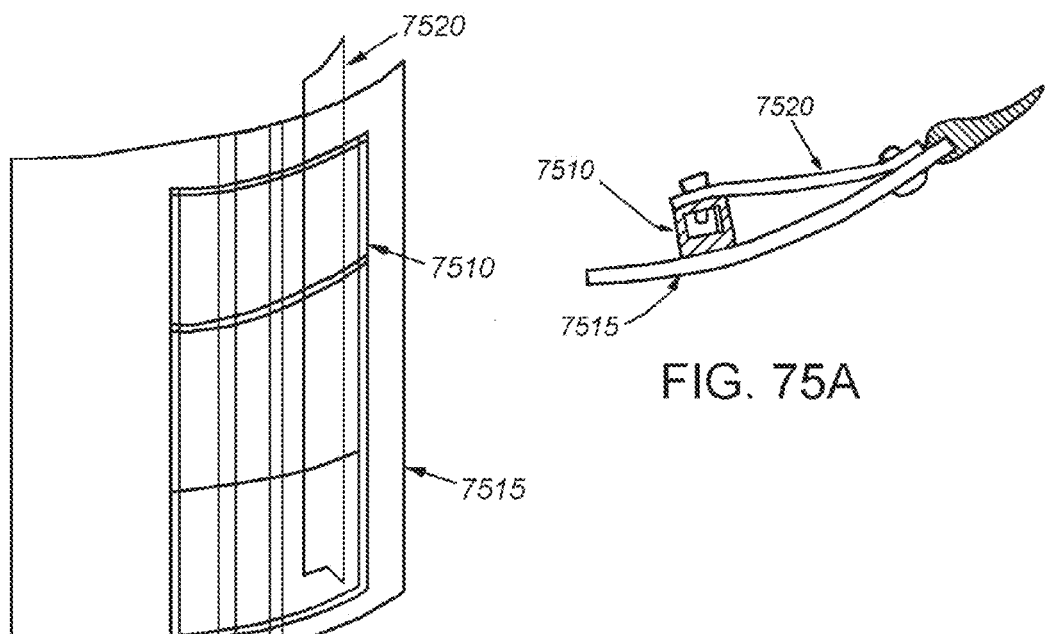
FIG. 75
FIG. 75A

REAR-MOUNTED RETRACTABLE AERODYNAMIC STRUCTURE FOR CARGO BODIES

RELATED APPLICATIONS

This application is a continuation of U.S. patent application Ser. No. 13/623,466, filed Sep. 20, 2012, entitled REAR-MOUNTED RETRACTABLE AERODYNAMIC STRUCTURE FOR CARGO BODIES, the entire disclosure of which is herein incorporated by reference. This application also claims the benefit of U.S. Provisional Application Ser. No. 61/537,047, filed Sep. 20, 2011, entitled REAR-MOUNTED RETRACTABLE AERODYNAMIC STRUCTURE FOR CARGO BODIES, the entire disclosure of which is herein incorporated by reference. This application also claims the benefit of U.S. Provisional Application Ser. No. 61/577,923, filed Dec. 20, 2011, entitled REAR-MOUNTED RETRACTABLE AERODYNAMIC STRUCTURE FOR CARGO BODIES, the entire disclosure of which is herein incorporated by reference. This application also claims the benefit of U.S. Provisional Application Ser. No. 61/600,579, filed Feb. 17, 2012, entitled REAR-MOUNTED RETRACTABLE AERODYNAMIC STRUCTURE FOR CARGO BODIES, the entire disclosure of which is herein incorporated by reference.

FIELD OF THE INVENTION

The present invention relates to rear-mounted aerodynamic structures for cargo bodies having rolling rear access doors.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit, with multiple driven axles, and a separate trailer with a long box-like cargo unit seated atop two or more sets of wheel assemblies. These truck assemblages are commonly referred to as "semi-trailers" or "tractor trailers." Most modern trucks' cabs, particularly those of tractor trailers, have been fitted with aerodynamic fairings on their roof, sides and front. These fairings assist in directing air over the exposed top of the box-like cargo body, which typically extends higher (by several feet) than the average cab roof. The flat, projecting front face of a cargo body is a substantial source of drag, above the cab roof. The use of such front-mounted aerodynamic fairings in recent years has served to significantly lower drag and, therefore, raise fuel economy for trucks, especially those traveling at high speed on open highways.

However, the rear end of the truck's cargo body has remained the same throughout its history. This is mainly because most trucks include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically consisting of an inwardly tapered set of walls) would further reduce the aerodynamic profile of the truck by reducing drag at the rear face. The reduction of drag, in turn, increases fuel economy.

Nevertheless, most attempts to provide aerodynamic structures that integrate with the structure and function of the rear cargo doors of a truck have been unsuccessful and/or impractical to use and operate. Such rear aerodynamic structures are typically large and difficult to remove from the rear so as to access the cargo doors when needed. One approach is to provide a structure that swings upwardly, completely out of the path of the doors. However, aerodynamic structures that swing upwardly require substantial strength or force to be moved away from the doors, and also require substantial height clearance above an already tall cargo body. Other solutions have attempted to provide an aerodynamic structure that hinges to one side of the cargo body. While this requires less force to move, it also requires substantial side clearance—which is generally absent from a closely packed, multi-truck loading dock.

To improve the aerodynamics of a truck or trailer cargo body by reducing drag, several solutions have been provided that focus on trucks having swinging doors, which are not always readily applicable to cargo bodies having rolling doors. For useful background information on aerodynamic structures for swinging cargo doors, refer to commonly assigned U.S. patent application Ser. No. 12/122,645, entitled REAR-MOUNTED AERODYNAMIC STRUCTURE FOR TRUCK CARGO BODIES, by Smith et al., and U.S. patent application Ser. No. 12/903,770, entitled REAR-MOUNTED AERODYNAMIC STRUCTURE FOR TRUCK CARGO BODIES, by Smith et al., which are both incorporated herein by reference.

Only recently has an effort been made to improve the aerodynamic efficiency of vehicles with use of rear fairings or "boat tail" devices to reduce the aerodynamic drag of the cargo body. However, there are no devices designed particularly for a rolling-door cargo body (or other similarly configured trailer body) that allows for access to the full loading dimensions of the rolling door. This is mainly due to the fact that all the rear fairing designs utilize rigid mounting to the rear frame of the trailer, which generally requires the perimeter dimension of the door opening to be reduced to accommodate the fairing's mounting assembly. This reduces the efficacy of the design. The fairing could be provided external of the vehicle's surface, but this can obscure required lighting in certain implementations. Also, there is a concern that the fairing can become damaged by an impact if it is not properly aligned with a loading dock when a vehicle backs into the dock to load or unload cargo. It is therefore desirable to provide a more-purpose-built structure for use with a non-swinging door arrangement on a cargo body, such as ubiquitous roll-top doors found on many trailers, fixed body trucks, certain intermodal containers and other cargo bodies. This structure should afford superior aerodynamic performance, be easy to use, durable and avoid obscuration of lighting and other required components.

SUMMARY OF THE INVENTION

This invention overcomes the disadvantages with respect to aerodynamic structures for the rear and cargo bodies with rolling cargo doors. A rear fairing device (illustratively) for a rolling door trailer is retractable to allow for contact with loading bays. The various embodiments of the invention allow for full access to the loading door of a rolling door trailer. The aerodynamic structure includes a nacelle and corresponding winglet constructed and arranged such that the winglet provides aerodynamic drag reduction and is retractable when an amount of force is exerted (e.g. backing up to a loading dock). The retractable winglets also allow for a certain amount of clearance when backing up to any object, including a building, another vehicle, or a loading area, which also prevent any unwanted damage to the truck from inadvertently backing up into an object. The winglets can be operatively connected with an electronic (or other) sensor that provides a visual, audible or other queue to the operator when they retract beyond a predetermined distance into the nacelle or other enclosure (e.g. an integrated receptacle of an OEM body).

In an embodiment of the invention, a winglet extends from a contoured housing past the aftmost plane of the trailer. The housing is contoured to initiate the transition of the airflow around the base of the trailer, as well as provide a means for mounting the device to the trailer sides. The housing can be an arcuate sloping contour or a flattened housing that extends outwardly beyond the walls of the trailer, but that is on the even plane with the walls and slidably receives the winglet that extends rearwardly from the contoured housing. The winglet is slidably attached to the contoured housing in such a way as to make a continuous surface from the leading edge of the device to the trailing edge, the contour defining a flat, rectangular shape, or a curved, arcuately-sloping surface. The winglet is sprung such that it is biased in the open position. During operation, when the retractable structure is subjected to a force, such as being backed into a loading dock, the winglet retracts fully into the housing such that winglet is flush with the aftmost (rearmost) plane of the trailer. When the device is in the retracted orientation and the force is no longer present, the winglet extends automatically to its fully extended position.

According to an illustrative embodiment of the invention, a winglet extends from a contoured (arcuate, semi-arcuate, rectangular, concave, etc.) housing past the aftmost plane of the trailer, and inside the plane of the trailer sides. The winglet is slidably attached to the contoured housing so as to be positioned inside (within) the plane of the trailer sides when fully deployed, and slide outside the plane of the trailer sides when fully retracted.

In an illustrative embodiment of the invention, a safety release mechanism is located at the bottom of the device such that, in the event the device becomes jammed, the spring force can be released and the winglet can be manually retracted.

In an illustrative embodiment, a fairing that is mounted to the rear of a cargo body (such as a roll-top-door trailer), and includes a plurality of panels located with respect to the rear of the body that along each of at least three sides of the body. The winglets are constructed and arranged to retract automatically when the cargo body is backed into engagement with a structure of a loading area, such as a loading dock doorway. When deployed, the winglets define a tapered or straight-walled cavity at the rear for increased aerodynamic efficiency. In an embodiment, an actuator, such as a spring or powered actuator automatically biases the winglets into a deployed orientation. This biasing force can be overcome by movable engagement between the winglets and the structure of the loading area to avoid damage and ensure that the winglets are moved to a non-obstructing (refracted) position during loading and unloading. In various embodiments, the winglets are each attached to either of (a) a movable body-adjacent panel portion to define a one-piece panel and (b) a body-affixed panel to define a two-piece panel.

In an illustrative embodiment, an aerodynamic structure mounted to the rear of a vehicle body comprises a top panel and a first side panel and an opposing second side panel that each respectively move between a retracted position substantially free of interference with a rear edge of the vehicle body and a deployed position extending rearwardly beyond the rear edge to define at least a partial aerodynamic cavity. According to the illustrative embodiment, at least one of the top panel, the first side panel and the second side panel are biased into the deployed position by spring force and are hingedly fixed along a surface of the vehicle body at a location forwardly spaced apart from a rear edge of the vehicle body. The aerodynamic structure includes a retaining assembly that engages a portion of the at least one of the top panel, the first side panel and the second side panel to maintain a predetermined aerodynamic shape against airflow thereover. In accordance with the illustrative embodiment, wherein the at least one of the top panel, the first side panel and the second side panel are constructed and arranged to move outwardly along an approximate central region between a rear edge and a hinge line on the surface when moving from the deployed position to the retracted position.

In an illustrative embodiment, a structurally deformable rear aerodynamic structure mounted to the rear of a vehicle body comprising a top panel and a first side panel and an opposing second side panel that each respectively move between a retracted position substantially free of interference with a rear edge of the vehicle body and a deployed position extending rearwardly beyond the rear edge to define at least a partial aerodynamic cavity. According to the illustrative embodiment, at least one of the top panel, the first side panel and the second side panel are naturally located into the deployed position and composed of a material that elastically deforms when engaging a confronting surface during rearward motion of the vehicle into the surface.

BRIEF DESCRIPTION OF THE DRAWINGS

The invention description below refers to the accompanying drawings, of which:

FIG. 1 is a rear view of a retractable aerodynamic structure, shown with retractable, aerodynamic winglets in their deployed orientation, according to an illustrative embodiment;

FIG. 2 is a perspective view of a nacelle that aerodynamically encloses the movable components of the aerodynamic structure, and showing a winglet in the deployed orientation, according to an illustrative embodiment;

FIG. 3 is a perspective view of the nacelle of the aerodynamic structure showing the winglet in the compressed position, according to the illustrative embodiment;

FIG. 4 is a side cross-section taken through the aerodynamic structure of FIG. 2, showing the nacelle with the winglet in the deployed orientation according to the illustrative embodiment;

FIG. 5 is a cross-sectional view as taken through the aerodynamic structure of FIG. 3, showing the nacelle with the associated winglet compressed to a stored/retracted orientation within the nacelle, according to the illustrative embodiment;

FIGS. 28 and 29 are partial top views of a side panel according to an illustrative embodiment and exemplary vehicle body, respectively showing geometry of the rear aerodynamic extension or the panel before and after application of an approximately 90-degree, inwardly directed force thereto;

FIG. 30 is a partial rear perspective view of an exemplary vehicle body with a retractable aerodynamic fairing having a top extension constructed from a resilient transparent polymer material that exposes lights of the vehicle;

FIG. 33 is a perspective view of a motor drive and cable assembly for retracting a spring-deployed panel according to an illustrative embodiment;

FIG. 34 is a perspective view of a motor and lead screw drive assembly for deploying and retracting a panel according to an illustrative embodiment;

FIG. 35 is a motor and chain/gear drive assembly for deploying and retracting a panel according to an illustrative embodiment;

FIG. 36 is a rear perspective view of an OEM-integrated retractable aerodynamic structure secured to a cargo body and having a top panel and two side panels, according to an illustrative embodiment;

FIG. 37 is a top view of the cargo body with OEM-integrated aerodynamic structure, showing the side panels in the deployed position, according to the illustrative embodiment;

FIG. 38 is a top view of the cargo body with the OEM-integrated aerodynamic structure, showing the side panels in the retracted position, according to the illustrative embodiment;

FIG. 39 is a partial top cross-sectional view of the deployed side panel with slider assembly in the OEM-integrated aerodynamic structure, according to the illustrative embodiment;

FIG. 43 is a partial rear perspective view of a retractable flexible top panel shown in the deployed position, according to an illustrative embodiment;

FIG. 44 is a partial side view of the retractable flexible top panel shown in the deployed position, according to the illustrative embodiment;

FIG. 45 is a partial side view of the retractable flexible top panel, shown in the retracted position, as force is exerted on the trailing edge of the top panel, according to the illustrative embodiment;

FIG. 74 is an exploded view of a track assembly and associated adhesive tape for sealing and mounting the track assembly, in accordance with the illustrative embodiments;

FIG. 75A is a perspective view of an outer panel including a reinforcement panel to stabilize the leading edge of the panel, in accordance with the illustrative embodiment;

FIG. 75B is a top perspective view of the reinforcement panel and associated outer panel of an aerodynamic assembly, in accordance with the illustrative embodiments;

DETAILED DESCRIPTION

Figure 6:
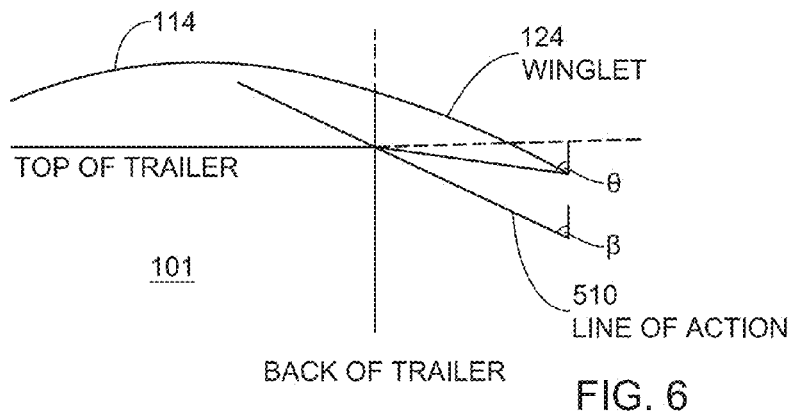
FIG. 6 is a side view of the nacelle and winglet in the deployed orientation, showing the geometry of the nacelle and winglet, according to an illustrative embodiment.

In an illustrative embodiment, a rear-mounted retractable aerodynamic structure includes a nacelle on at least a portion of the top and/or sides of a cargo body. The nacelle can comprise a unitary structure or a plurality of compartments or segments that together comprise a cavity to improve the aerodynamic drag of the cargo body. This and other components herein can be constructed from any acceptable material that can be formed into the described surfaces including polymer sheets, composite and sheet metal. The nacelle includes at least one retractable winglet to improve airflow, and is constructed and arranged to retract when a predetermined amount of force is exerted on the winglet. Accordingly, for example, when the truck is backing up to a loading area, the winglet retracts into the nacelle to provide the needed clearance for full access to the cargo body.

Reference is now made to FIG. 1 showing a rear view of a retractable aerodynamic structure 100 mounted on a cargo body 101. The cargo body 101 includes a conventional underride guard 102 which is a standard cargo body element to prevent unwanted items, vehicles or other objects from riding under the cargo body and causing injuries and/or other catastrophic results. The cargo body also includes a conventional rolling door 104. The retractable structure 100 is particularly suitable for rolling doors (104) as the winglets automatically retract when force is exerted, so as to not interfere with access to the interior of the cargo body. The curved containment members, or nacelles, include a first side nacelle 112, a top nacelle 114 and a second side nacelle 116 and respective retractable winglets 122, 124 and 126. The nacelle and winglet arrangement can comprise a single unitary nacelle and corresponding single retractable winglet, for example as incorporated into the structure of the cargo body, or as a retrofit single structure or plurality of segmented nacelles. In an illustrative embodiment, the nacelle is disposed on at least a portion of the top and opposing sides of the cargo body. The nacelle can be incorporated into the cargo body directly from the manufacturer as an OEM device or a retrofit nacelle(s) secured to the cargo body by rivets, bolts, or high-tension adhesives. In the case of a nacelle provided direct from the manufacturer, a nacelle can be built into the frame of the trailer as a compartment within the cargo body. In various embodiments it can be formed as a continuous surface with the rest of the body and either curved outwardly, or a continuous planar surface.

An exemplary nacelle 112 and corresponding retractable winglet 122 are shown in greater detail in FIGS. 2 and 3, with the winglet shown in the deployed orientation in FIG. 2 and compressed position in FIG. 3. The winglet is operatively connected to the nacelle via a slide 210. When a biasing force (e.g. a spring or pneumatic or hydraulic element), such as F5, is exerted upon the winglet 122, as shown in FIG. 5, the winglet 122 is compressed/biased into the nacelle 112. The force F5 can be the force from the trailer or truck cargo body backing up to a loading area, a building, another vehicle, or manual compression by a user. The force F5 can also be from a manual compression from a controller operatively connected to the winglets that is controllable by a user to cause manual compression of the winglet within the nacelle.

Reference is now made to FIG. 4 showing a cross-sectional view of the nacelle 112 and winglet 122 as taken through the aerodynamic structure of FIG. 2, with the winglet 122 in the deployed orientation. The winglet 122 is connected to the drawer-style slide 210, which is operatively connected to a spring 414, or other appropriate tensioning mechanism) to bias the slide 210 and corresponding winglet 122 in the deployed orientation. The cover plate 410 has a pre-edge contour 412 to further improve the aerodynamics of the overall system. FIG. 5 shows the nacelle 112 and corresponding winglet 122 as a cargo body 101 is backed up to a loading dock or wall 500. As the cargo body backs up toward the wall 500, this exerts a force F5 on the winglet 122 to compress the winglet 122 into the nacelle 112.

FIG. 6 is a diagram of the overall geometry of the nacelle and winglet structure. As shown, the trailer 101 and nacelle/winglet structure 114, 124, define a somewhat continuous airfoil-like cross-section when fully deployed. In an embodiment, an illustrative shape for the airfoil cross-section defines an approximately constant radius arc with a tangent extension. According to the illustrative embodiment, the nacelle 114 and corresponding winglet 124 on the cargo body 101 form a line of action 510 having an angle beta β, 79 degrees, and an angle theta, θ, is approximately 84.5 degrees, to allow for sufficient clearance within the nacelle 114 for the winglet 124. However the range of angles is highly variable. By way of example, one and/or the other angle can range as high as approximately 85 degrees and as low as approximately 70 degrees. The illustrative angles are highly variable in alternate embodiments and can be varied to suit the geometry and/or aerodynamics of a particular cargo body.

Figure 7:
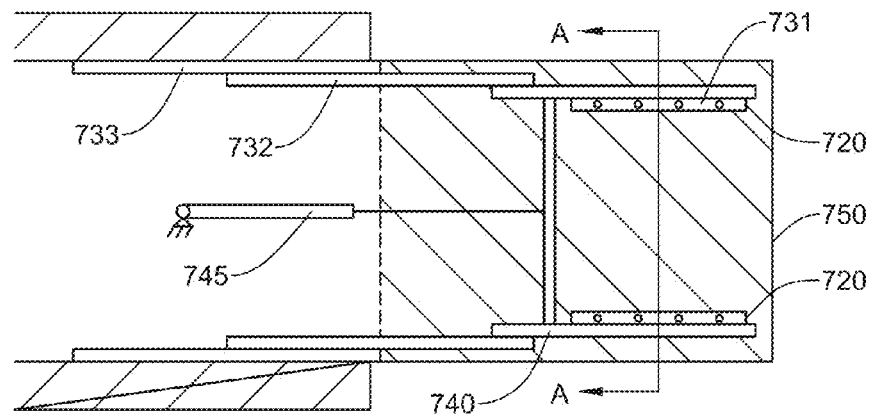
FIG. 7 is a top view of the nacelle structure with the coverplate removed and winglet deployed, showing a further anti-racking structure of the illustrative embodiments to prevent racking of the winglets when a widthwise or height wise differential force is applied thereto.

A further feature is shown in FIG. 7 to maintain rigidity and compression and deployment of the winglet 710. The winglet panel 710 is secured through brackets 720 to a sliding arrangement 731, 732, 733, which are secured to a stabilizer bar 740 connected to a gas spring (or actuator) 745 that controls deployment and compression of the winglet 710. The gas spring adds constant force over large throws without (substantially free-of) hysteresis. The separate sliders on opposing sides of the winglet panel allow the structure to maintain relative rigidity, which would be compromised using a single, elongated set of sliders. To this end, this structure of FIG. 7 prevents racking if one side is differentially biased. That is, the depicted, illustrative, nested-slider structure avoids the tendency for the panel to rack and become offset at an angle. Rather the panel is able to slide in a relatively parallel and linear manner in the event of the application of an uneven biasing force (e.g. pushing on one corner of the winglet). While a gas spring is used herein, it is expressly contemplated that a variety of spring and/or damper arrangements (i.e. coil springs or powered fluid (gas, liquid, etc.) actuators can be used to move the winglets in alternate embodiments). In the example of a powered actuator, various sensors (not shown) can be employed to determine when biasing pressure is applied to the winglet so as to operate the powered actuation system to automatically retract the winglet. This refraction actuation can be proportional to the amount of biasing pressure applied to the winglet by an adjacent, confronting surface.

Figure 8:
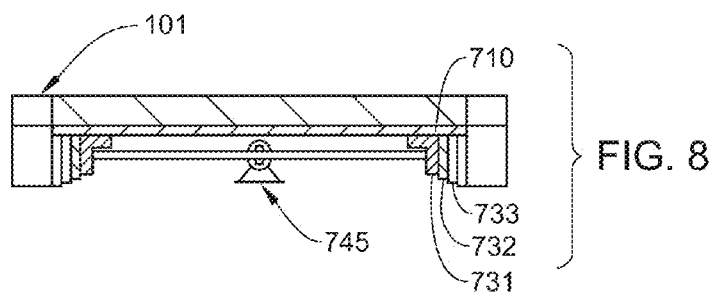
FIG. 8 is a front view of the nacelle structure with the coverplate removed and winglet compressed/retracted, showing the further anti-racking structure of the illustrative embodiments to prevent racking of the winglets.
Figure 9:
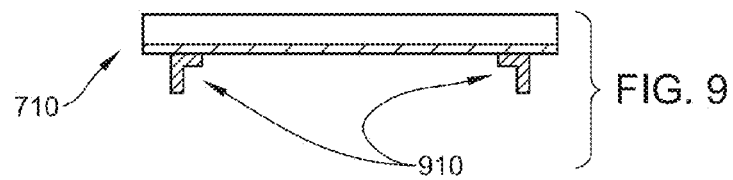
FIG. 9 is a front view of the nacelle structure with the winglet panel and mounts broken away from FIG. 8 to show the mount detail and the winglet panel.

FIG. 8 is a cross-sectional view as taken through line A-A of FIG. 7, showing the sliding arrangements 731, 732, 733, and the stabilizer bar 740 operatively connected to the gas spring 745. FIG. 9 shows the winglet panel 710 and mounts 910 as broken away from FIG. 8 to show the mount detail and the winglet panel 710.

Figure 10:
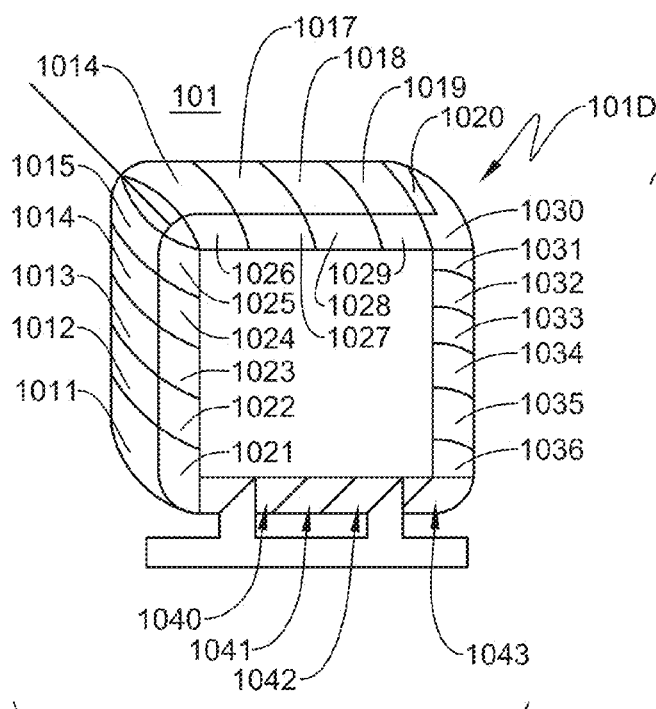
FIG. 10 is a rear perspective view of a segmented retractable nacelle structure mounted on an exemplary cargo body according to an illustrative embodiment.
Figure 11:
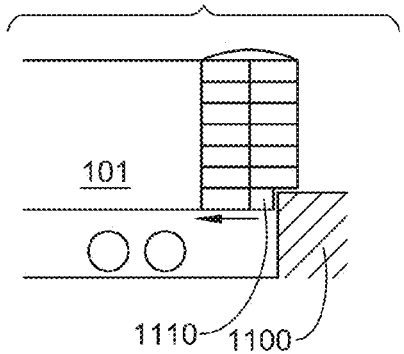
FIG. 11 is a side view of the segmented retractable nacelle structure of FIG. 10 in a loading/docking scenario.
Figure 12:
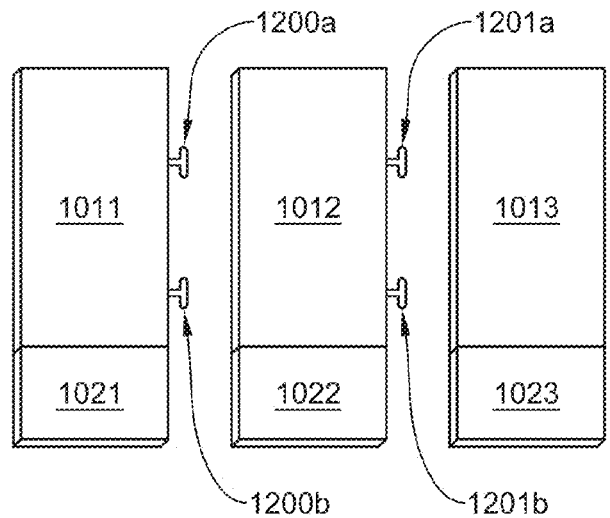
FIG. 12 is a top perspective view of the segmented nacelles and respective winglets of FIG. 10, according to an illustrative embodiment.
Figure 12A:
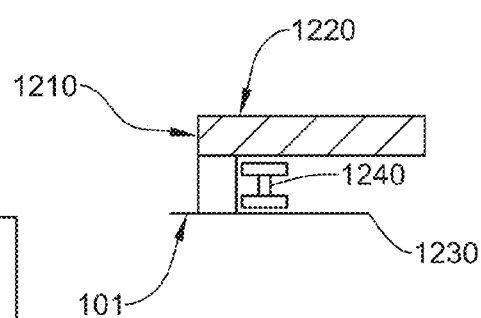
FIG. 12A is a cross-sectional diagram of the end plates of the nacelle as secured to the trailer cargo body.

FIG. 10 shows a segmented retractable nacelle structure 101D mounted on a cargo body 101. As shown, a plurality of side-by-side-arranged nacelle segments 1011-1020 are secured to the sides and top of the cargo body 101. Corresponding retractable winglets 1021-1035 (housed by the respective nacelles) are shown in a deployed orientation. Also note the segments 1040, 1041, 1042 and 1043 mounted to the bottom edge of the cargo body to create a four-sided aft/rear tail. As shown in FIG. 11, when the cargo body 101 is backed up to a surface 1100, the winglet(s) that contact the surface 1100 retract into their corresponding nacelle. FIG. 12 is a top perspective view of the segmented nacelles 1011, 1012 and 1013 and respective winglets 1021, 1022 and 1023, according to an illustrative embodiment. The segments can be secured together via appropriate protrusions 1200a, 1201a, 1202b, and 1202b, which engage adjacent segments to provide an overall retractable aerodynamic structure with individually retractable segments. This sectional design also allows for adaptation to any width and/or height of the trailer by piecing together the sufficient number of units. Also useful for straight-trucks and dry vans. FIG. 12A details a cross-sectional diagram of the end plates of the nacelle as secured to the trailer cargo body 101. As shown. The end plate 1210 provides a mount for securing the nacelle 1220 to the trailer skin 1230 via a rivet 1240. Other securing mechanisms, as described herein and readily apparent to those of skill in the art, can be employed for securing the nacelle and corresponding winglet structure to the cargo body.

The advantages and desirability of providing a retractable nacelle and winglet structure should now be apparent. These teachings are readily applicable to all cargo bodies having a rolling door structure (or other non-swinging-door cargo body rears) such that the aerodynamic structure does not interfere with access to the rolling door, while providing aerodynamic efficiency for the cargo body.

Figure 13:
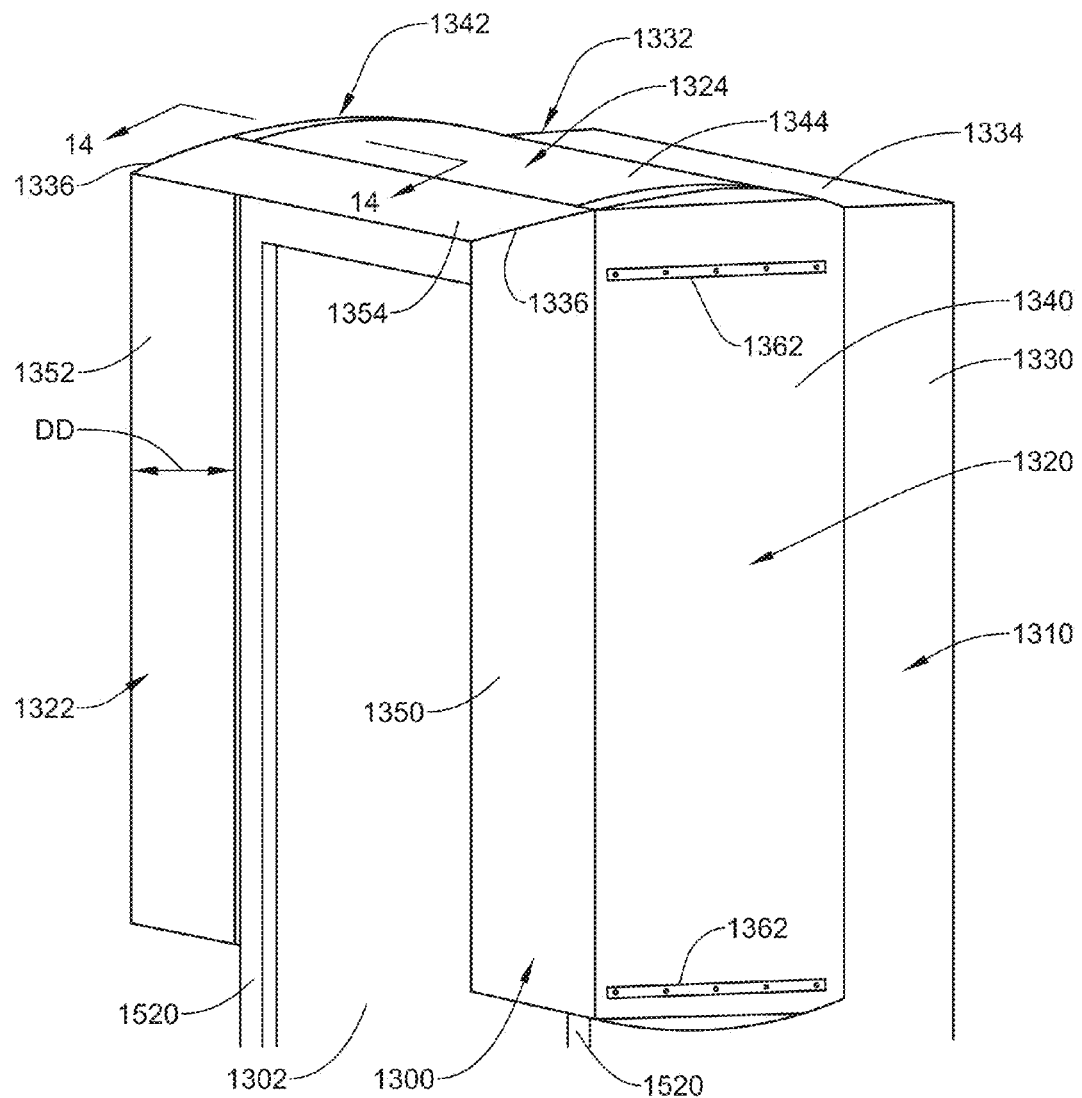
FIG. 13 is a is a rear perspective view of a retractable aerodynamic fairing defining a one-piece geometry mounted on an exemplary vehicle body according to an illustrative embodiment.
Figure 14:
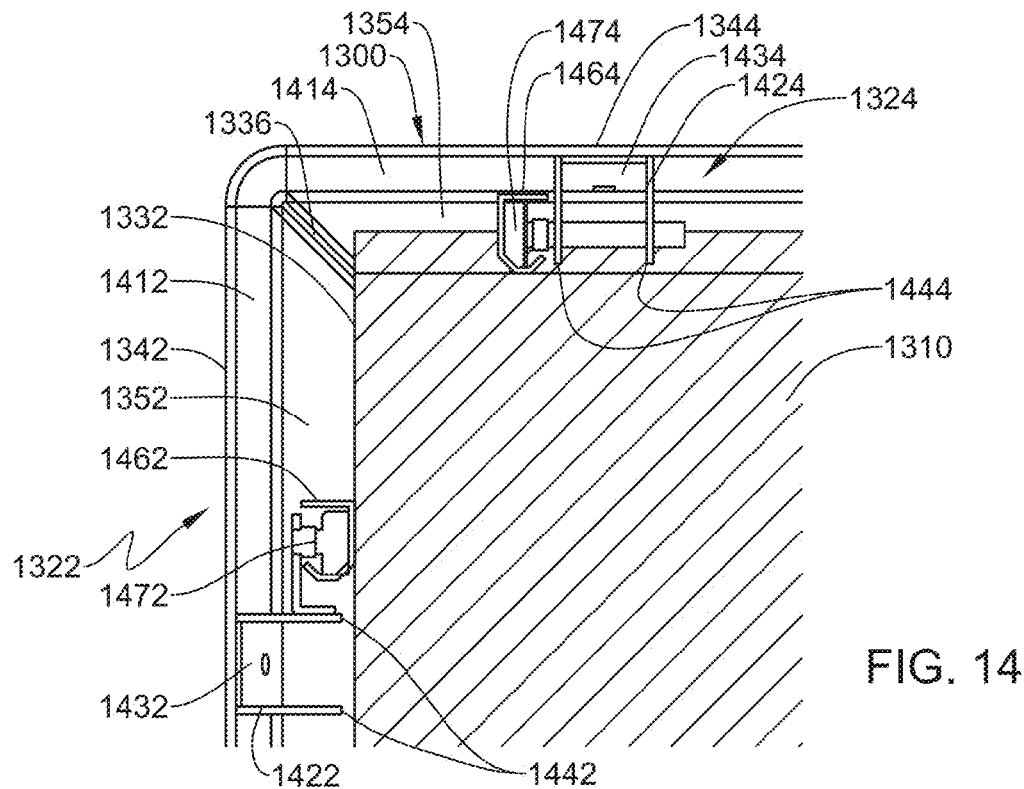
FIG. 14 is a partial cross section of a junction of two panels of the fairing mounted to the vehicle body taken along line 14-14 of FIG. 13 showing a track and roller system to enable sliding of panels.
Figure 15:
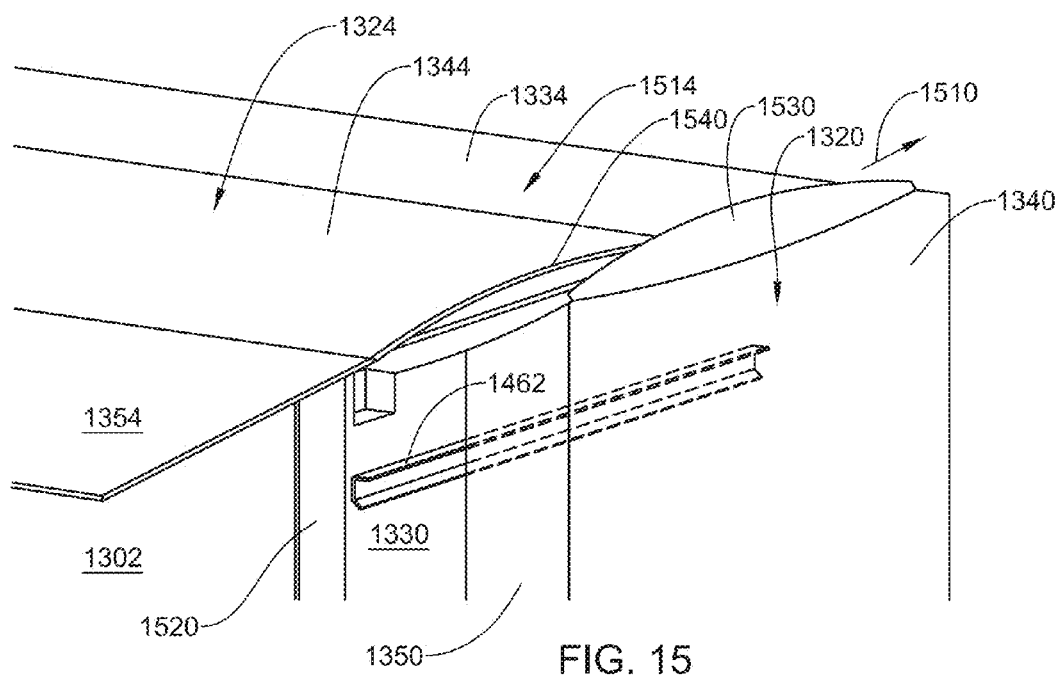
FIG. 15 is a partial perspective view of the two panels of FIG. 14 showing the side panel retracted and the top panel deployed on the vehicle body.
Figure 20:
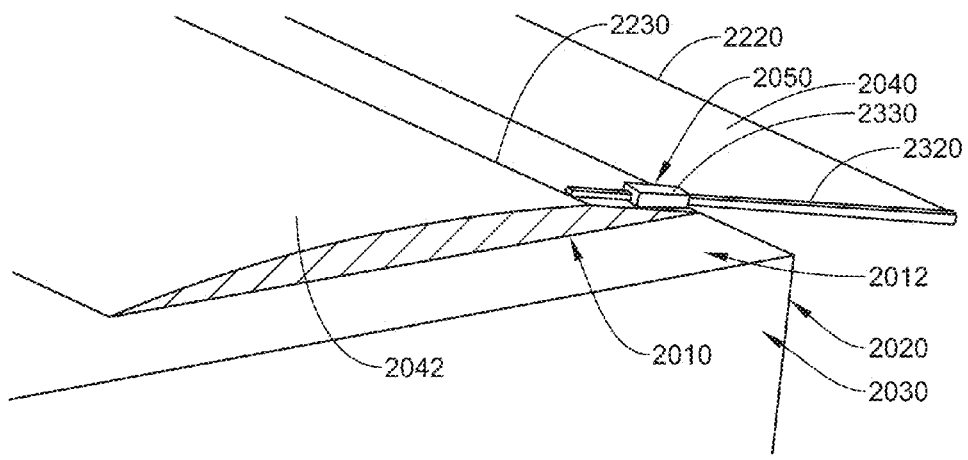
FIG. 20 is a partial perspective view of a rear of an exemplary vehicle body having a two-piece fairing panel arrangement, showing a top panel in a deployed orientation according to an illustrative embodiment.

Reference is now made to FIGS. 13-15 that show a retractable "one-piece" fairing 1300 mounted on the rear of an exemplary vehicle body (e.g. a roll door (1302) or swinging-door trailer) 1310 according to another illustrative embodiment. The fairing 1300 consists of three separate panels 1320, 1322 and 1324 on the sides and top respectively. This embodiment omits a lower panel in an illustrative embodiment. In order to aerodynamically compensate for the absence of a lower panel, in some embodiments, and to more generally enhance the aerodynamics of the vehicle body, a variety of aerodynamic skirts and/or other conventional or novel structures can be employed to appropriately direct air around the lower rear of the body. As depicted, the side panels 1320 and 1322 extend from the top of the body 1310 sufficiently down the sides to provide desired aerodynamic performance. For example, the side panels 1320, 1322 extend to a region adjacent to the tail lights. The side panels 1320, 1322 and top panel 1324 are shown deployed in FIG. 13, defining an inwardly directed angle with respect to the plane of the body sides 1330, 1332 and top 1334. This angle is between approximately 5 and 10 degrees in an embodiment, but is highly variable. When deployed, the panels 1320, 1322, 1324 extend a distance DD of between approximately 8 and 24 inches, but other dimensions are expressly contemplated.

The panels 1320, 1322, 1324 of the fairing 1300 are termed a "one-piece" geometry because they provide unitary or integral structure with the body-adjacent portion (1340, 1342 and 1344, respectively) and the rear-extending portion (1350, 1352, 1354, respectively) combined in each panel, which each deploy and retract as a single sliding unit free of interference with the other panels. In addition, as shown, the rear-extending portions smoothly mesh together at their intersecting corners/seams 1336 (see also FIG. 14) to form a very clean, essentially seamless, aerodynamic profile in this embodiment.

The body-adjacent portions 1340, 1342, 1344 panels (1320, 1322, 1324, respectively) define a convex camber that generates the transition between the body and the aerodynamic extending portions 1350, 1352, 1354. With further reference to the embodiment, shown in cross section in FIG. 14, the skin (1412 and 1414) is formed over a plurality of ribs (1422, 1424) having a convex outer base 1432, 1434 that engages the inner surface of the skin (1412, 1414, respectively), and linear inner edges 1442, 1444 facing the vehicle side body. In this embodiment, the ribs define a U-channel shape for strength and lightness, but a wide variety of open, solid or semi-solid (e.g. drilled or ported) load-bearing structures can be used to define and maintain the shape of the skin. In an embodiment the ribs can be reinforced with exterior straps (1362 as shown in FIG. 13), through which fasteners (e.g. rivets) pass and cerate a firm connection that maintains its shape. These straps 1362 are omitted in other illustrative embodiments. The ribs can be formed from a corrosion-resistant metal (e.g. aluminum alloy) or a rigid polymer/composite (e.g. injection-molded plastic, fiberglass, etc.). In other embodiments of the invention, ribs may be physically formed into the skin to provide a more unitary structure, which provides many advantages including cost reduction and high stiffness. The skin is a semi-flexible material, such as a polymer sheet panel, a composite panel, carbon fiber sheet, fiberglass sheet, or a sheet metal, such as steel or aluminum. A variety of materials clear to those of skill can be employed. In an embodiment, the material defines an elastically deformable material that allows the extending portion to flex as it retracts so that the normally inwardly tapered portion bends outwardly and slides over the body side. Upon redeployment, the panel returns to an inwardly tapered shape under its internal spring force.

Note that while the panels herein taper inwardly in the depicted embodiments, it is expressly contemplated that the extending portions/winglets of the panel assemblies can extend in a straight-rearward manner that is approximately parallel to the plane of the adjacent vehicle body side. Absent a taper, the panels still provide a beneficial aerodynamic effect by defining a cavity that reduces rear drag. Also, the taper can be either a relatively straight taper of a curvilinear taper as appropriate. The material can be formed with the appropriate shape and can elastically deform as needed when retracting. Notably, the curvilinear shape of the extending portions/winglets allows for airflow to be continuously guided in a gentle curve from the sides/top of the cargo body to an inwardly tapered location beyond the rear plane of the body.

In the embodiment of FIG. 14, the panels 1320, 1322 and 1324 are slidably mounted to the respective sides (1330) and top of the vehicle body using a plurality of tracks (1462, 1464 in FIG. 14). At least two tracks are provided on each side or top to minimize racking They extend generally in a front-to-back direction (i.e. a "longitudinal axis" of the vehicle body), thereby allowing forward retraction and rearward deployment of panels. In alternate embodiments, a single sturdy track, or more than two tracks can be used on each side and top. The ribs 1432, 1434 support roller assemblies, 1472, 1474, respectively, that ride within the tracks 1462, 1464. The rollers in each of the assemblies 1472, 1474 are supported using appropriate brackets and/or bearing assemblies as shown. One roller assembly can ride in each track, or a plurality of spaced-apart roller assemblies can be arranged to ride in each track to reduce the possibility of panel racking A variety of structures and techniques can be used to support tracks and rollers. For example, in alternate embodiments nested tracks, such as a ball-bearing drawer slide arrangement can be employed.

Figure 14A:
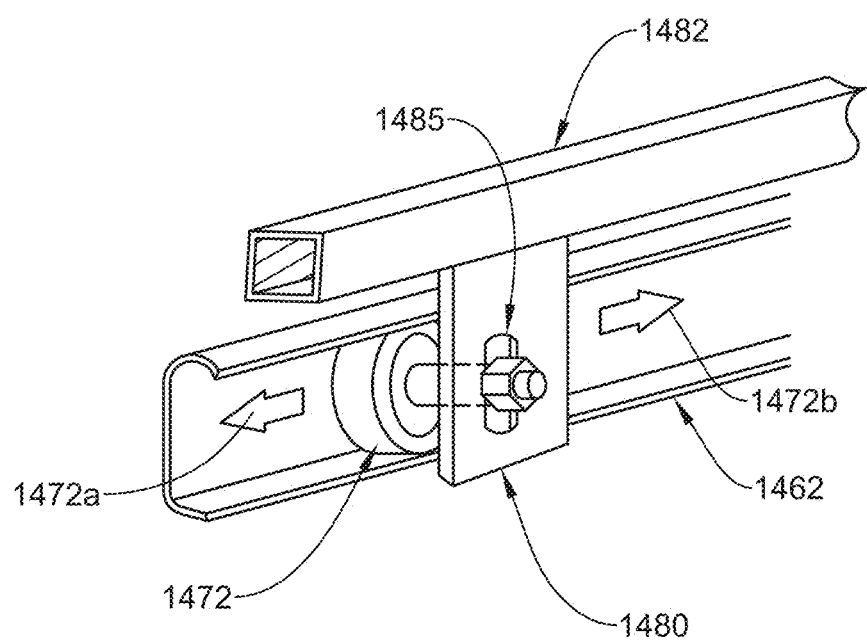
FIG. 14A is a partial perspective view detailing the track and roller system of FIG. 14, according to the illustrative embodiments.

FIG. 14A is a partial perspective view detailing the track and roller system of FIG. 14 according to an illustrative embodiment. The roller assembly 1472 rides within the track 1462 to allow for the rolling of the panels along the direction of arrows 1472a and 1472b. The roller is secured to a bracket 1480 that is secured to the panel support frame 1482. The panel support frame 1482 can comprise any appropriate panel support frame as shown and described herein, including, for example, the frame 4130 described herein with reference to FIG. 41, which slides along the side of the cargo body to retract and deploy. Referring back to FIG. 14A, the bracket 1480 can include an adjusting slot 1485 in an illustrative embodiment. The adjusting slot 1485 allows for vertical adjustment of the roller position to provide more accurate alignment of the rollers to the track, and to thereby reduce rolling resistance.

In FIG. 15, the above-described side panel 1320 is shown retracted (arrow 1510), with the aerodynamic extending portion 1350 withdrawn from the door frame 1520 of the vehicle body. Likewise, the top panel 1324 is fully deployed (arrow 1514) with the extending portion 1354 extended in an inwardly tapered arrangement over the door frame. A "wingtip" 1530 caps the top of the side panel's body-adjacent portion 1340. This rounded tip 1530 flushly confronts to the edge 1540 top panel's body-adjacent portion 1344 to create a continuous aerodynamic shape when both panels are concurrently in the deployed or retracted orientation.

As will be described further below, the extending portions can be maintained in a deployed orientation using actuators, springs and the like, that are overcome to retract the panels using either a motorized/power-driven system, or by biasing force provided by a loading dock wall as the panels engage the sides of a loading dock door. In general, this arrangement allows for automatic deployment when travelling, with retraction when the body confronts a loading dock door or other offload location.

Figure 16:
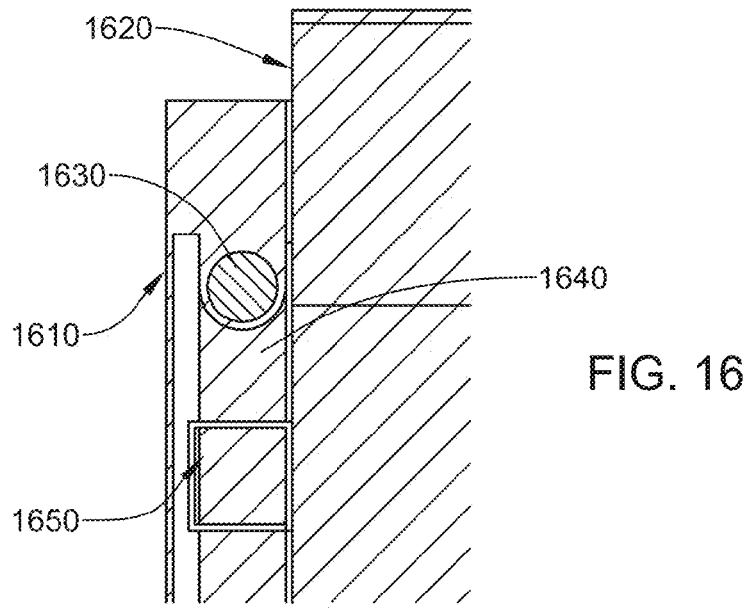
FIG. 16 is a partial cross section of a side panel with rod and slider arrangement on an exemplary vehicle body to enable sliding of panels according to an alternate embodiment.

The panels herein can be mounted on a variety of alternate sliding systems. With reference to FIG. 16 a partial cross section of a panel 1610 that is functionally and aerodynamically similar to the above-described track-mounted structure of FIGS. 13-15 is shown. The panel 1610 is mounted on the side 1620 of a vehicle body using a plurality of spaced apart rods or dowels 1630 that extend generally parallel to each other and parallel to a font-to-back alignment of the body. The rods/dowels 1630 can be constructed of any acceptable material that is typically rigid, such as metal or durable plastic/composite. That are mounted between spaced-apart (in a front-to-back direction) upright frame members 1640 that are secured to the vehicle body side 1620 by appropriate fasteners, welding adhesives, and the like. The spacing between spaced-apart frame members can be selected to provide a desired sliding distance to the panel for deployment and retraction. Typically the spacing allows for at least enough slidable travel to allow the extending portions of the panels to move from a fully deployed to a fully retracted (at or past the edge of the door frame) position. As shown, a channel rib 1650 forms the body-adjacent portion of the panel into a convex shape for enhanced aerodynamics and space to accommodate the sliding mechanism, as also generally described above (FIGS. 13-15).

Figure 17:
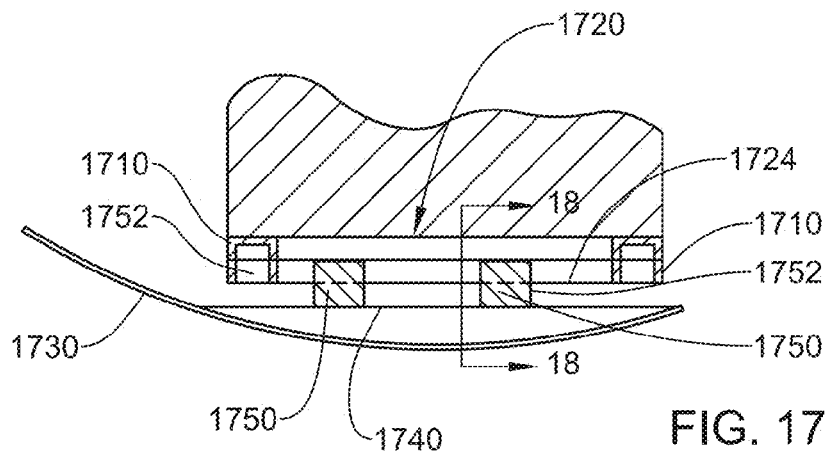
FIG. 17 is a partial top view of an exemplary vehicle body with the side panel with rod and slider arrangement of FIG. 16.
Figure 18:
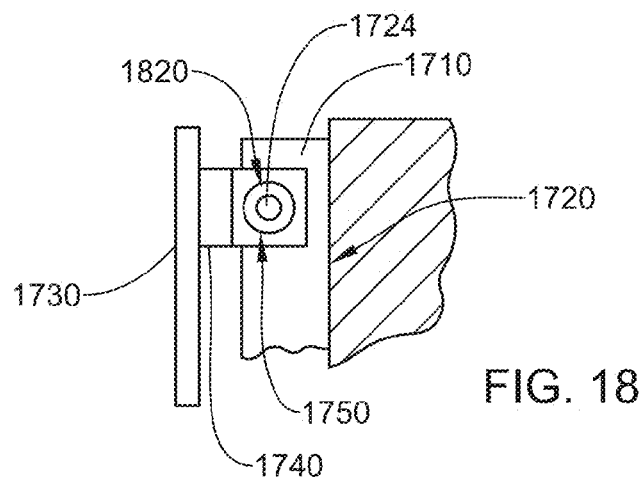
FIG. 18 is a partial cross section of the vehicle body, panel, rod and slider arrangement taken along line 18-18 of FIG. 17.
Figure 19:
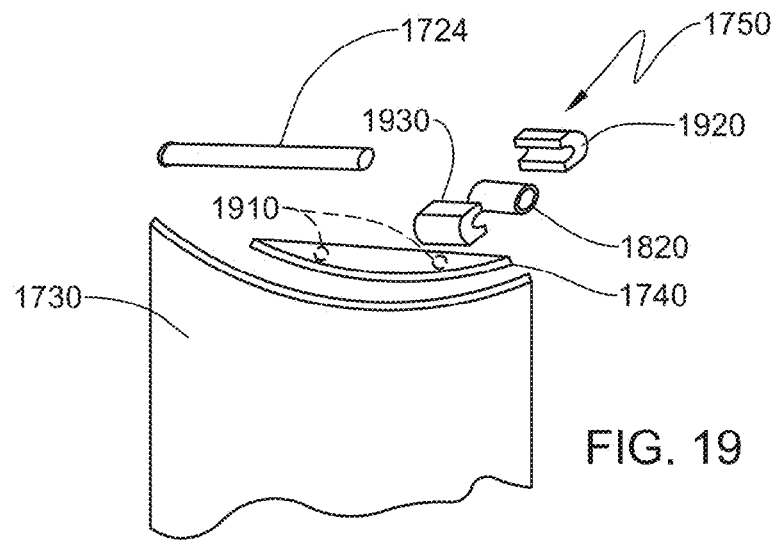
FIG. 19 is an exploded view of the panel, rod and slider arrangement of FIG. 17.

With further reference to FIGS. 17-19 the construction of the above-described rod/dowel-based sliding mechanism is shown in further detail. The upright (vertical) frame members 1710 are secured to the side 1720 of the vehicle body by an appropriate fastening system. They support a plurality of orthogonally mounted (parallel) rods/dowels 1724 in a manner that maintains them rigidly at a predetermined spacing with respect to the vehicle body side. The rods 1724 can be spaced at a constant distance from the side 1720 or at an angle so that the panel 1730 moves away from the side as it retracts to provide further clearance for the extending portions from the door frame. The panel 1730 is mounted on a plurality of convex ribs 1740. The inner surface of each of the ribs 1750 is attached to one or more sliders 1750. The sliders 1750 are positioned at spaced-apart locations along the rod 1724 in which the outermost edge 1752 of each outermost slider 1750 is positioned to allow for sufficient deploy and retract travel between the opposing upright frame members 1710, which act as limit stops in both travel directions. Note that the upright frame members 1710 need not extend the entire length between rods 1724, but can be short mounting members in various embodiments. Also, while not shown, the ribs 1740 can include tie rods (see dashed circles 1910 in FIG. 19), or other structures attached therebetween to provide a more rigid interconnection. This prevents deformation of the relatively thin skin of the panel 1730.

As shown in the partial cross section of FIG. 18 and exploded view of FIG. 19, the sliders 1750 are illustratively constructed of two clamping blocks 1920 and 1930 that can be secured around a cylindrical sliding bearing 1820 to facilitate low friction movement with respect to the rod 1724. In an embodiment, the bearing 1820 can be a sleeve or bushing constructed from a durable and low-friction material such as Teflon or Delrin polymer. It can be constructed from a metal such as bronze, or another low-friction material, such as graphite. The slider blocks 1920, 1930 can be fastened together in a clamped arrangement with screws or bolts/nuts and the assembly can be attached by fasteners to the rib 1740 or another portion of the panel 1730. The rod can have a different cross section, such as square, polygonal or ellipsoid. The bearing's inner surface is shaped to conform to the rods outer shape with appropriate gap clearance to avoid binding as the system weathers. More generally, components of the system can be constructed from corrosion-resistant materials. Also, while the bearing 1820 is a sliding fully surrounding sleeve, in alternate embodiments it can comprise a ball bearing slider or a split sleeve. A variety of other slider and guide assemblies can be implemented in accordance with skill. The guides along which the sliders slide can be parallel to the body side, a non-parallel angle, or a curved profile. Also, while each rod carries two-spaced-apart sliders in this embodiment, a larger number can be employed or a single, sufficiently long slider can be substituted.

Figure 21:
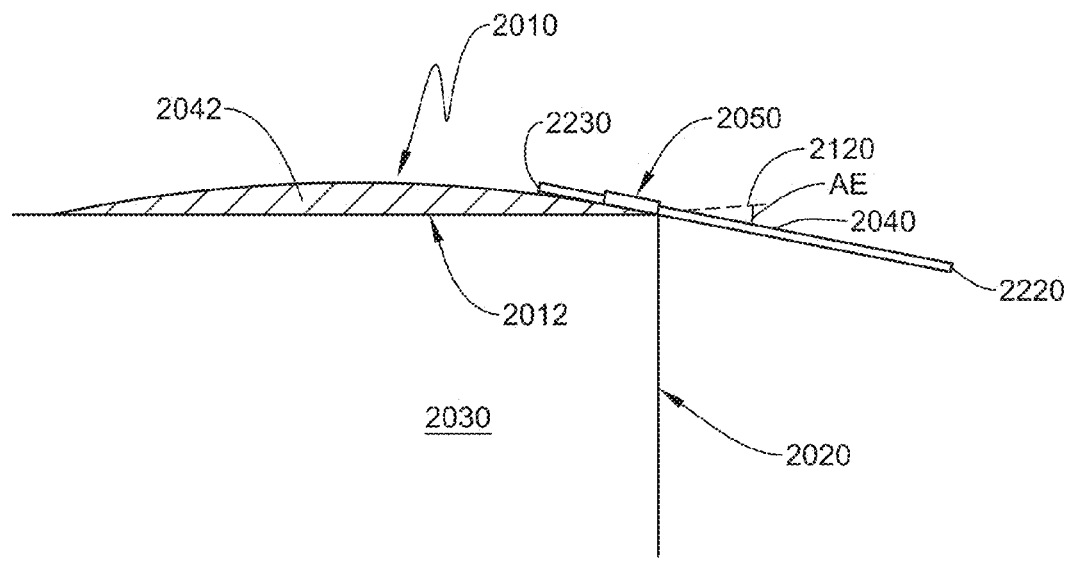
FIG. 21 is a partial side view of the exemplary vehicle body and top panel of FIG. 20 in a deployed orientation.
Figure 22:
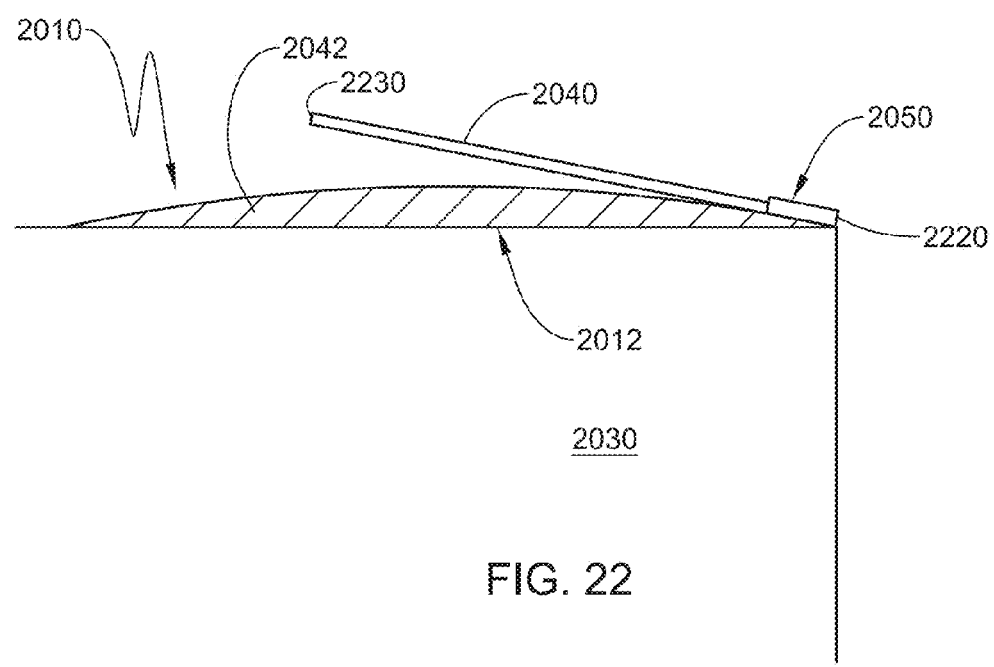
FIG. 22 is a partial side view of the exemplary vehicle body and top panel of FIG. 20 in a retracted orientation.

With reference now to FIGS. 20-23, a "two-piece" fairing panel arrangement is shown in further detail with exemplary reference to a panel assembly 2010 that is illustratively mounted to the top side 2012 of the vehicle body 2030, but can be provided similarly to each side. This assembly 2010 provides a mounted panel extension 2040 that slidably extends past the rearmost plane (door frame) 2020 of the vehicle body 2030 and is slidably mounted to a contoured panel 2042 that is fixedly mounted to the surface (top or side) of the vehicle body 2030 just forward of the rearmost plane 2020 of the body 2030. The rigid panel extension 2040 is illustratively mounted in a sliding track or guide assembly 2050 mounted on the contoured "body-affixed" panel 2042 allows for the device to be fully retracted (FIG. 22) to become flush with the rearmost plane 2020 of the body (i.e. the rear edge 2220 is free of any extension beyond the door frame plane). The sliding panel 2040 allows for the extension 2040 to break the plane of the body when deployed (FIG. 21). That is, the extension 2040 defines an angle AE that extends below the side/top plane (dashed line 2120 in FIG. 21) so as to provide a desired inward taper for improved rear aerodynamic performance. In the retracted orientation, the front edge 2230 is located remote and above the contoured panel where it is placed out of the way of the loading dock door (or other adjacent structure) for loading and unloading. Since the extension 2040 is adapted to be deployed at speed, the aerodynamic drag created by this retracted arrangement does not affect vehicle performance. Moreover, it is contemplated that flaps and other devices can be adapted to use drag to maintain the extension 2040 in a deployed state at speed. Note that various extension and retraction mechanisms for use with any of the panels herein are described further below.

Figure 23:
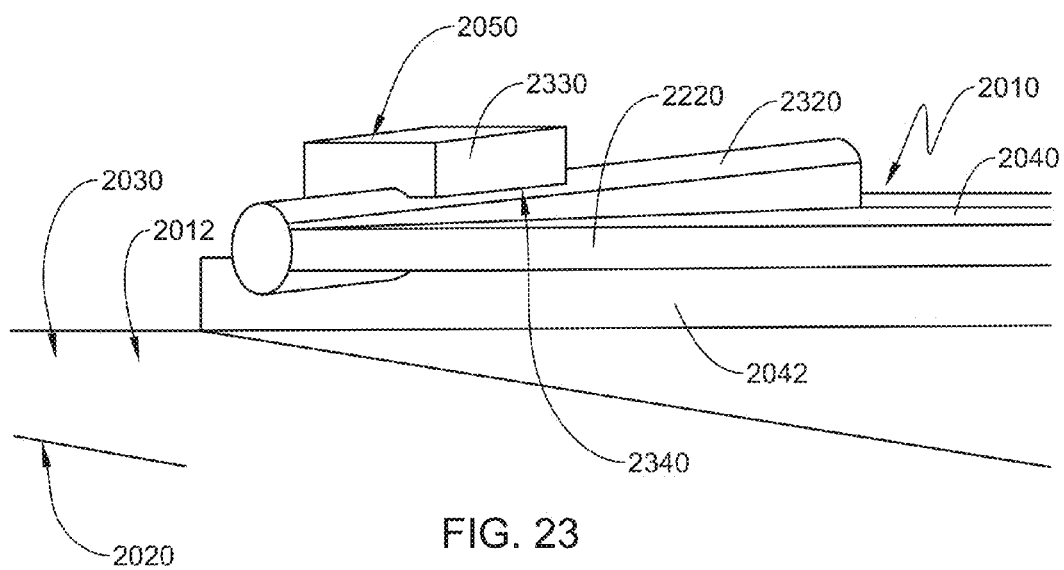
FIG. 23 is a partial perspective view of the exemplary vehicle body and top panel of FIG. 20 in a retracted orientation detailing a rod and guide block assembly.

In an illustrative embodiment, and with further reference to FIG. 23 the sliding track or guide assembly 2050 that allows the extension 2040 to deploy and retract with respect to the contoured panel 2042 in the assembly 2010 includes a rigid rod or other continuous shaft 2320 with a desired cross section shape mounted on a bearing block 2330 (or other guide assembly). In this embodiment, the rod/shaft 2320 is mounted on the side edge on each opposing side of the extension 2040. The rod/shaft can be formed unitarily or integrally with the panel portion of the extension 2040. The bearing block 2330 can define a sleeve or bushing, or another structure, such as a linear guide bearing within which the rod 2320 can slide. The rod can include stops (not shown) at opposing ends that prevent overextension. The bearing block 2330 in this embodiment defines a C-cross-section with an inwardly facing slot 2340, which provides clearance for the panel.

Having described some general implementations of a fairing assembly with panes that retract and deploy along a generally a front-to-back alignment, reference is now made to FIGS. 24-29 that depict the performance of the semi-rigid, but elastically flexible, extending panels according to illustrative embodiments herein.

Figure 24:
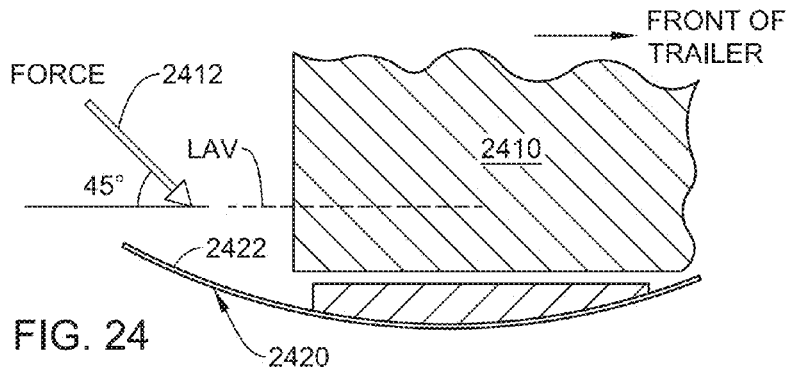
FIGS. 24 and 25 are partial top views of a side panel according to an illustrative embodiment and exemplary vehicle body, respectively showing geometry of the rear aerodynamic extension or the panel before and after application of an approximately 45-degree, outwardly directed, off-longitudinal-axis force thereto.
Figure 25:
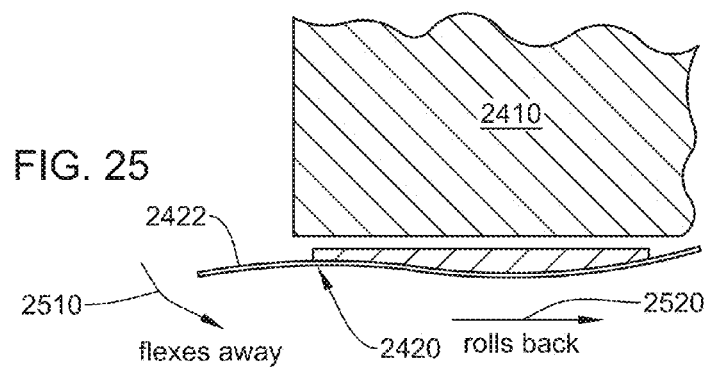

As shown in FIG. 24, the rear of the exemplary vehicle 2410 is engaged by a force (vector arrow 2412) that is off from the direction of the longitudinal-axis (dashed line LAV parallel to the vehicle's longitudinal axis). The extending portion 2422 of the retractable (one-piece) panel 2420 is contacted by the force (applied, for example by contact with an obstruction during a backing maneuver), causing it to flex outwardly (arrow 2510) as shown in FIG. 25. Part of the biasing force is translated into a forward vector (arrow 2520) that causes the panel to retract in part. As described below, the forward biasing force can be applied against a spring that normally biases the panel 2420 into a deployed orientation as shown in FIG. 24. The panel skin is constructed from an appropriate material, having an appropriate thickness, to allow the extending portion to maintain its inwardly tapered shape at highway speed, but to elastically deform (i.e. free of permanent deformation). A variety of polymeric and composite materials can be used to provide the desired characteristics. In general, such materials define a sheet thickness between approximately $\frac{1}{16}$ and $\frac{1}{4}$ inch, but other dimensions are expressly contemplated. In general, the material characteristics of the panel allow it to elastically flex and retract under such biasing loads, while more-rigid panels would typically plastically deform and fail.

In general, the performance of the sliding panel structures according to the various embodiments described above is enhanced by a plurality of design considerations. In general, the sliding arrangement (tracks, rollers, rods, sliders, slider bushings, etc.) provide a relatively low-friction sliding action, such that the sliding arrangement's force of friction (resistance to sliding) from off-longitudinal-axis forces is significantly less than the force to buckle and/or bend other components (slider, bushing, vehicle body skin, panel material, etc.). The sliding panel's rollers and/or bushings are also constructed and arranged to isolate motion of system to motion parts and limit compliance. Likewise the material used to form the extension or winglet translates off-longitudinal axis forces directly to motion parts. Additionally, where a deployment biasing spring or other mechanism is employed (described further below), it desirably provides approximately zero loading force to the panel in the longitudinal/rearward direction at position x=0 (fully deployed) to promote motion along motion axis.

Figure 26:
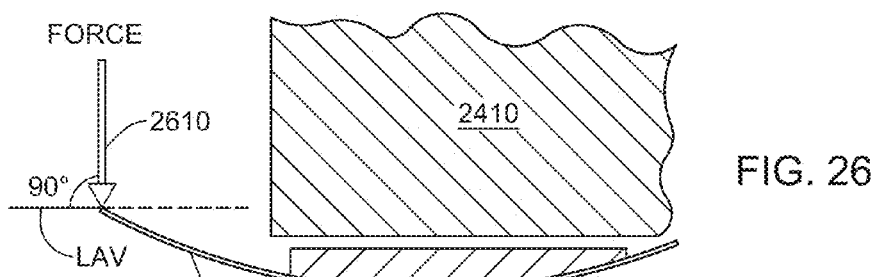
FIGS. 26 and 27 are partial top views of a side panel according to an illustrative embodiment and exemplary vehicle body, respectively showing geometry of the rear aerodynamic extension or the panel before and after application of an approximately 90-degree, outwardly directed force thereto.
Figure 27:
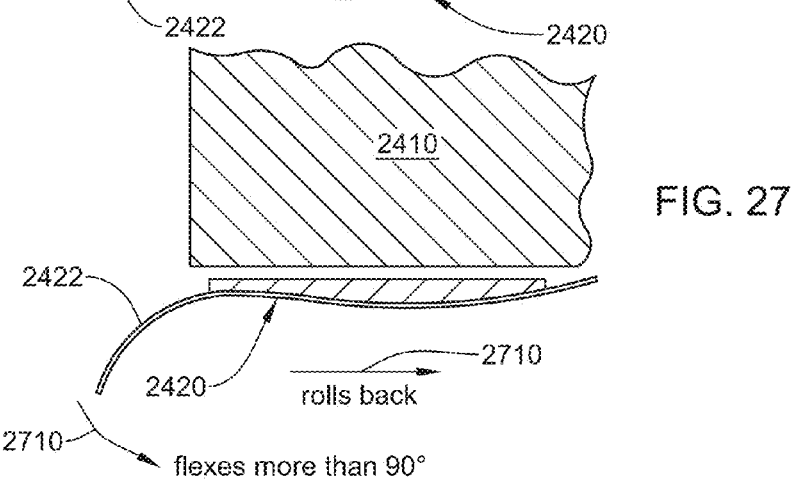

Reference is now made to FIG. 26, which shows the response of the panel 2420 to a force (vector arrow 2610) that is directed outwardly at an approximate right angle to the longitudinal axis LAV. As shown in FIG. 27, the panel's extending portion 2422 responds to such a force by flexing outwardly, potentially more than 90 degrees (curved arrow 2710), and the panel assembly 2420 absorbs a portion of the force imparted on the portion 2422 by resolving the motion into a retraction motion vector (arrow 2720), which causes forward sliding of the panel. Once the force is removed, the panel returns to its inwardly tapered shape.

With reference now to FIG. 28, the panel 2420 encounters an inwardly directed force of between approximately 45 and 90 degrees (vector arrow 2810), such as would occur is the vehicle backed into a tree, sign post or engaged a loading dock at a non-right-angle with respect to the longitudinal axis. As shown by the panel's response in FIG. 29, the extending portion 2422 flexes inwardly (arrow 2910), potentially to the plane of the door frame/body rear 2920. The force in this scenario is absorbed by the panel material, free of any sliding by the slide components.

The panel can be constructed in whole or in part from a transparent sheet material (typically a durable, transparent polymer). An advantage of such a material is that is allows lighting to be transmitted therethrough. As shown in FIG. 30, a one-piece or two-piece top panel assembly 3010, mounted on the top side 3020 of a vehicle body, includes an extension/winglet 3030 in a deployed orientation, where it tapers downwardly to partially obscure the lighting positioned along the top edge of the door frame 3050. Because the material of the extension/winglet 3040 is transparent (at least in the region of the lights 3040), the lights remain visible through the material, alleviating potential regulatory issues from obscuration of lights. Similar materials can be used along other sides to allow a clear view of lights and other structures—for example vehicle graphics, license plates, etc. An exemplary material that can be used to form a transparent (or opaque) flexible, yet stiff, panel is high-strength polycarbonate having a thickness of approximately 1/16-1/4 inch.

Figure 31:
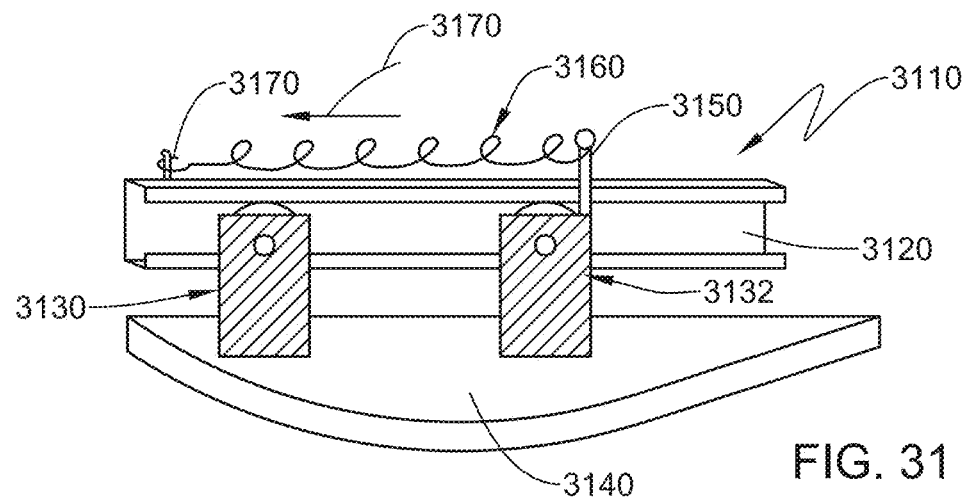
FIG. 31 is a side view of a track and roller assembly of a retractable aerodynamic one-piece aerodynamic fairing including a tension spring to bias the panel; into a deployed orientation.

As described above, the sliding panels can be constructed and arranged to be normally biased into a deployed orientation to ensure that the panels are of benefit during operation of the vehicle. However, to ease operation during loading and unloading, the panels are slidable against the deployment biasing force as they engage the surround of a loading dock door (or other appropriate loading/unloading structure) during a vehicle backing maneuver. As shown in FIG. 31, an illustrative slider assembly 3110 using a version of the above-described track 3120 attached to the vehicle body and roller assemblies 3130, 3132 attached to an illustrative, convex forming rib 3140 of the panel assembly. In this embodiment, the frontmost roller assembly 3132 includes a mounting 3150 that attaches to an end of a tension spring or similar actuator 3160. The opposing end of the spring 3160 is fixed to a base 3170 on the vehicle body or the track 3120 (which is also fixed with respect to the body). The spring thereby stretches to exert a predetermined biasing force (arrow 3170) on the roller assembly when in the retracted orientation. This force is reduces to approximately zero upon deployment based on the spring's geometry (e.g. it is approximately fully compressed upon panel deployment). The tension spring or other actuator can be any acceptable spring assembly including a metal coil spring, an elastomeric shock cord, an elastomeric band, a gas spring, a hydraulic spring and the like. The spring can include a conventional damper component such as a dashpot (not shown) that is separate, or can include an internal damping characteristic (i.e. a gas spring).

Figure 32:
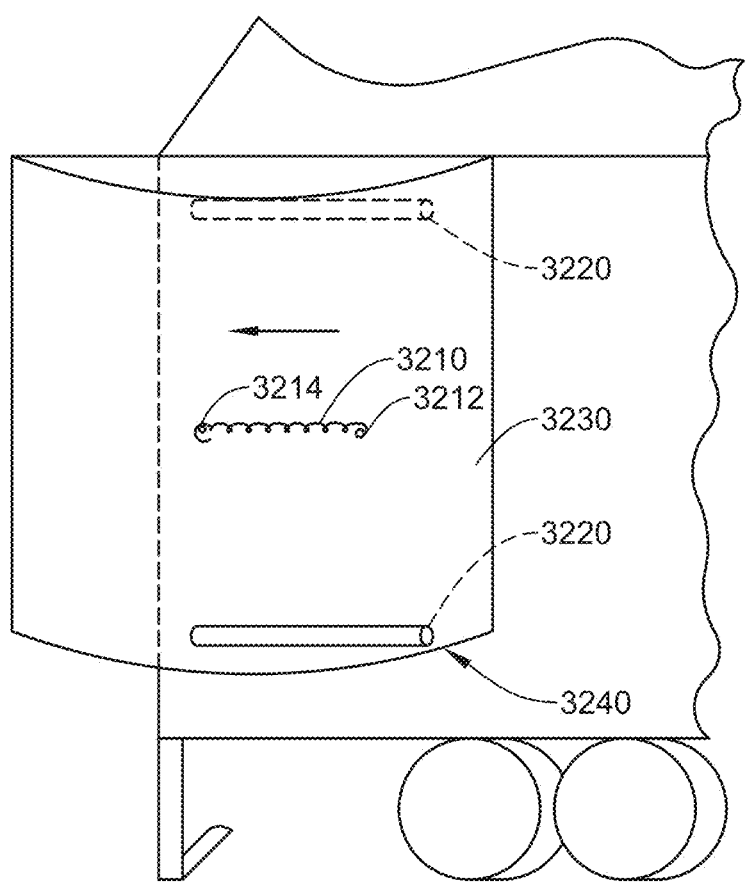
FIG. 32 is a partial side perspective view of a one-piece panel biased by a tension spring into a deployed orientation with an extending portion positioned beyond the plane of the body door frame/rear.

The spring can be mounted at any location that bridges the panel assembly and the vehicle body. Likewise multiple springs can be employed (e.g. a spring provided with each slider assembly). As shown in FIG. 32, a tension spring 3220 includes opposing ends 3212 and 3214, respectively attached to the interior surface of the panel 3230 and the side 3240 of the vehicle at a location along the vertical height of the body (or along the body width in the case of a top panel) between a pair of uppermost and lowermost slider assemblies 3220 (shown in phantom). A variety of other placements are expressly contemplated. Note also that, while a track and roller slider assembly is shown and described in conjunction with the illustrative spring/actuator, it is expressly contemplated that the spring/actuators described herein can be used in conjunction with any acceptable slider assembly including the above-described rod and sleeve/bushing arrangement. Likewise, a plurality of spring/actuator assemblies can be located along the vertical height or width of the body. In addition, this spring/actuator arrangement can be adapted to operate with a two-piece design by providing appropriate mountings that allow one or more springs to be mounted between the body/body-affixed panel and the sliding extension/winglet.

In further alternate embodiments, a winding spring (not shown, but similar to a conventional tape measure mechanism) can be used to bias the panel. The free end of the spring assembly is attached to one base and the winding mechanism is attached to another base. When deployed, the mechanism winds up, causing the extension to slide with respect to the body or body-affixed panel. Likewise, one or more compression springs can be employed to push the extension or winglet with respect to the body or body-affixed panel rearward into a deployed relationship. These compression springs can be mounted in accordance with techniques known to those of skill.

In any of the embodiments herein, which employ an actuator, such as a spring, a release mechanism (not shown) can be provided to allow the operator to disengage the actuator (for example, a latch) and manually move the associated panel to a retracted orientation. Various locking mechanisms (e.g. also a latch) can be used to lock a panel in a retracted orientation.

In addition to spring-based actuators, it is expressly contemplated that the panels can be moved between a retracted and deployed orientation using powered actuators of various types. FIGS. 33-35 depict three illustrative powered actuators for use with the various fairing and panel arrangements described herein. Each of these powered actuators can be electrically connected (or otherwise operatively connected) with an actuation switch/control in the vehicle cab or another location, and/or the powered actuators can be connected to a speed measurement device (e.g. the speedometer or a pitot tube). When the vehicle attains a speed at which the panels' aerodynamic effects can be beneficial, the powered actuator is directed to deploy by a control logic. Conversely, when the speed falls below a predetermined level—often indicative of loading or unloading or navigating a crowded area, the actuator is directed by the control logic to retract the panels. A timer can be included so that panels to not immediately deploy and/or retract due to a sudden speed change. This can avoid continuous cycling during start and stop driving. Also, the cab can be equipped with a switch to override the automated, speed-based deployment and retraction system.

As now shown in FIG. 33, a powered actuator assembly 3310 using an electric motor 3320 and a winch unit 3330 with appropriate gearing (not shown) selectively draws in and pays out a cable 3340. The free end 3350 of the cable can be attached to the sliding panel, while the motor and winch 3320, 3330 are attached fixedly to the body or a fixed member thereof (e.g. a track or rod assembly). In an embodiment, the cable 3340 is drawn in to a minimum extended length to move the panel forwardly into a retracted orientation while a spring (for example, described above), biases the panel into a deployed orientation when the cable 3340 is paid out to a maximum extended length. The arrangement of the cable and spring can be reversed, with the spring biasing the panel into a retracted orientation and the cable 3340 drawing the panel into a deployed orientation. The former arrangement (bias-into-deployment) is advantageous in that the panel is still free to retract under external force (e.g. FIGS. 24-29) if needed. The cable 3340 goes slack when the panel retracts under such "emergency" circumstances.

With reference to the powered actuator assembly 3410 of FIG. 34, the electric motor 3420 powers as lead-screw shaft 3422, whose external threads engage mating internal threads of a block 3430 so that rotation (double curved arrow 3440) translates into linear motion (double arrow 3450). The block can be attached to the sliding panel (for example a rib), while the motor 3420 can be fixedly mounted to the body or a fixed component thereof. An opposing bracket 3460 (shown in phantom) can be mounted on the free end (opposite the motor 3420) of the shaft 3422. This can provide lateral stability and allow the shaft to be used in substitution for at least one of the slider assemblies. In an embodiment, a plurality of slider assemblies can be substituted for the actuator assemblies 3420 so as to provide fully motorized sliders. Alternatively one or more actuator assemblies 3410 can be located remote from the slider assemblies for a given panel.

Another actuator assembly 3510 is shown in FIG. 35. The electric motor 3520 in this embodiment rotates (double curved arrow 3530) a sprocket/pulley 3540 that drives one or more chains, belts or cables 3550. The chain/belt/cable 3550 extends to a sprocket, spur gear or wheel 3560 that drives a linear rack 3570 adjacent the top or bottom (or outer widthwise edge) of the panel. This rack can be connected to a slider track and to the panel assembly to allow it to deploy and retract based on rotation of the motor 3520.

In alternate embodiments it is expressly contemplated that such powered actuators can include linear pneumatic or hydraulic actuators of conventional design or pneumatic/hydraulic rotary motors of conventional design. Linear motors are arranged to apply a direct linear motion to the sliding panels, while rotary motors can operate in a manner similar to each of the electric motors described above (i.e. FIGS. 33-35).

OEM Integration

Reference is now made to FIGS. 36-39, showing an aerodynamic structure that is OEM (Original Equipment Manufacturer) integrated into the cargo body, according to an illustrative embodiment. As shown in FIG. 36, the OEM-integrated aerodynamic structure is incorporated within the cargo body 3600. The aerodynamic structure includes a top panel 3610 and a first side panel 3612 and an opposing second side panel 3614. As shown in FIG. 36, the panels 3610, 3612 and 3614 are built into the end caps of the trailer cargo body 3600 such that, when fully deployed, the panels extend from the cargo body. Refer to FIG. 39 for a more detailed view of the end caps and panel arrangement. As shown in the top view of FIG. 37, the deployed side panels taper slightly inwardly to provide the desired aerodynamic efficiency to the cargo body 3600. Once retracted, as shown in FIG. 38, the side panels 3612, 3614 are fully stored within end caps of the cargo body 3600. According to the illustrative embodiment, the panels each respectively move between a retracted position substantially free of interference with a rear edge of the vehicle body and a deployed position extending rearwardly beyond the rear edge to define at least a partial aerodynamic cavity.

In an illustrative embodiment, as shown in FIG. 36, the OEM-integrated aerodynamic structure can include a cable support system to provide additional support for the panels once deployed. In accordance with the cable support system, the top panel is secured by cables 3620, 3621 to the cargo body 3600, and the side panels 3612 and 3614 are secured to the cargo body 3600, respectively, via cables 3622, 3623 and 3624, 3625.

Referring to FIG. 39, a partial top cross-sectional view of the deployed side panel 3614 is shown, detailing the elements of the OEM-integrated aerodynamic structure. As shown, the slider assembly 3910 is built into and disposed within the trailer end cap 3915. The end caps 3915 of a cargo body are typically hollow and comprise an extruded metal, such as aluminum or steel. The side panel 3614 is secured to the slider assembly 3910 via an appropriate securing mechanism 3920, such as a wedge and associated bolt, or other securing mechanism known in the art. A roller 3925 is provided to assist in the movement of the side panel 3614 into and out of the trailer endcap 3915, by aiding the panel in traversing the corner of the trailer endcap. A gasket 3930 can be secured to the trailer at a trailer-mounted end 3931 and flexible at another free end 3932 that contacts the panel 3614 to provide the desired protection and sealing for the end cap 3915. The gasket 3930 prevents dirt, grime, water and other potentially harmful elements from entering the trailer endcap 3915.

Linkage Mechanism for Top Panel

Figure 40:
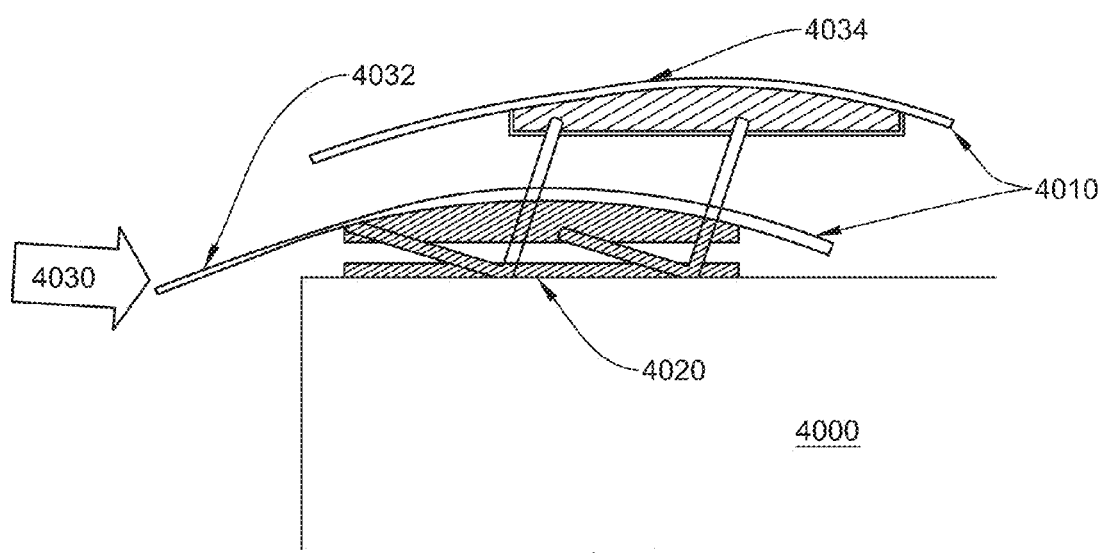
FIG. 40 is a partial side perspective view of an aerodynamic structure mounted to a top surface of a cargo body, employing a four-bar linkage, according to an illustrative embodiment.

Reference is now made to FIG. 40, showing a partial side perspective view of an aerodynamic structure mounted on a top surface of a cargo body 4000, according to an illustrative embodiment. A top panel 4010 is mounted on a four-bar linkage 4020 that is biased by gravity, a spring, or other actuator force into the deployed position (not shown but refer to FIGS. 46-49 and the corresponding description hereinbelow of a spring or powered actuator mechanism applicable herein). When a pressure is exerted on the back edge (for example, via arrow 4030) the top panel 4010 moves from the deployed position 4032 to the retracted position 4034. The spring or actuator mechanism is biased so as to cause the top panel 4010 to return to a deployed position 4032 once the force 4030 is no longer exerted on the top panel 4010. In further embodiments, the four-bar linkage 4020 can have a spring or actuator mechanism incorporated therein to provide the desired bias of the panel into a deployed position. In further embodiments not shown, the four bar linkages 4020 could be designed to not rotate to or past vertical, so that gravity alone would bias the panel back into the deployed position once the force 4030 is no longer exerted on the top panel 4010.

Retractable Aerodynamic Structure Including Flexible Retractable Panels

Figure 41:
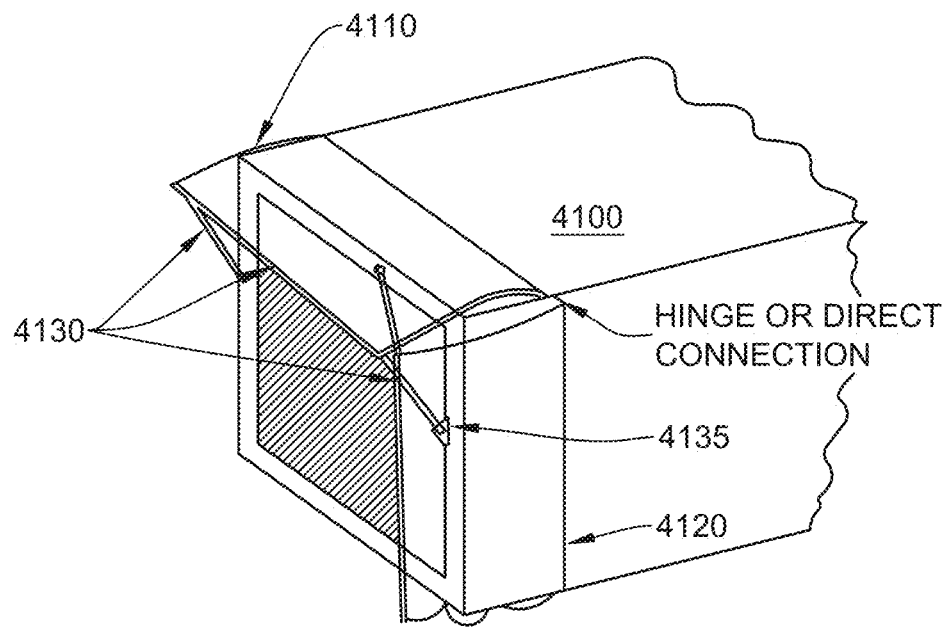
FIG. 41 is a partial rear perspective view of a retractable aerodynamic structure mounted on a cargo body and having a support frame, with the panels shown in the deployed position, according to an illustrative embodiment.
Figure 42:
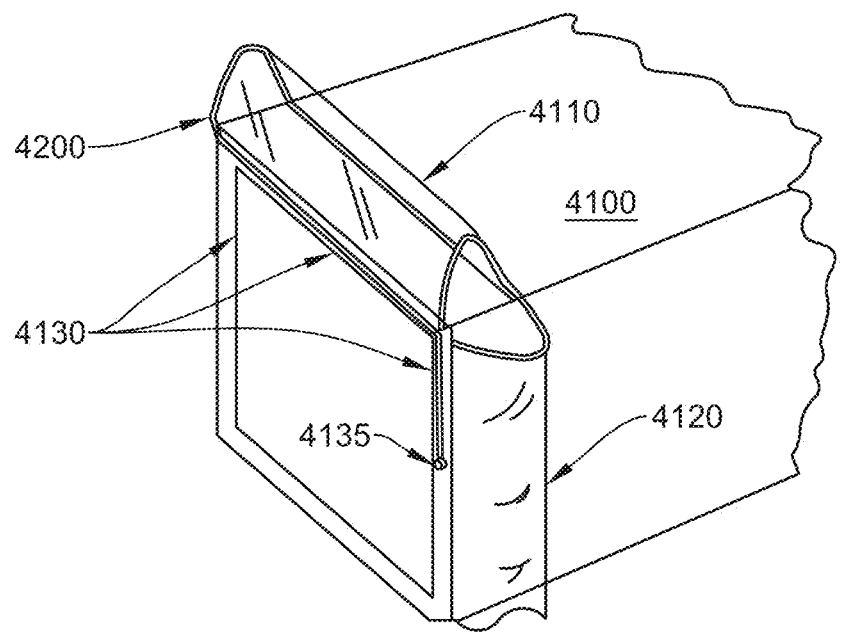
FIG. 42 is a partial rear perspective view of the retractable aerodynamic structure of FIG. 41, with the panels shown in the retracted position, according to the illustrative embodiment.

Reference is now made to FIGS. 41-53, detailing various illustrative embodiments for retractable aerodynamic structures having flexible panels. Reference is made to FIGS. 41-43 showing partial rear perspective views of a retractable aerodynamic structure mounted on a cargo body 4100 and having a top panel assembly 4110 and a side panel assembly 4120, secured to the cargo body 4100 by a frame member 4130. The panels 4110 and 4120 comprise a flexible material, such as fabric or plastic, and can comprise a polycarbonate material according to an illustrative embodiment. In an illustrative embodiment, the panels have a thickness of approximately 1/16 inch to 1/4 inch. The panels, in the deployed position as shown in FIG. 41, extend approximately 16 inches rearwardly beyond the trailing edge of the cargo body 4100 in an illustrative embodiment. In further embodiments, the panels can extend from approximately 12 inches beyond the trailing edge and up to approximately four or five feet beyond the trailing edge of the cargo body 4100. In an illustrative embodiment, the flexible panels can include a rigid member or stiffener along the trailing edge to provide additional support for the panels when deployed.

As shown in FIG. 42, when a force 4200 is exerted on the panels, the frame 4130 swings about the pivots 4135, causing the panels 4110 and 4120 deform in a controlled manner to a non-obstructing retracted position. This is particularly useful for a cargo body that is being backed up to a loading dock, so that the panels automatically deform and retract out of the way during loading and unloading, and then deploy as desired once the force is no longer exerted on the aerodynamic structure. Although only one side panel is shown in FIGS. 41 and 42, a second side panel can also be provided to achieve a three-sided aerodynamic structure.

The retraction and deployment of the top panel 4110 is shown in greater detail in FIGS. 43-45. The leading edge 4300 of the top panel 4110 is positioned forward of the rear plane 4310 of the cargo body 4100 such that, when the panel is retracted (as shown in FIG. 45), the curvature 4500 occurs forward of the rearmost plane 4310 of the cargo body. This further prevents damage to the panels or support mechanism or the cargo body itself. In an illustrative embodiment, the leading edge 4300 of the top panel is secured approximately eight inches forward of the rear plane 4310, and can be secured from approximately 4 inches up to 12 inches from the rear plane 4310, to allow for curvature of the panel.

Automatic Deployment Springs/Actuators

Figure 46:
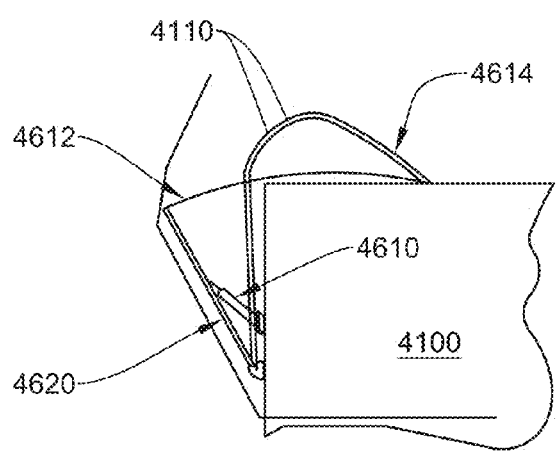
FIG. 46 is a partial side view of a gas spring assembly operatively connected between a top panel and the cargo body, according to an illustrative embodiment.
Figure 47:
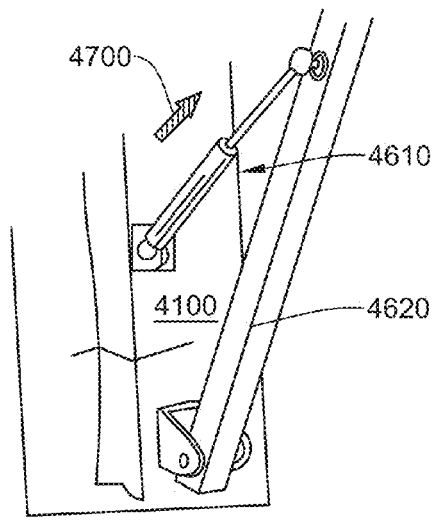
FIG. 47 is a more detailed view of the gas spring assembly of FIG. 46, according to the illustrative embodiment.

Reference is now made to FIGS. 46-49 showing the automatic deployment springs and/or actuators according to various illustrative embodiments for automatic deployment of the aerodynamic structures as shown and described herein. Although the biasing members (springs/actuators) are shown operatively connected between a top panel of an aerodynamic structure and the cargo body, the biasing members can be secured between any panel and the cargo body, as readily apparent to those having ordinary skill. As shown in FIG. 46, a gas spring 4610 is employed, according to an illustrative embodiment, to bias the top panel 4110 to a deployed position 4612 from a retracted position 4614. The gas spring 4610 can be replaced with a powered actuator in further embodiments, as readily apparent within ordinary skill. The gas spring 4610 is secured between the cargo body 4100 and the support frame 4620 to bias the panel 4110 into the deployed position 4612. As shown in greater detail in FIG. 47, the gas spring 4610 exerts a spring force 4700 on the frame 4620 to bias the panel into the deployed position.

Figure 48:
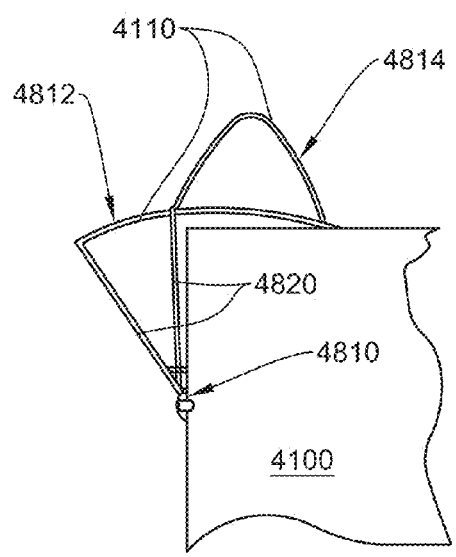
FIG. 48 is a partial side view of a torsion spring assembly operatively connected between a top panel and the cargo body, according to an illustrative embodiment.
Figure 49:
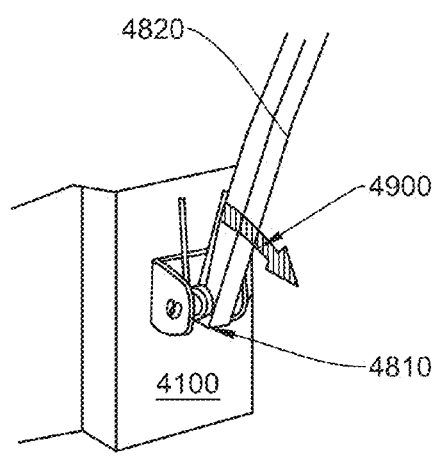
FIG. 49 is a more detailed view of the torsion spring assembly of FIG. 48, according to the illustrative embodiment.

A torsion spring assembly is shown in FIGS. 48-49, according to an illustrative embodiment, for biasing the panels into the deployed position. As shown in FIG. 48, a torsion spring 4810 is provided so as to bias the top panel 4110 to a deployed position 4812 from a refracted position 4814. The torsion spring 4810 can be replaced with a rotary actuator in further embodiments, as readily apparent within ordinary skill, to achieve bias of the panel. The torsion spring 4812 is secured between the cargo body 4100 and the support frame 4820. As shown in greater detail in FIG. 49, the torsion spring 4810 exerts a spring force 4900 on the frame 4820 such that the panel is biased into the deployed position 4812.

The torsion spring assembly and gas spring assembly as shown in FIGS. 46-49 are readily applicable to any aerodynamic structure shown and described herein that relies upon a biasing force to bias the panels into a deployed position. As should be clear within ordinary skill, the torsion spring assembly and gas spring assembly, in further embodiments, can comprise a powered actuator and a rotary actuator, respectively, in addition to other spring and/or actuator based assemblies known in the art.

Figure 50:
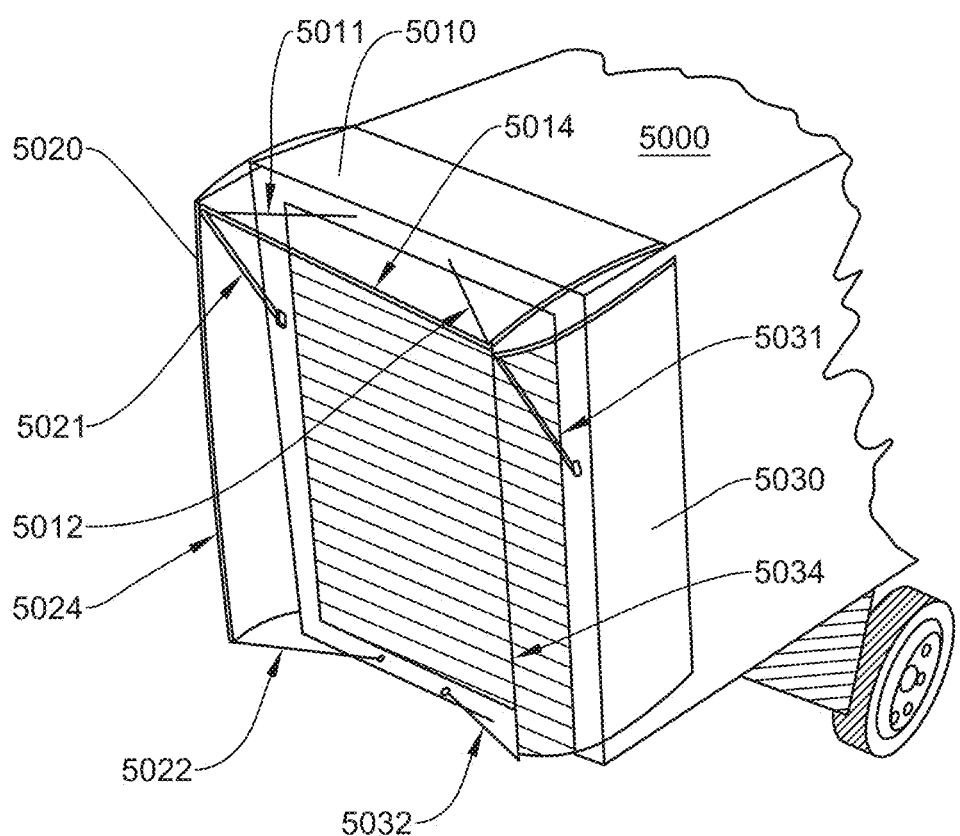
FIG. 50 is a partial rear perspective view of a retractable aerodynamic structure including a cable control system, according to an illustrative embodiment.

Retractable Aerodynamic Structure Including Flexible Panels and Cable Support System Reference is now made to FIG. 50 showing a partial rear perspective view of a retractable aerodynamic structure including a cable control system or other appropriate retaining assembly, according to an illustrative embodiment. The retaining assembly or cable control system engages a portion of the panels to maintain a predetermined aerodynamic shape against airflow thereover. The aerodynamic structure is mounted on a cargo body 5000 and includes a top panel 5010, a first side panel 5020 and a second side panel 5030. Top panel cables 5011 and 5012 connect the trailing edge 5014 of the top panel 5010 to the cargo body 5000. A first rigid stay and associated cable 5021 connects the trailing edge 5024 of the first side panel 5020 to the cargo body 5000, and a second rigid stay and associated cable 5031 connects the trailing edge 5034 of the second side panel 5030 to the cargo body 5000. Cable 5022 connects a lower portion of the trailing edge 5024 to the cargo body 5000 and cable 5032 connects a lower portion of the trailing edge 5034 to the cargo body 5000. The cable support system, comprising cables and/or stays 5011, 5012, 5021, 5022, 5031 and 5032, provides desired control of the geometry of the trailing edges 5014, 5024 and 5034 against prevailing counterforces associated with aerodynamic drag. The cable support system also provides desired support for the flexible panels 5010, 5020 and 5030. The geometry of the cables is such that their length corresponds to the radius of the natural arc of motion of the attachment point of the cable between the deployed and retracted positions. The geometry and mounting locations of the cables is also such that the cables do not sag or otherwise obstruct the loading envelope when the panels are in their retracted positions.

Structure of Side Panels

Figure 51:
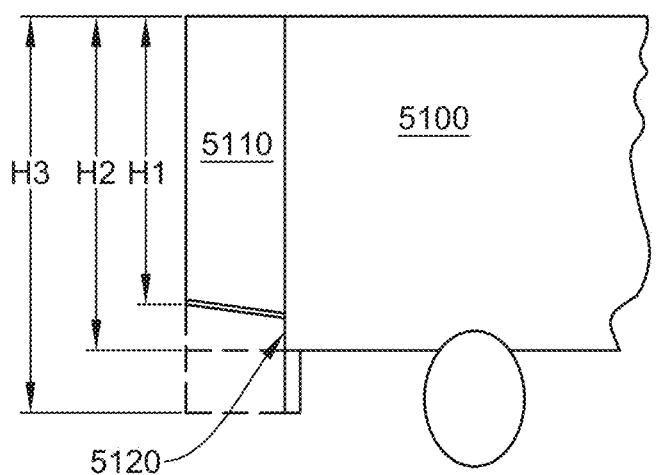
FIG. 51 is a partial side perspective view of a side panel and various heights thereof, according to the illustrative embodiments.

Reference is now made to FIG. 51 showing a partial side perspective view of a side panel and various associated heights thereof, according to illustrative embodiments. As shown, the side panel 5110 is secured to a cargo body 5100. According to an illustrative embodiment, the side panel 5110 has height H1 that is less than the height of the cargo body 5000, to allow for visibility of trailer lights 5120. This is particularly advantageous for a non-clear panel which would inhibit visibility of trailer lights if it extended along the entire height of the cargo body. In a further embodiment, the side panel 5110 has a height H2 that is approximately equal to the height of the cargo body 5000. In this embodiment, a portion, window, or all, of the side panel can be clear to allow for visibility of the trailer lights and other portions of the cargo body as desired. In still further embodiments, the side panel 5110 can have a height H3 that exceeds the height of the cargo body 5000. The side panel, having any height along the height of the cargo body, can include a clear portion or window or can be entirely clear along entire panel, to allow for visibility of the cargo door, trailer lights, or other portions or the cargo body as desired.

Figures 52, 53:
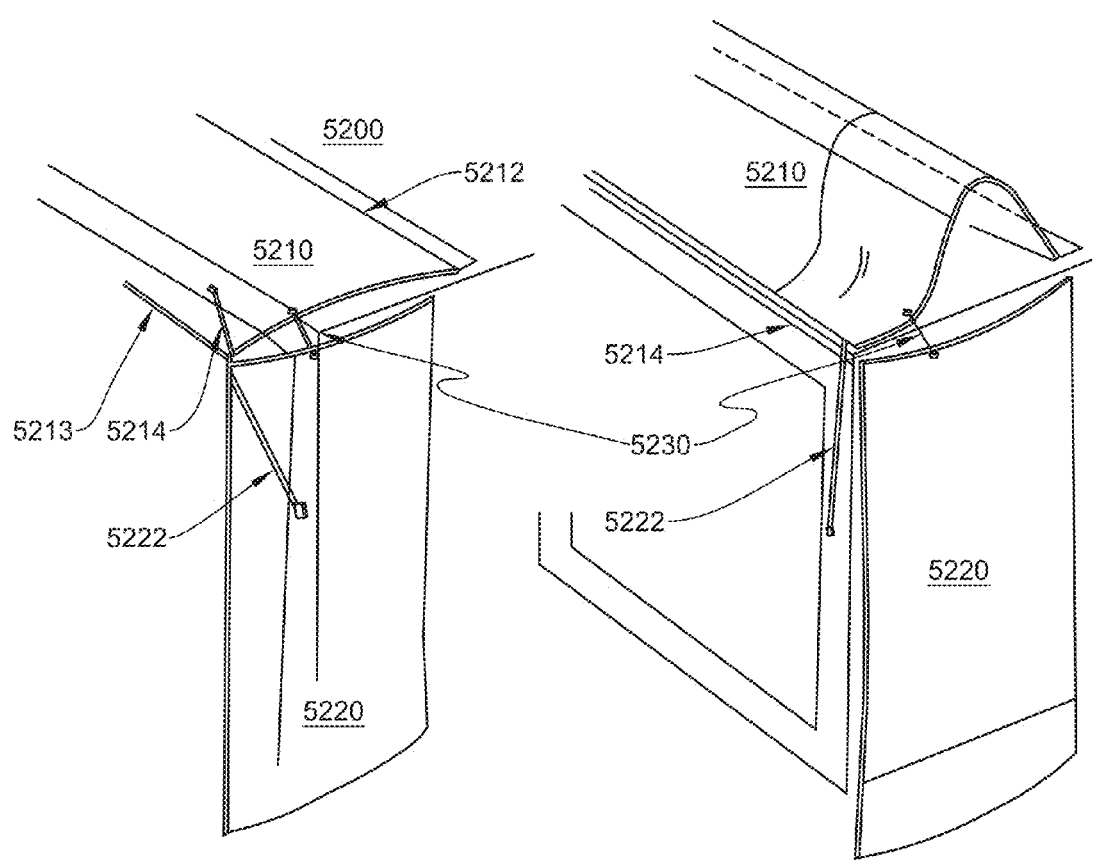
FIG. 52 is a partial perspective view of a retractable aerodynamic assembly including attachment members to control deformation of the panels, showing the panels in a deployed position, according to an illustrative embodiment.
FIG. 53 is a partial perspective view of the retractable aerodynamic assembly of FIG. 52, showing the panels in the retracted position, according to the illustrative embodiment.

Retractable Aerodynamic Structure Including Flexible Panels with Attachment Members Reference is now made to FIGS. 52 and 53 showing partial perspective views of a retractable aerodynamic structure having flexible panels and attachment members therebetween, according to an illustrative embodiment. As shown in FIG. 52, the cargo body 5200 has a top panel 5210 secured thereto at a hinge line 5212. The trailing edge 5213 of the top panel 5210 is secured to the cargo body by a cable 5214. A side panel 5220 is secured to the cargo body 5200 by a cable 5222. According to the illustrative embodiment, the top panel 5210 is attached to the side panel 5220 by appropriate attachment members 5230. The attachment members 5230 control the deformation of the panel 5210 as the panels 5210 and 5220 move from the deployed position shown in FIG. 52 to the retracted position in FIG. 53. The placement of the attachment members 5230 controls the deformation of the panel as they move between deployed and retracted positions.

Retractable Aerodynamic Structure Including Hinged Retractable Panel

Figures 54, 55:
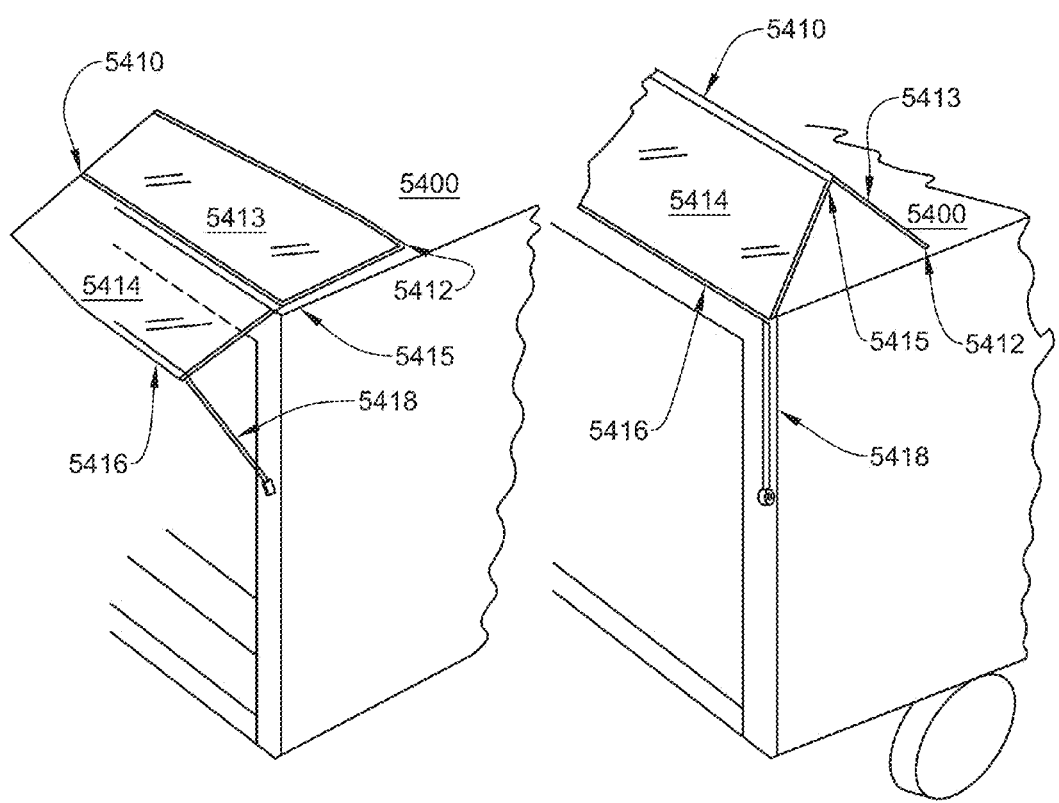
FIG. 54 is a partial rear perspective view of a hinged retractable panel structure mounted on a top of a cargo body, showing the panel in the deployed position, according to an illustrative embodiment.
FIG. 55 is a partial rear perspective view of the hinged retractable panel structure of FIG. 54, showing the panel in the retracted panel, according to the illustrative embodiment

Reference is now made to FIGS. 54 and 55 showing a partial rear perspective view of a retractable aerodynamic structure having a hinged retractable panel. As shown, the upper hinged panel 5410 is secured at a hinge line 5412 to the cargo body 5400. The upper hinged panel 5410 comprises a first upper panel 5413 hinged to the cargo body at hinge line 5412 and to a second upper panel 5414 at hinge line 5415. The second upper panel 5414 is secured at its trailing edge 5416 to a cable 5418. As the upper panel 5410 moves from the deployed position shown in FIG. 54 to the retracted position shown in FIG. 55, the upper panel 5410 hinges about hinge lines 5412 and 5415 to retract into the retracted position as shown in FIG. 55. In an illustrative embodiment, the second upper panel 5414 is separate from the first upper panel 5413 and is hinged at the hinge line 5415 therebetween, such that the panels fold and retract when the cargo body is backed into engagement with a structure, such as a loading area. The aerodynamic structure returns to the deployed position from the retracted position by use of a spring or powered actuator, such as the springs shown and described herein with reference to FIGS. 46-49. Although the hinged retractable panel in FIGS. 54 and 55 is shown on a top surface of the cargo body, it should be readily apparent that a similar structure could be employed for either, or both, of the side panels, as desired.

Retractable Aerodynamic Structure Including Fixed Nacelle

Figures 56, 57:
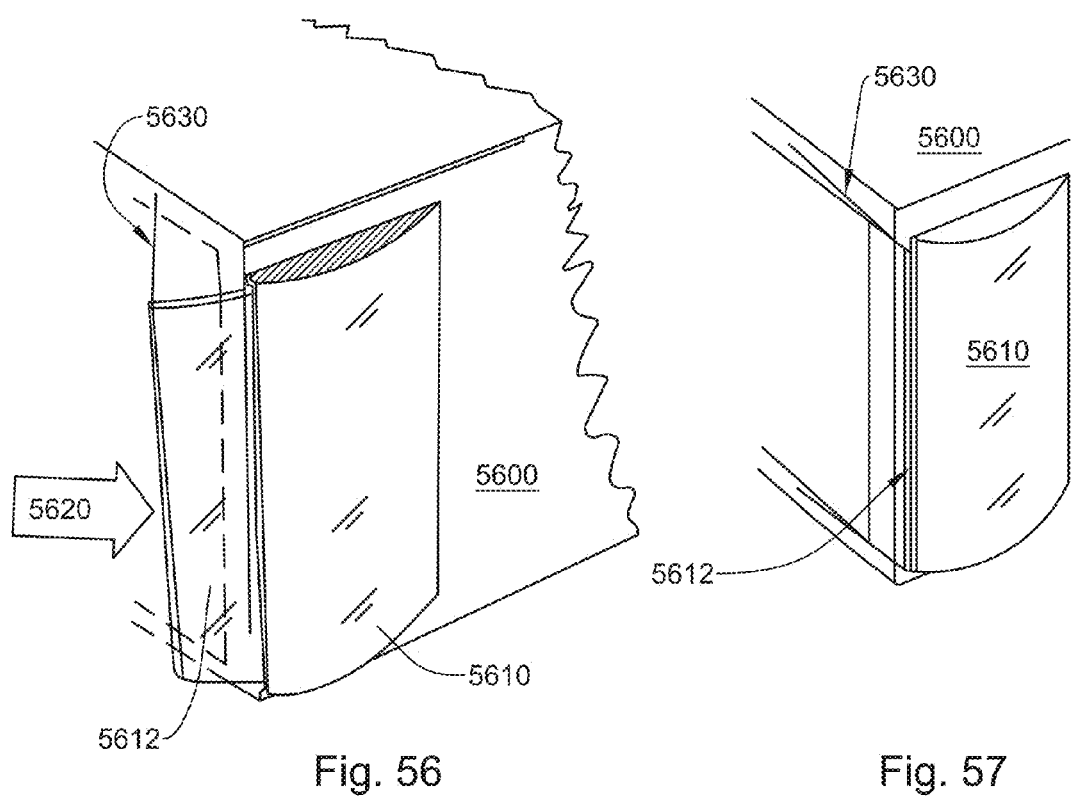
FIG. 56 is a partial rear perspective view of a side aerodynamic structure mounted on a side of a cargo body and comprising a fixed nacelle and associated side panel, with the side panel shown in the deployed position, according to the illustrative embodiment.
FIG. 57 is a partial rear perspective view of the aerodynamic structure of FIG. 56 showing the side panel in the retracted position, in which the side panel is stored in the nacelle, according to the illustrative embodiment.

Reference is now made to FIGS. 56 and 57 showing partial rear perspective views of a retractable aerodynamic structure mounted on a cargo body. As shown in FIG. 56, a fixed nacelle 5610 is mounted to a side of the cargo body 5600. Note that although a side fixed nacelle is shown, the fixed nacelle could be on a top or opposing side surface of the cargo body as readily apparent within ordinary skill.

In an illustrative embodiment, the fixed nacelle is constructed and arranged to secure the side panel 5612 therein when in the retracted position, as shown in FIG. 57. When a force 5620 is exerted on the side panel 5612 (for example, by the cargo body engaging a structure such as a loading area), the panel retracts within the fixed nacelle 5610, as shown in FIG. 57. Also note the cable 5630 provided to secure the rearward edge of the side panel 5612 to the cargo body, for additional support for the side panel when in the deployed position as shown in FIG. 56.

Collapsible Aerodynamic Fairing Assembly

Figure 58:
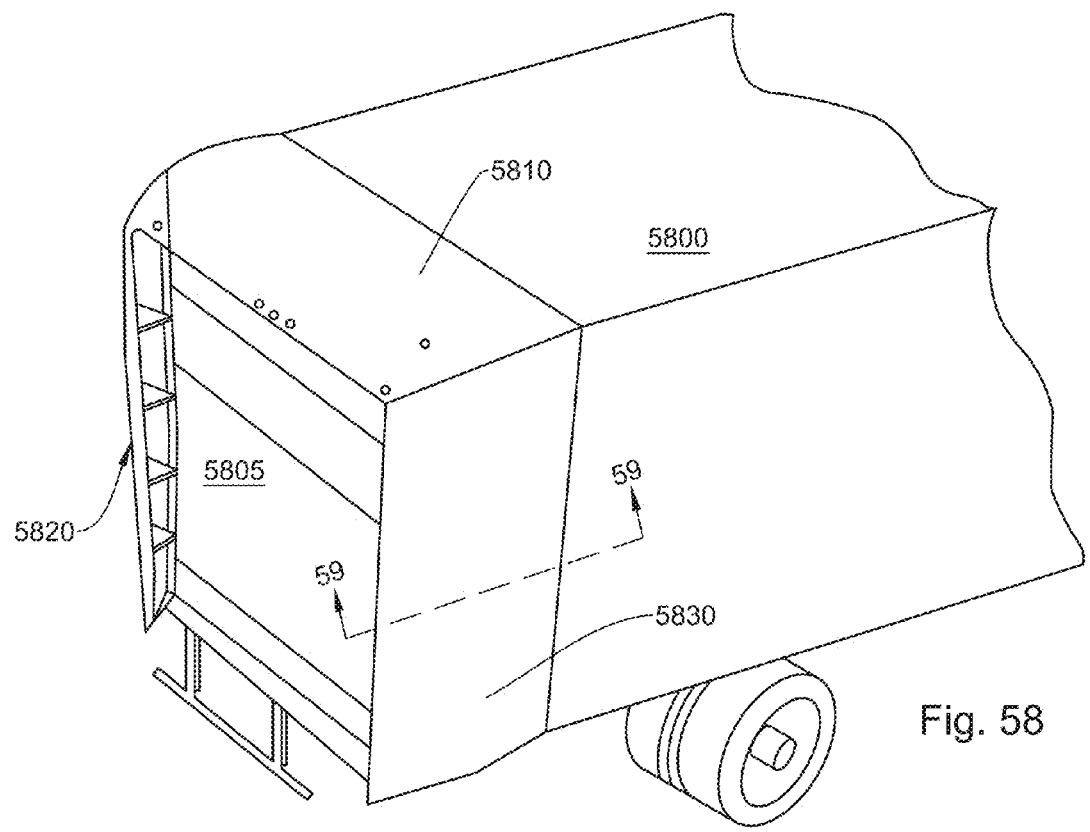
FIG. 58 is a partial rear perspective view of a permanent deformable device mounted on a cargo body and comprising a top and a pair of opposing sides, according to an illustrative embodiment.
Figure 60:
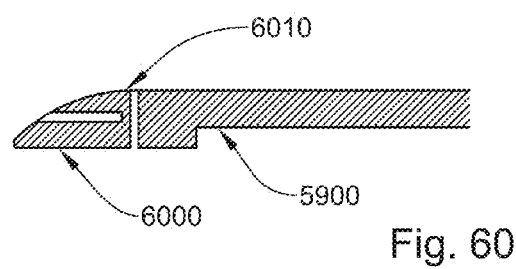
FIG. 60 is a partial cross-sectional view as taken across line 59-59 of FIG. 58, showing the deformable panel according to an illustrative embodiment in which the deformable panel is disposed rearward of the cargo body.
Figure 61:
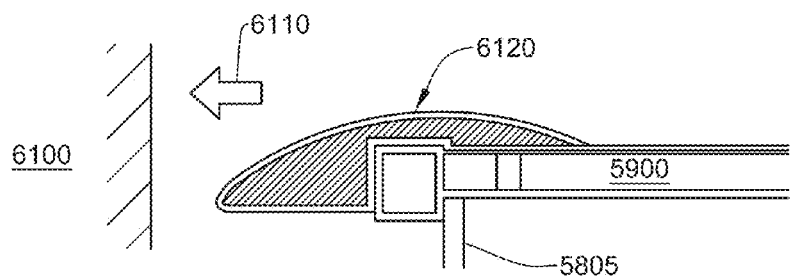
FIG. 61 is a partial cross-sectional view showing a foam panel assembly according to an illustrative embodiment.
Figure 62:
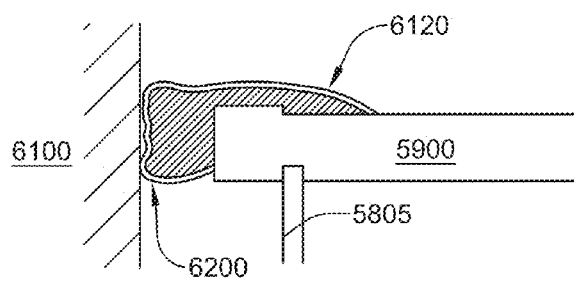
FIG. 62 is a partial cross-sectional view showing the foam panel assembly of FIG. 61 in the deformed configuration once force is exerted on the trailing edge of the foam panel assembly, according to the illustrative embodiment.
Figure 63:
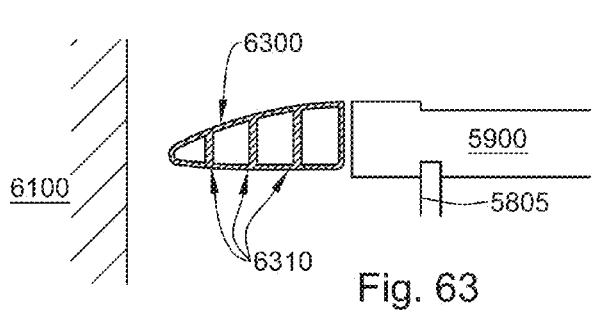
FIG. 63 is a partial cross-sectional view showing an extruded panel assembly including a plurality of carriers for stiffness of the panel assembly, according to an illustrative embodiment.
Figure 64:
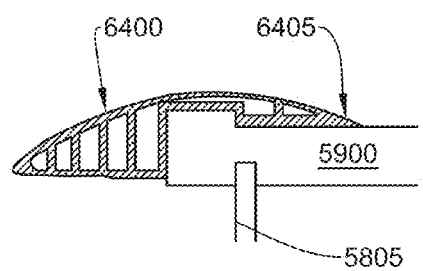
FIG. 64 is a partial cross-sectional view showing an extruded panel assembly including a plurality of carriers and having a portion extending outwardly from the cargo body, according to an illustrative embodiment.
Figure 65:
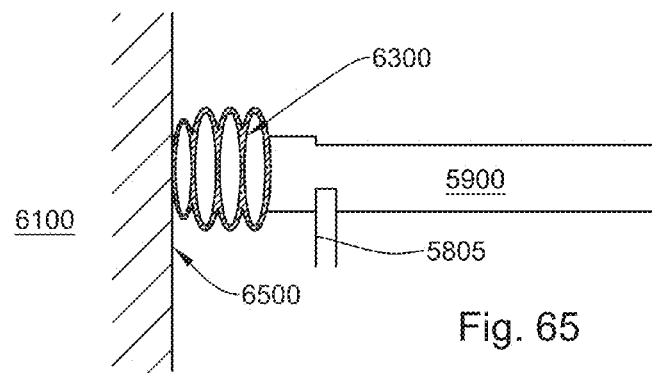
FIG. 65 is a partial cross-sectional view showing the extruded panel assembly of FIG. 63 in the deformed, or collapsed, position, once a force is exerted on the trailing edge of the extruded panel assembly, according to the illustrative embodiment.

Reference is now made to FIGS. 58-65 showing various illustrative embodiments for a collapsible fairing assembly constructed and arranged to collapse along the longitudinal axis of the cargo body when backed up, for example, to a loading bay. As shown in FIG. 58, the collapsible aerodynamic fairing assembly is mounted on a cargo body 3800 and comprises a collapsible top panel 5810, a first side panel 5820 and a second opposing side panel 5830. The door 5803 of the cargo body is visible when the deformable fairing assembly is in the fully extended position, as shown in FIG. 58. The deformable fairing assembly, including the top panel 5810, first side panel 5820 and second side panel 5830 each respectively move between a retracted position substantially free of interference with a rear edge of the cargo body, for example as shown in FIGS. 62 and 65, to a deployed position, as shown in FIG. 58, extending rearwardly beyond the rear edge to define at least a partial aerodynamic cavity. According to the illustrative embodiment, the panels are extruded or molded so as to be naturally located into the deployed position and compressible, or otherwise elastically deformable, when engaging a confronting surface during rearward motion of the vehicle toward the surface. In an illustrative embodiment, the material of the compressible panels comprises foam, polyurethane, thermoplastic Poly-Olefin (TPO), Ethylene Propylene Diene Monomer (EPDM) or other elastomeric materials known in the art.

In an illustrative embodiment, the collapsible panels are permanently joined to each other at adjacent corners thereof. The exterior surface of at least one of the collapsible panels in the fairing assembly defines a convex shape constructed and arranged to direct airflow over the panel in a manner of an airfoil.

Figure 59:
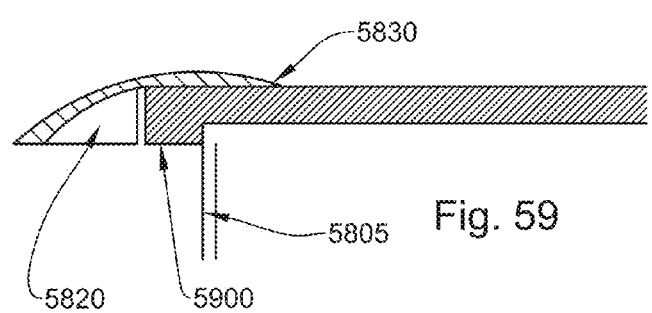
FIG. 59 is a partial cross-sectional view as taken across line 59-59 of FIG. 58, showing the deformable panel according to an illustrative embodiment including a portion that extends outwardly from the cargo body.

Reference is now made to FIG. 59 showing a partial cross-sectional view as taken across line 59-59 of FIG. 58, showing the side panel 5820 according to an illustrative embodiment including a panel portion 5830 that extends slightly outwardly from the cargo body 5800. The end cap 5900 of the cargo body provides the base for securing the side panel 5820 to the cargo body. In an illustrative embodiment, the side panel projects less than three inches from the surface of the cargo body 5800. The side panel 5820 is collapsible and can be pocketed in further embodiments to improve collapsibility of the top panel 5810. The panels are constructed and arranged so as to restore to the original, deployed position, once there is no force exerted on the rearward edge of the fairing assembly. FIG. 60 details a further embodiment showing the top panel 600 that does not project outwardly 6010 from the cargo body. The slot in FIG. 60 is an optional opening to allow visibility to the top lights of a trailer.

Referring now to FIGS. 61 and 62, as the cargo or vehicle body, and associated trailer cap 5900, commence rearward motion (direction 6110) toward a confronting surface 6100. As shown in FIG. 61, the side panel 6120, comprised for example of a foam or other deformable material known in the art, is in its naturally located, original position. As the vehicle or cargo body moves rearwardly (6110), and a force is exerted on the panel 6120 at 6200 by contact with the confronting surface 6100, the panel 6120 collapses as shown in FIG. 62 to allow for clearance to the cargo door 5805. Once the vehicle moves away from the confronting surface 6100, the panel 6120 is restored to the original position as shown in FIG. 61.

Reference is now made to FIGS. 63-65 detailing further illustrative embodiments of the collapsible fairing assembly. The panel 6300, 6400 shown in FIGS. 63-65 can comprise an extruded EPDM (Ethylene Propylene Diene Monomer) material or other elastomeric material known in the art. Referring to FIG. 63, an extruded side panel 6300 is secured to a trailer end cap 5900. The panel 6300 can include a plurality of metal carriers 6310 to provide additional stiffness to the extruded side panel 6300. As shown in FIG. 64, in an illustrative embodiment a side panel 6400 can be provided which includes a bulging portion 6405 to provide additional aerodynamic efficiency to the fairing assembly.

As shown in FIG. 65, as the vehicle body commences rearward motion towards the confronting surface, and makes contact at 6500, the extruded panel 6300 collapses to a deformed position. The extruded panel 6300 is constructed and arranged such that, once the vehicle commences forward motion to be sufficiently far away from the confronting surface 6100 that force is no longer exerted on the panel 6300, the panel 6300 is restored to the original position as shown in FIG. 63.

Panel Geometry and Effectiveness

Figure 66:
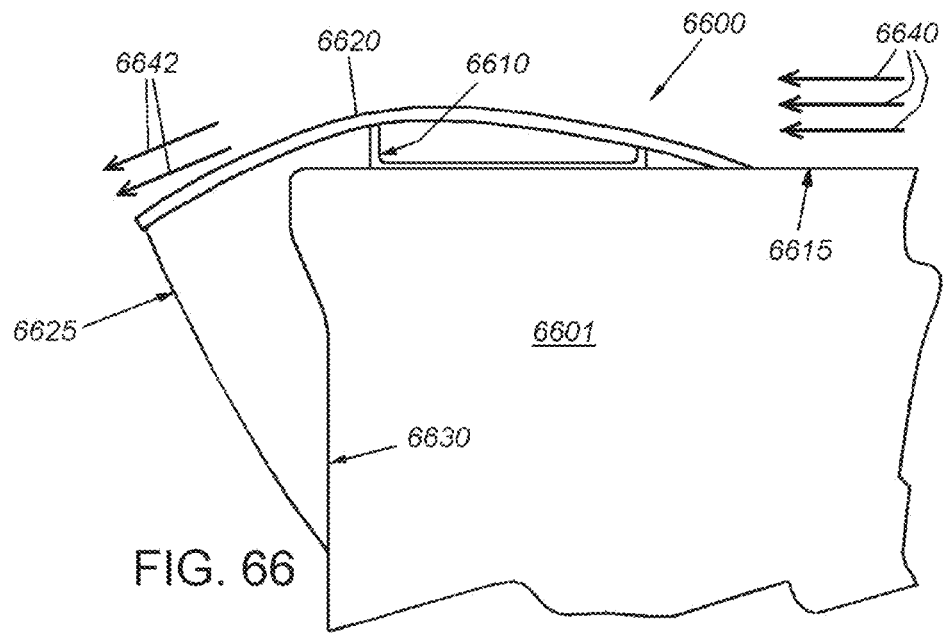
FIG. 66 is a partial side perspective view of a trailer having a curved panel for the roof of the trailer and having an increased distance from the trailer body, in accordance with an illustrative embodiment.

Reference is now made to FIG. 66 showing a partial side perspective view of a trailer having a curved panel for the roof of the trailer and having an increased distance from the trailer body, in accordance with an illustrative embodiment. As shown, the panel assembly 6600 is secured to a trailer body 6601 at the trailer roof 6615 and includes a frame 6610, shown and described in greater detail herein, upon which a panel 6620 is supported. The panel 6620 is supported by cabling 6625 to provide the desired support and connection to the rear of the trailer 6630. The airflow is shown by arrows 6640 as it approaches the panel assembly 6600. The air then passes over the panel assembly and through to the end of the panel 6620, as shown by arrows 6642, to improve the aerodynamic efficiency of the trailer cargo body, as described herein in accordance with the illustrative embodiments. The curved panel 6620 with an increase in height (i.e. distance spaced away from the trailer wall) allows for an effectively longer panel for a same trailer overhang. Additionally, the curved panel 6620 increased mass flow of air over the panel to increase the amount of air being pulled into the low pressure area behind the trailer, as shown at arrows 6642. However, aerodynamic testing has shown that an important factor contributing to aerodynamic benefit is the length that panel 6620 protrudes rearwards of the trailer. Stiffeners, cables, and/or other linkages are therefore essential in providing sufficient rigidity and mobility upon impact to permit a panel to be long enough to achieve maximum aerodynamic gains.

Spring Control Linkage

Figure 67:
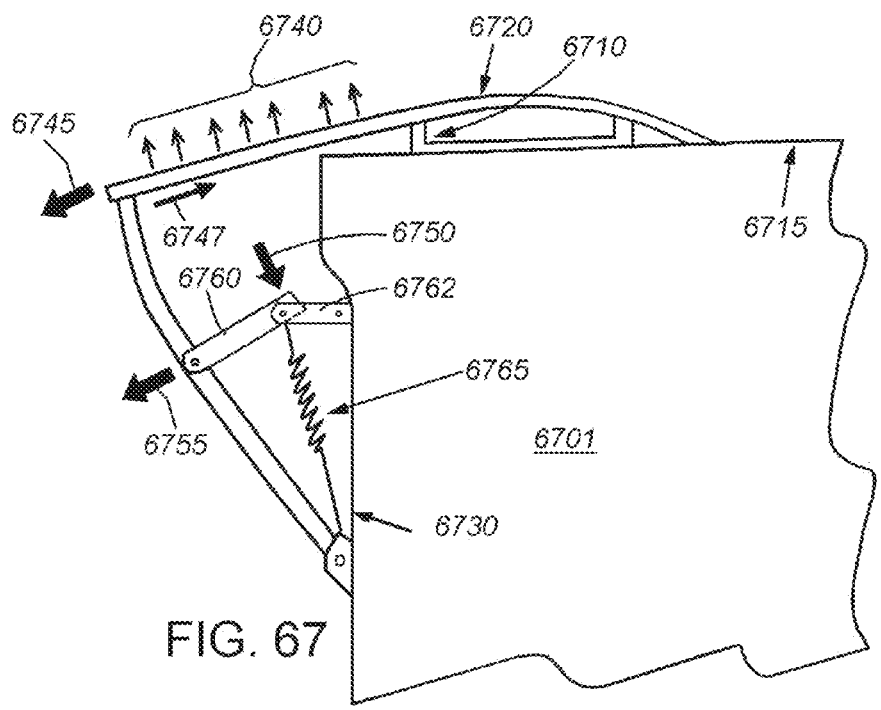
FIG. 67 is a partial side perspective view of the trailer having a curved panel and a spring control linkage assembly, in accordance with the illustrative embodiment.

Referring now to FIG. 67, is a partial side perspective view of the trailer 6701 having a curved panel and a spring control linkage assembly, in accordance with the illustrative embodiment. As shown, a panel frame 6710 is secured to the roof 6715 of the trailer body 6701 and supports a panel 6720 that provides aerodynamic lift as shown by arrows 6740. The force 6745 generated by airflow over the panel 6720 is greater than the force 6747 of the airflow back into the trailer body 6701. The force 6750 of the spring linkage maintains force 6745 and 6755 on the panel to keep it deployed at speed. The spring linkage 6765 maintains the spring force 6750 on the panel 6720 through the brackets 6760, 6762 and associated cabling or brackets secured to the trailer body 6701 at the rear surface of the trailer 6730.

Progressive Force Spring Geometry

Figure 68:
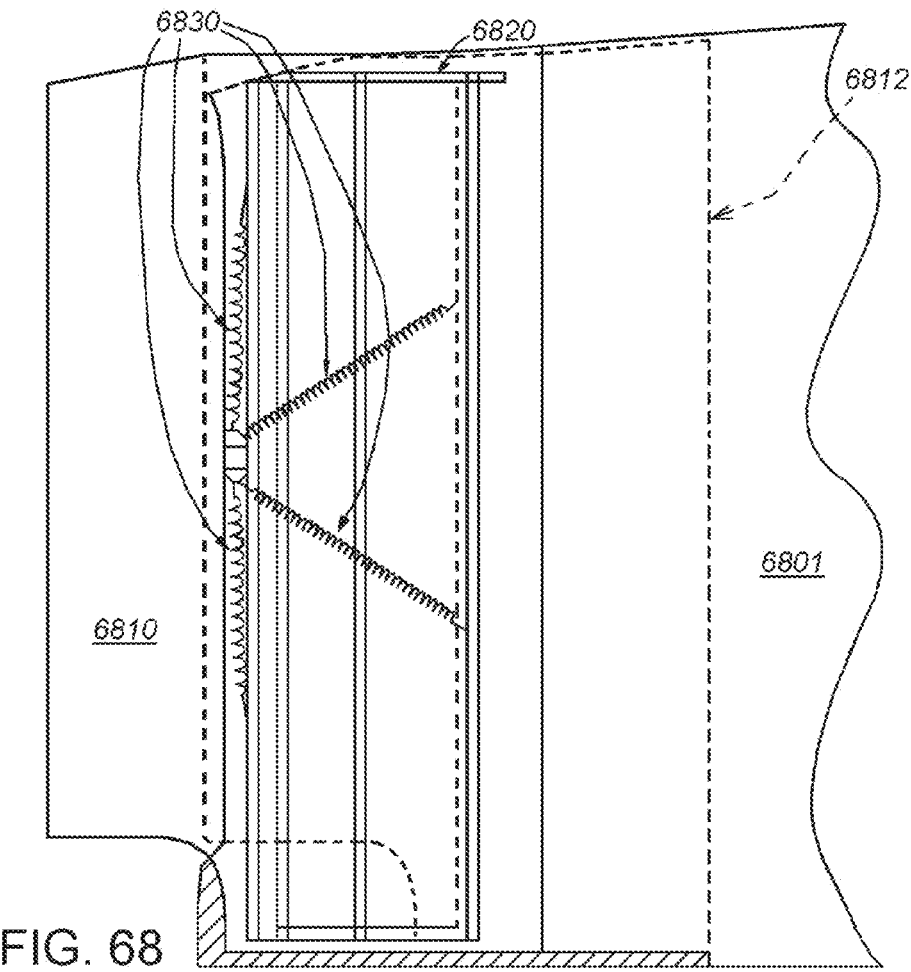
FIG. 68 is a side view of a progressive force spring geometry, in accordance with the illustrative embodiments.
Figure 68A:
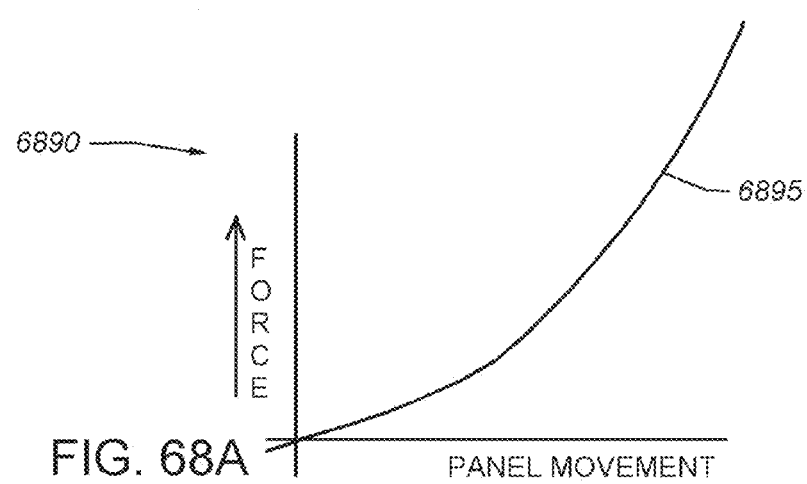
FIG. 68A is a graphical diagram of the force applied to the panel versus the panel movement, in accordance with the illustrative embodiments.

Reference is now made to FIG. 68 showing a side view of a progressive force spring geometry, in accordance with the illustrative embodiments. A trailer body 6801 has an aerodynamic panel 6810 secured thereto through the frame assembly 6820. A plurality of springs 6830 (four springs in this illustrative embodiment) are secured to the frame 6820 of the panel 6810 and are biased vertically in the deployed position. This reduced the initial force resistance retraction, thereby preventing panel from bending or folding. As shown in FIG. 68A, a graphical diagram 6890 of the force applied to the panel versus the panel movement is shown, in accordance with the illustrative embodiments, for the spring in the vertical orientation. As shown by the line 6895, there is an even distribution of force to panel movement. As force is applied to the panel 6810, the panel retracts to the position as shown at 6812 in FIG. 68A. Multiple progressive springs that are not mounted in-line with the direction of extension also provide the additional benefit that their percentage change in length is reduced, allowing a wider use of standard off-the-shelf metal tension springs and other products that can generally elongate to a maximum of twice their collapsed length.

Rear Edge Rollers and Panel Control

Figure 69:
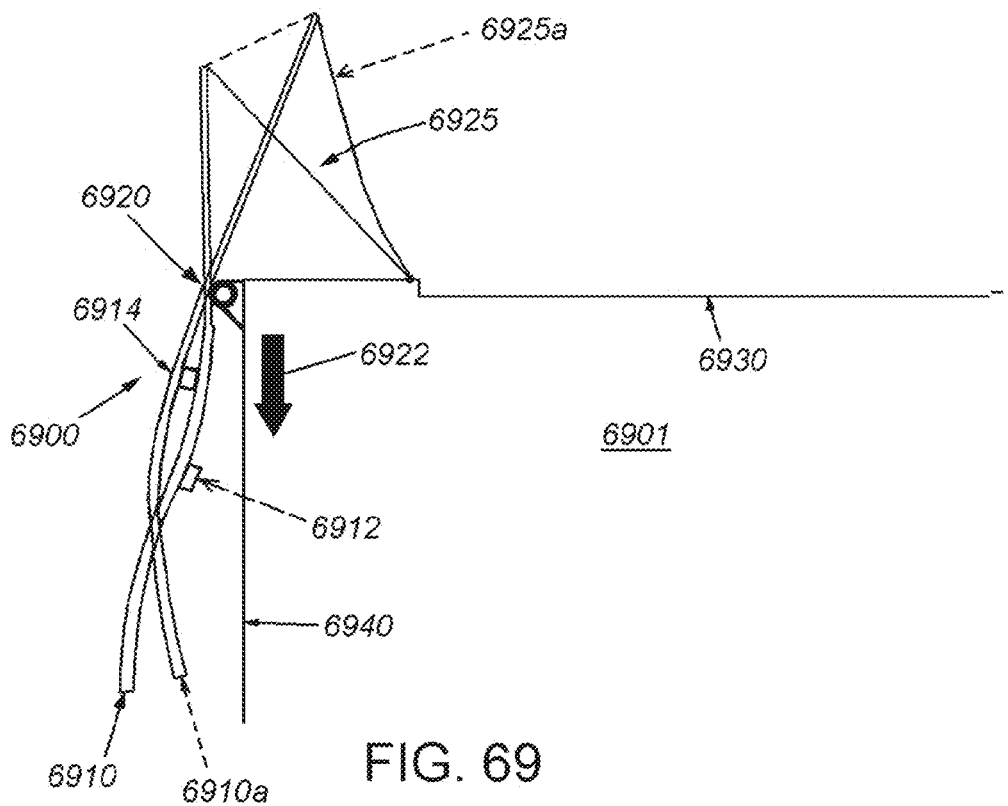
FIG. 69 is a top view of rear edge rollers and panel control in accordance with an illustrative embodiment.

FIG. 69 is a top view of rear edge rollers and panel control in accordance with an illustrative embodiment. As shown, the rear edge roller assembly 6900 is secured to the trailer body 6901 such that as the panel 6910 and the frame 6912, 6914 roll forward on the trailer (in the direction of the arrow 6922), the trailing edge of the panel 6910 is pushed outward by the roller 6920 mounted to a rear corner of the trailer, proximate to where the rear surface 6930 and the top surface 6940. This is controlled by a combination of roller position and panel angle on the frame 6912, 6914. The trailing edge of the panel 6910 is secured by the cable or other securing element 6925 to the back surface of the trailer 6930). It is expressly contemplated that, although the particular aerodynamic structures and panel assemblies are arranged on a particular side of the trailer for illustrative purposes, the panel assemblies and aerodynamic structures shown and described herein can be implemented on any side or top of the trailer body to achieve the desired aerodynamic advantages shown and described herein.

Air/Water Guard Strip

Figure 70:
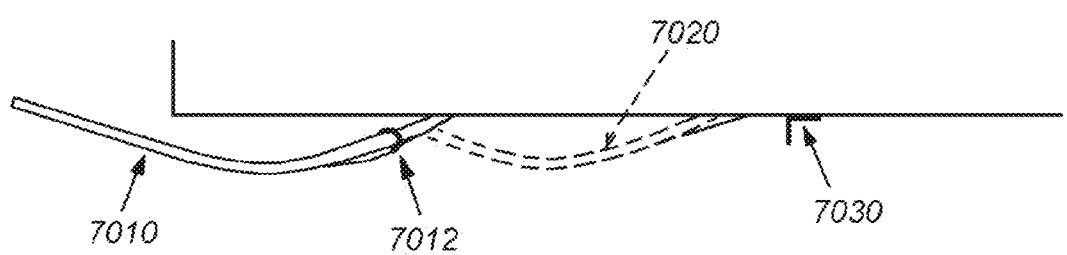
FIG. 70 is a top view of an air/water guard strip implemented along with a side aerodynamic structure, in accordance with an illustrative embodiment.

Referring to FIG. 70, a top view of an air/water guard strip implemented with a side aerodynamic structure is shown, in accordance with an illustrative embodiment. As shown, the panel 7010 includes a weather seal 7012 for sealing the panel 7010, which in the deployed position in solid-line in FIG. 70. The panel is shown in dotted-line position at 7020, which represents the retracted position of the panel 7010. A vertical strip 7030 is provided on the trailer side to protect the weather seal form air and water infiltration at high speed and to, therefore, maintain seal integrity.

Universal Trailer Roller and Track Assembly

Figure 71:
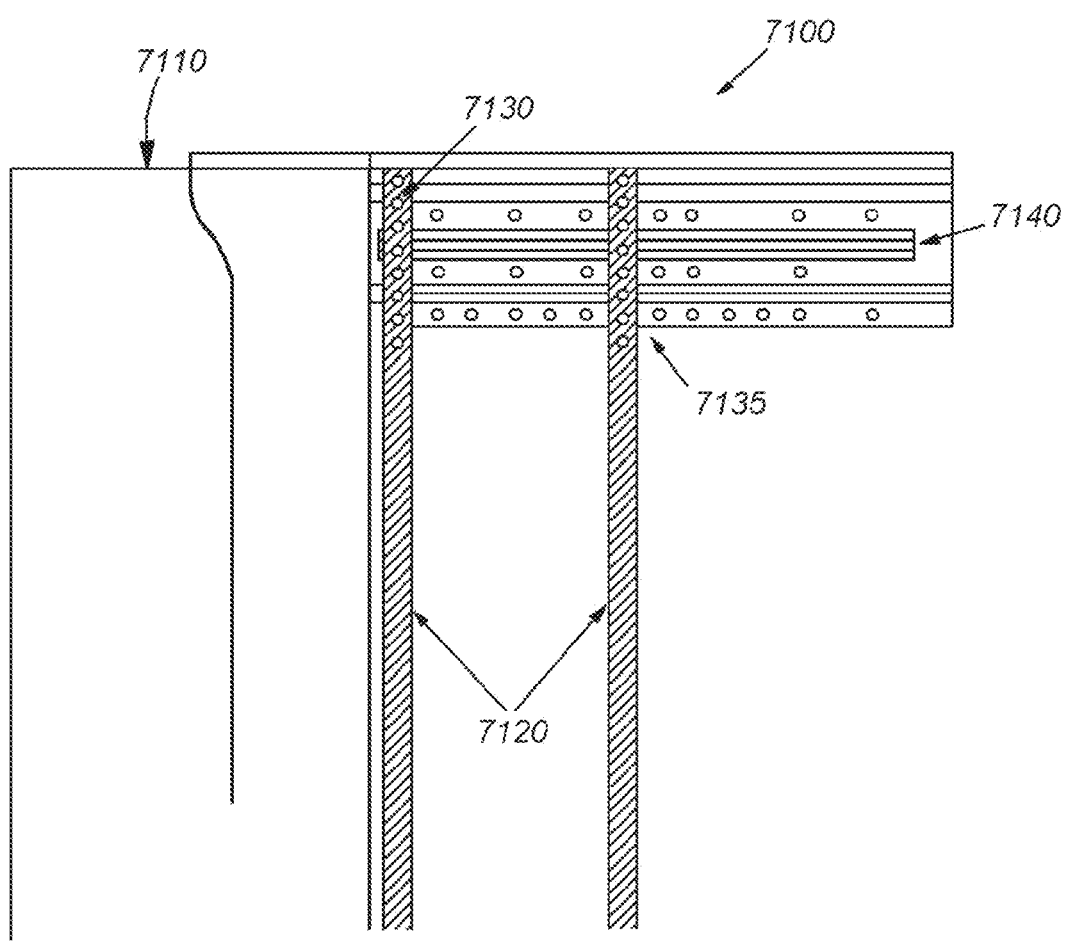
FIG. 71 is a side view of a universal trailer fit including a multiple roller mounting, which allows the track to be placed at any number of placed on the trailer body, in accordance with an illustrative embodiment.

FIG. 71 is a side view of a universal trailer fit assembly including a multiple roller mounting, which allows the track to be placed at any number of places on the trailer body, in accordance with an illustrative embodiment. As shown, the universal trailer assembly 7100 is employed for securing a panel 7110 to the trailer body. The rollers can be mounted in any one of the holes shown on the panel mounting tubes 7120. The rollers can be mounted in any one of the holes 7130 to align with the track height. Likewise, multiple roller mounting holes are provided at 7135, which allows the track 7140 to be placed where space is available on the top rail. Accordingly, the panel 7110 can still be flush with the roof (to within a spacing of a single hole). Furthermore, the universal mounting detail allows the universal trailer roller and track assembly to be adjustable to fit virtually any trailer style and/or size. Illustratively, the rail 7140 (or track) is mounted in the most convenient location, typically between the pre-existing rivets of the trailer.

Rear Mounting of Aerodynamic Structures and Track Assemblies

Figure 72:
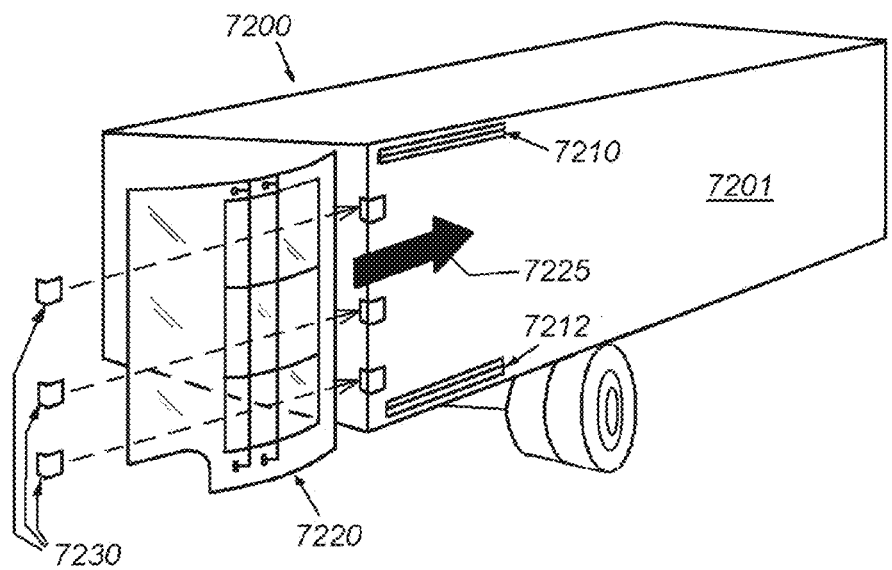
FIG. 72 is a perspective view of a rear mounting scheme incorporating a pair of tracks into which the panel slides, in accordance with an illustrative embodiment.

Reference is now made to FIGS. 72 through 75B, showing various arrangements for rear mounting structures. With reference to FIG. 72, a perspective view of a rear mounting scheme incorporating a pair of tracks into which the panel slides is shown, in accordance with an illustrative embodiment. As shown, the rear mounting assembly 7200 is secured to a trailer body 7201 by employing a pair of tracks 7210, 7212, each having a stop in the end of the track. The panel 7220 is constructed and arranged to slide (via arrow 7225) into the tracks 7210, 7212 from the rear of the trailer body 7201. The rear surface mounted bump stops 7230 lock the panel into the tracks 7210, 7212.

Figure 73:
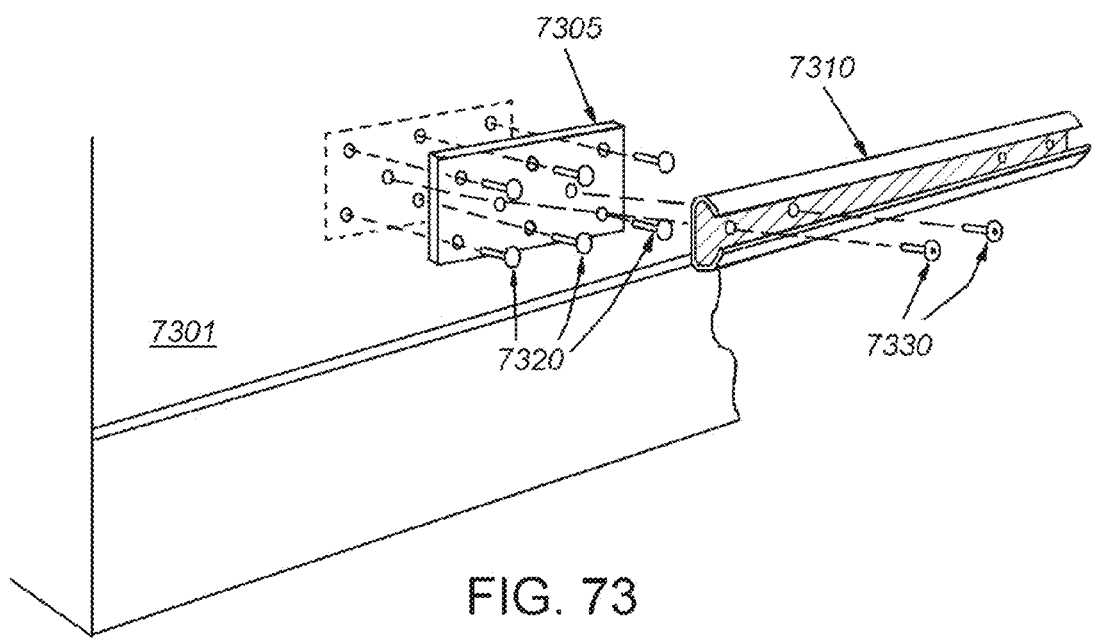
FIG. 73 is an exploded view of a track assembly and associated spreader plate, which is secured to the trailer body in accordance with the illustrative embodiments.

Reference is now made to FIG. 73 showing an exploded view of a track assembly and associated spreader plate, which is secured to the trailer body in accordance with the illustrative embodiments. In general, as shown, if a track is to be attached to the trailer body 7301, a spreader plate 7305 is employed, having a plurality of holes for receiving rivets 7320 or other appropriate fasteners known in the art. To attach the track 7310 to the trailer body 7301, the spreader plate 7305 is first riveted or otherwise secured to the trailer 7301. Then, the track 7310 is secured to the spreader plate 7305 using rivets 7330 (or other appropriate fasteners known in the art).

Adhesive for Sealing and Mounting the Panel Assembly Structure

Referring to FIG. 74, an exploded view of a track assembly and associated adhesive tape for sealing and mounting the track assembly is shown, in accordance with the illustrative embodiments. The track assembly is mounted to the trailer body 7401 by securing the track to an adhesive (single- or double-sided) tape or other material known in the art, as shown by arrow 7425. The tape also has the advantage of providing sealing around the rivet-holes. Additional mountings are also achieved through use of double-sided adhesive in an illustrative embodiment.

Reinforcement Panel

Reference is now made to FIGS. 75A and 75B showing, respectively, a side perspective view and a top perspective view of a panel assembly. The panel assembly is supported by a frame 7510 and including an outer panel 7515 and a reinforcement panel 7520 to stabilize the leading edge of the panel, in accordance with the illustrative embodiment. The reinforcement panel stabilizes the leading edge (i.e. the edge closes to the front of the trailer) of the panel to ensure that the leading edge achieves seal performance.

End Cap/Seal Carrier

Figure 76:
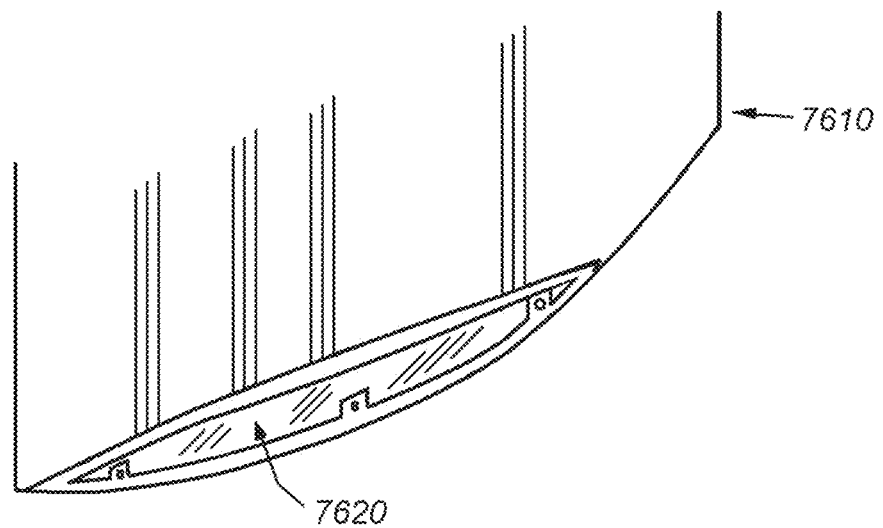
FIG. 76 is a partial perspective view of a panel incorporating an end cap and seal carrier which allows a greater gap variation between the panel and the trailer, in accordance with the illustrative embodiment.
Figure 77:
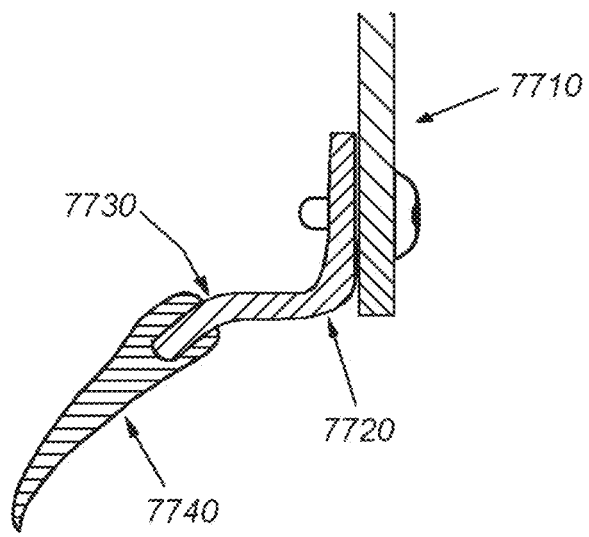
FIG. 77 is a cross-sectional view of the panel, associated end cap and sealing member in greater detail, in accordance with the illustrative embodiments.

Reference is now made to FIGS. 76 and 77 showing, respectively, is a partial perspective view of a panel and a cross-sectional view of the panel incorporating an end cap and seal carrier which allows a greater gap variation between the panel and the trailer, in accordance with the illustrative embodiment. As shown in FIG. 76, the panel 7610 includes an end cap 7620 which serves to keep rain, dirt and other elements from infiltrating the panel. As shown in greater detail in the cross-sectional view of FIG. 77, the panel 7710 is secured to an end cap 7720, which acts as a carrier for a flexible seal 7740 which contacts the trailer side. The angled seal carrier flange 7730 regulates the seal pressure and allows the seal to work under a greater gap variation of the panel with respect to the trailer.

Two-Piece Roller Mount with Vibration Damping

Figure 78:
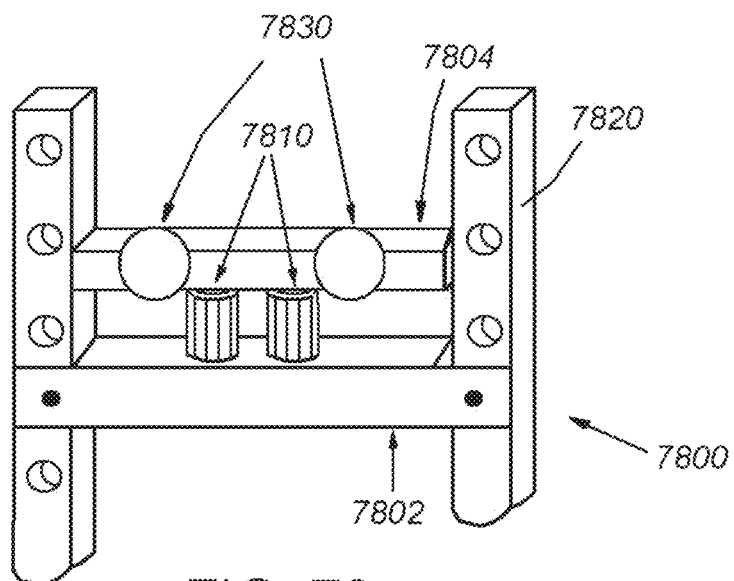
FIG. 78 is a perspective view of a two-piece roller mount including vibration damping, in accordance with an illustrative embodiment.

With reference to FIG. 78, a retrofittable mount 7800 is constructed and arranged to bear the impact of loads experienced by the frame 7820 and employ vibration damping (such as rubber isolators 7810 or other elements known in the art). Accordingly, the lifespan of a device is prolonged. In an illustrative embodiment, the assembly 7800 includes two mounts 7802, 7804 separated by vibration dampers 7810 (such as rubber isolators or bushings). The mount 7802 is affixed to the frame 7820 for the panel assembly. The mount 7804 is affixed to the rollers 7830.

Rolling Track Shape

Figure 79:
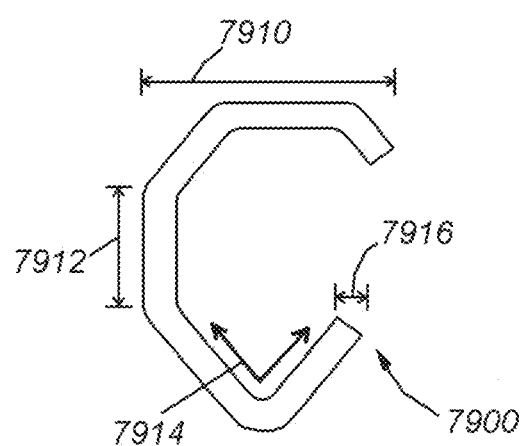
FIG. 79 is a cross-sectional view as taken through the rolling track shape, showing the track shape in greater detail, in accordance with the illustrative embodiments.

FIG. 79 is a cross-sectional view as taken through the rolling track showing the track structure in greater detail, in accordance with the illustrative embodiments. The track 7900 is constructed and arranged to ensure precise, accurate travel of the panel frame assembly. The track structure accomplishes this by first providing a larger top surface 7910 (with respect to its bottom surface) allows for angular misalignment of rollers before the rollers bind against the track. The overhang 7912 of the top track to the bottom reduces the particulate and water collection inside the track 7900. The V-shaped section 7914 allows for a high-precision rolling path. A U-shaped or other appropriate section can be employed for the bottom surface 7914 to achieve the desired high-precision rolling path. A small mounting section 7916 is provided to improve the ease of fitting the track onto various trailer constructions, styles and sizes. Another embodiment, not shown, includes a track cross-section with a V-shaped section at the top and no bottom, where the roller travels in the high-precision upper path and no dirt or grime is able to collect underneath the roller.

Dock Assist

Figure 80:
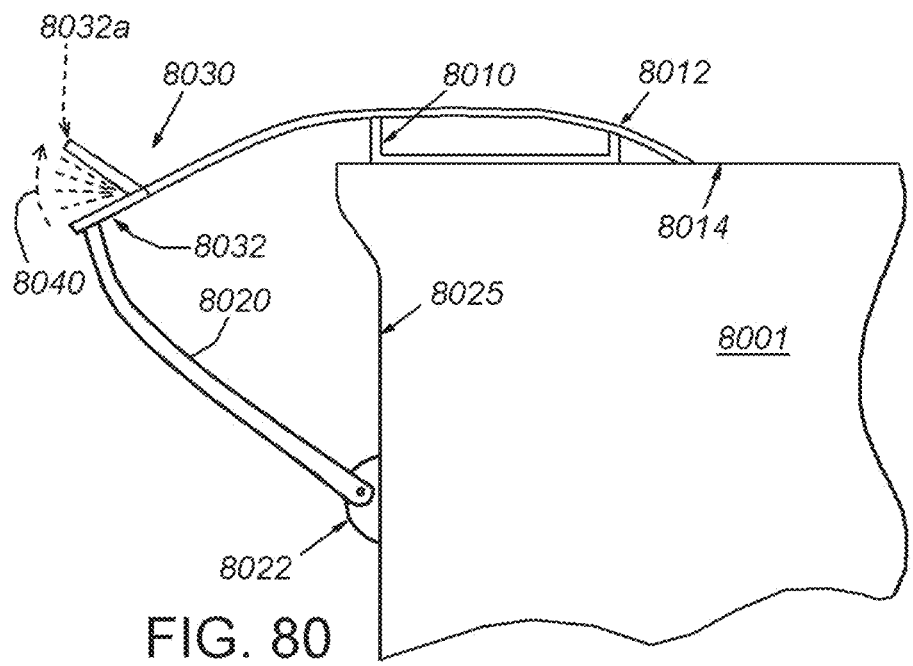
FIG. 80 is a side view of an aerodynamic assembly incorporating a roof panel and a dock assist extension, in accordance with the illustrative embodiments.

FIG. 80 is a side view of an aerodynamic panel assembly incorporating a roof panel and a dock assist extension, in accordance with the illustrative embodiments. The trailer body 8001 has a frame 8010 which supports a roof panel 8012 that is secured via a cable 8020 or other appropriate element to hinge the panel to a bracket 8022 at the rear surface 8025 of the trailer. A dock assist extension 8030 to the roof panel 8010 is constructed and arranged to assist with variation in dock-to-trailer fitment, specifically by providing an additional point of contact to force the panel to collapse as intended. Accordingly, the extension 8030 is moveable in the direction of arrow 8040 to position itself at the position of 8032, the extended position of 8032a, or any position therebetween along the arc of arrow 8040. The dock assist extension 8030 can be active or passive, can be movable or fixed, and is highly variable within ordinary skill. In an active configuration, the device retracts and deploys via microcontroller (not shown) at specific predetermined speeds. In a passive configuration, the device springs open and retracts with aerodynamic pressure.

Collapsible Roof Member

Figure 81:
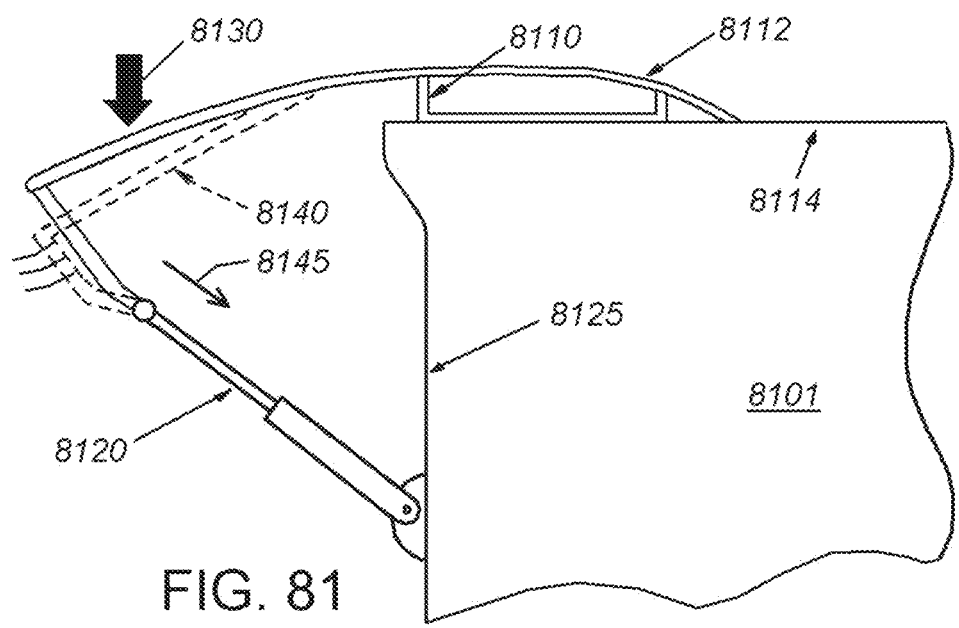
FIG. 81 is a side view of an aerodynamic assembly incorporating a roof panel and a collapsible roof member, in accordance with the illustrative embodiment.

With reference to FIG. 81, a side view of an aerodynamic assembly incorporating a roof panel and a collapsible roof member is shown, in accordance with the illustrative embodiment. The trailer body 8101 has a frame 8110 supporting a panel 8112 and secured to a top surface 8114 thereof. The panel assembly is constructed and arranged to absorb the direct force 8130 in a collapsible manner. The collapsible member 8120 can comprise a gas spring which resists collapse (in the direction of arrow 8145) up to a certain force threshold, at which point it breaks away or collapses to the point shown at 8140. When the trailing edge of this panel assembly is contacted by a force moving from left to right in FIG. 81, the panel assembly would fold similar to FIG. 45

Linkage Mechanism to Control Rotating Panel Movement

Figure 82A:
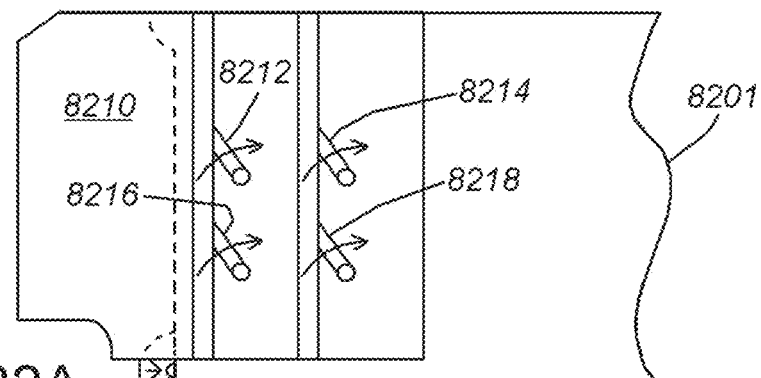
FIG. 82A is a side view of a panel secured to the trailer body and incorporating a linkage mechanism which lifts and moves the panel assembly forward along the side of the trailer as it transitions from a deployed position to a stowed position, and vice versa, showing the panel in the fully deployed position, in accordance with the illustrative embodiments.
Figure 82B:
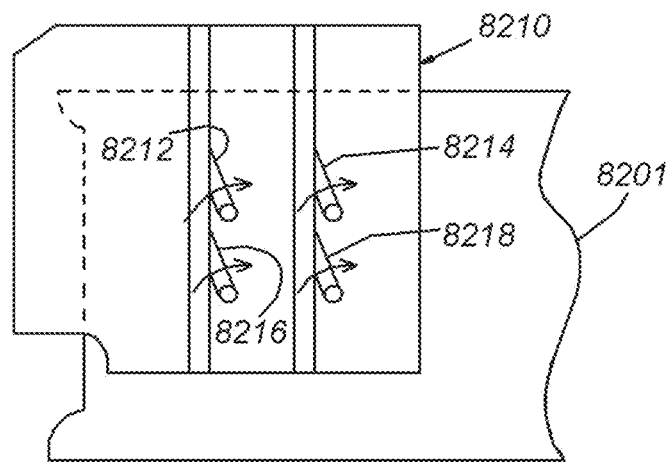
FIG. 82B is a side view of the panel incorporating a linkage mechanism which lifts and moves the panel assembly forward along the side of the trailer, with the panel shown in an intermediate position between the deployed position and the stowed position, in accordance with the illustrative embodiments.
Figure 82C:
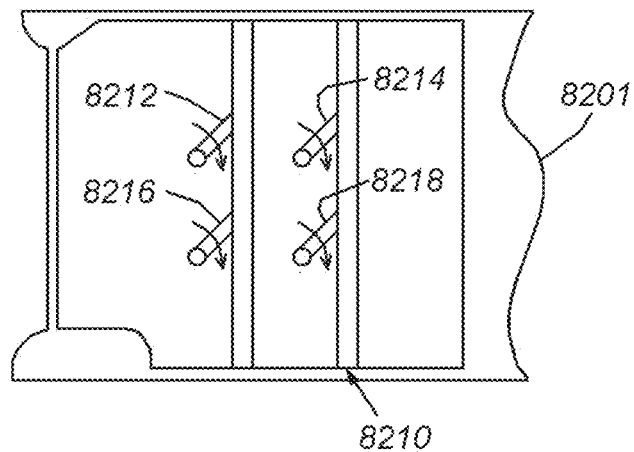
FIG. 82C is a side view of the panel incorporating a linkage mechanism which lifts and moves the panel assembly forward along the side of the trailer, with the panel shown in a stowed position, in accordance with the illustrative embodiments.

Reference is now made to FIGS. 82A, 82B and 82C showing, respectively, a side view of a panel secured to the trailer body 8201 and incorporating a linkage mechanism with the panel shown, respectively, in the fully deployed position (FIG. 82A), an intermediate position between the deployed position and the stowed position (FIG. 82B) and a stowed position (FIG. 82C), in accordance with the illustrative embodiments. The panel 8210 is mounted to the cargo body 8201 via a linkage mechanism including elements 8212, 8214, 8216, and 8218 that lift and move the panel assembly forward along the side of the trailer body 8201. The panel moves from a deployed state in FIG. 82A vertically upward to an intermediate position shown in FIG. 82B, and then back around down to the stowed or retracted position shown in FIG. 82C. It is also contemplated that variations of this linkage allow the panel assembly to move vertically downward into an intermediate position and then back up to a stowed or retracted position, as well as further variations where the stowed or retracted position is both forwards and either vertically above or below the deployed position.

Further Nacelle Embodiment

Figure 83A:
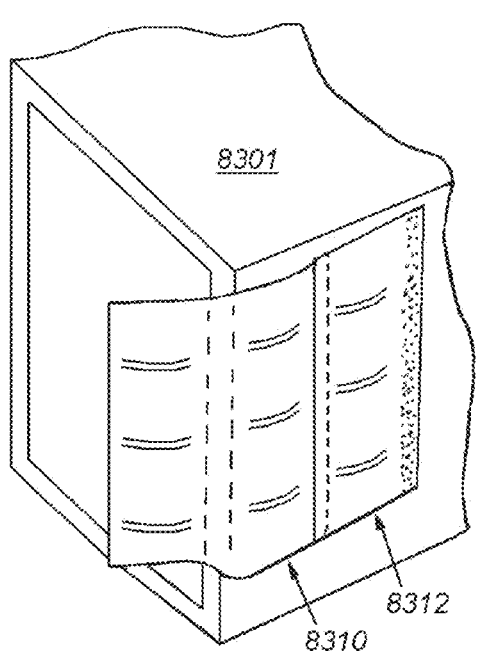
FIG. 83A is a partial perspective view of a nacelle structure embodiment incorporating a nacelle panel or flap that overlies the side aerodynamic panel, in accordance with the illustrative embodiments.
Figure 83B:
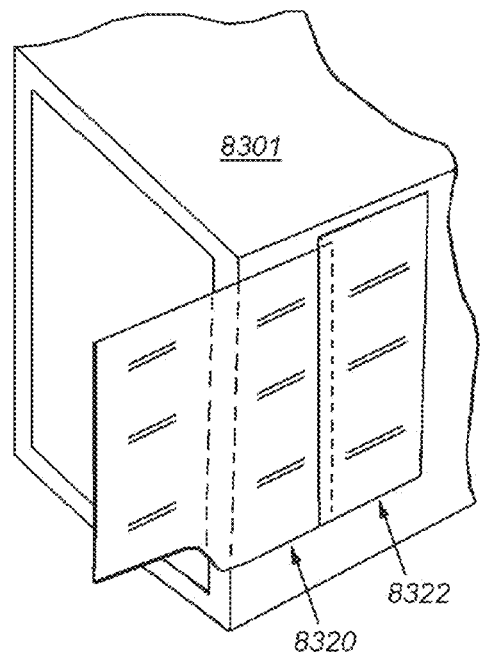
FIG. 83B is a partial cut-out view of a side nacelle and associated panel showing the panel and its housing as being flat in surface shape with respect to the trailer body, in accordance with the illustrative embodiments.

Reference is now made to FIGS. 83A and 83B showing a further nacelle embodiment in which the aerodynamic panel slides behind (underneath) an overlaid panel or flap to protect the aerodynamic panel and provide an aerodynamic benefit. As shown in FIG. 83A, a trailer cargo body 8301 has a curved aerodynamic panel 8310 that slides behind an overlaid nacelle panel or flap 8312. The overlaid nacelle 8312 protects the panel and its edges from damage and infiltration and provides aerodynamic benefits. According to the curved aerodynamic panel 8310 and corresponding overlaid nacelle panel 8312, the structure comprises a generally curved outer surface with respect to the cargo body 8301. However, as shown in FIG. 83B, the aerodynamic panel 8320 and associated nacelle panel 8322 can define a flat surface that is displaced evenly, up to 3 inches from the surface of the cargo body 8301 along the length of the nacelle and aerodynamic panel structure.

Roller and Rolling Track Embodiments

Figure 84:
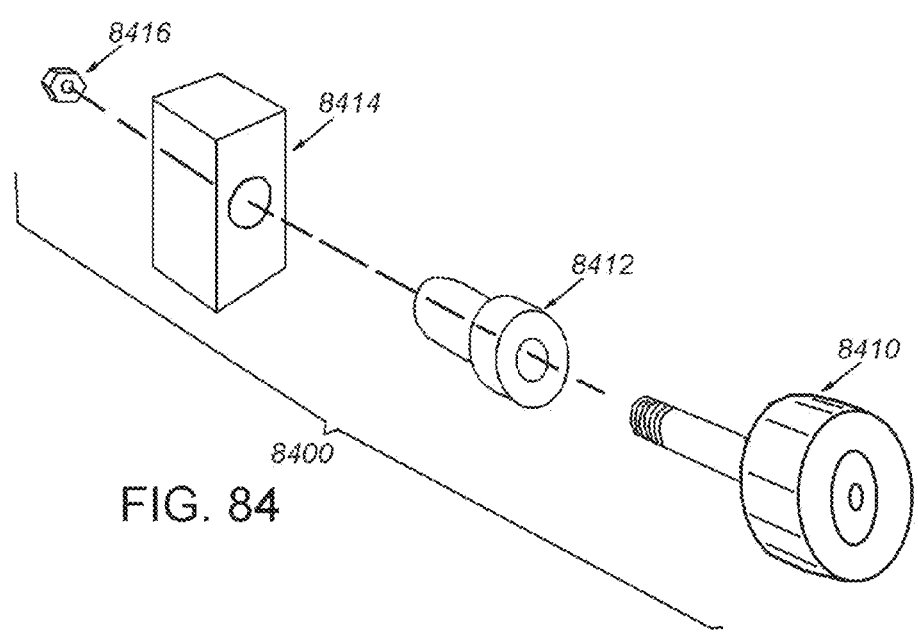
FIG. 84 is an exploded view of a roller mount including a roller carrier assembly and associated bushing, in accordance with the illustrative embodiments.

Reference is now made to FIGS. 84-91 depicting various illustrative embodiments of the roller, rolling track, and associated components. With reference to FIG. 84, an exploded view of a roller and rolling track assembly 8400 is shown and includes a roller 8410, a bushing 8412 (for example, a rubber, steel or poly-urethane bushing), a roller carrier assembly 8414 and a fastening nut 8416 for securing the roller to the roller carrier assembly. Although a nut and threaded axle are shown for securing the roller within the roller carrier assembly, any appropriate fastening elements can be employed within ordinary skill. Single or multiple bushings can be used to dampen rollers from vibration and shock loads which are transmitted through the panel frame. The bushings are inserted or pressed into the roller carrier holes which are sized to achieve the appropriate pre-load on the roller assembly.

Figure 85:
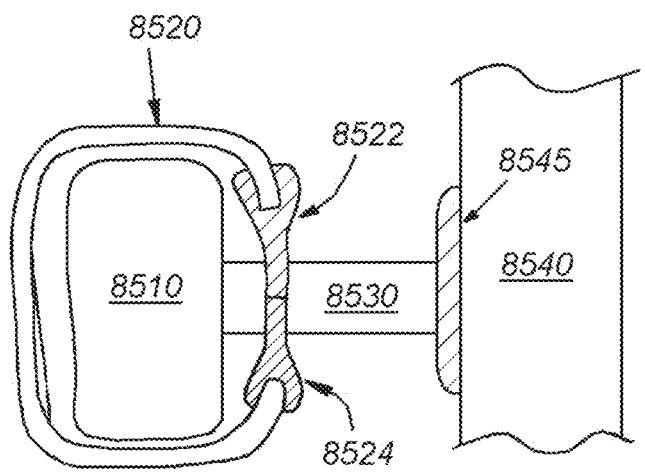
FIG. 85 is a cross-sectional view as taken through an enclosed track with a rubber sealing member and associated roller assembly, in accordance with the illustrative embodiments.
Figure 86:
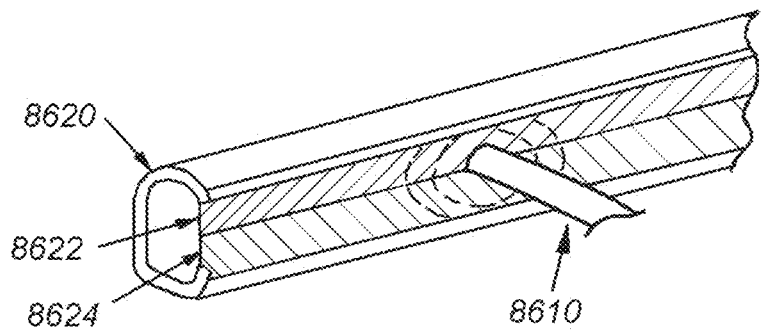
FIG. 86 is a partial perspective view of an enclosed track assembly including bristles for sealing the roller within the track, according to the illustrative embodiment.

Referring to FIG. 85, a cross-sectional view as taken through an enclosed track with a rubber sealing member and associated roller assembly is shown, in accordance with the illustrative embodiments. The roller 8510 is shown contained within the rolling track 8520 which includes a pair of seals 8522, 8524 for sealing the rolling track. The axle 8530 of the roller 8510 passes through the pair of seals 8522, 8524 (such as rubber seals) to provide a sealing surface therebetween that allows the roller to move within the rolling track housing from one end to the other end. The roller carrier assembly 8545 receives the bushing 8545 and the axle 8530 of the roller 8510 to securely hold the roller to allow for deployment and retraction of the aerodynamic panels. FIG. 86 details an illustrative embodiment in which the roller axle 8610 engages a roller track 8620 having a pair of bristle seals 8622, 8624 that each include a plurality of bristles for protecting the roller and rolling track 8620 from infiltration, moisture, and other undesired environmental elements.

Figure 87:
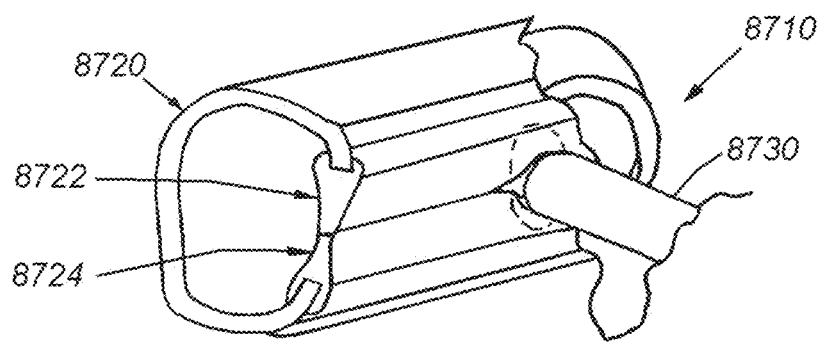
FIG. 87 is a partial cut-out view showing a track assembly having a rubber seal that seals the roller and allows the roller to pass through the seal of the track assembly and ride within the track, in accordance with the illustrative embodiments.
Figure 88:
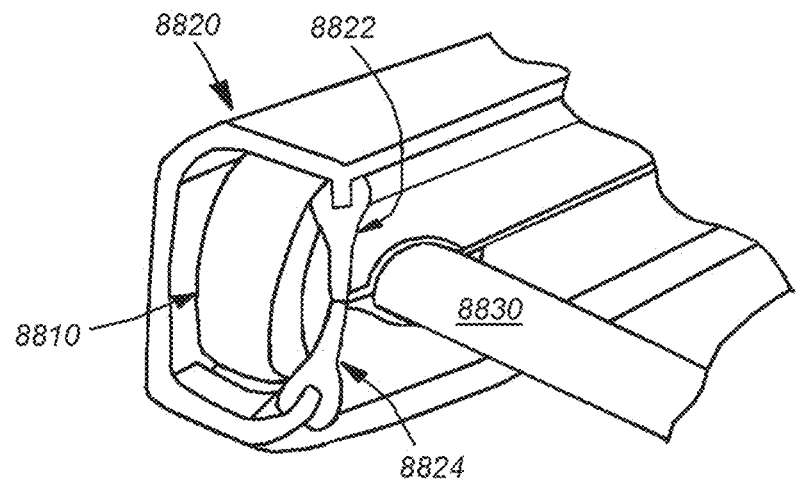
FIG. 88 is a partial cut-out view of a roller assembly residing within a sealed track assembly having a pair of rubber strips for protecting the track and roller assembly, in accordance with the illustrative embodiment.
Figure 89:
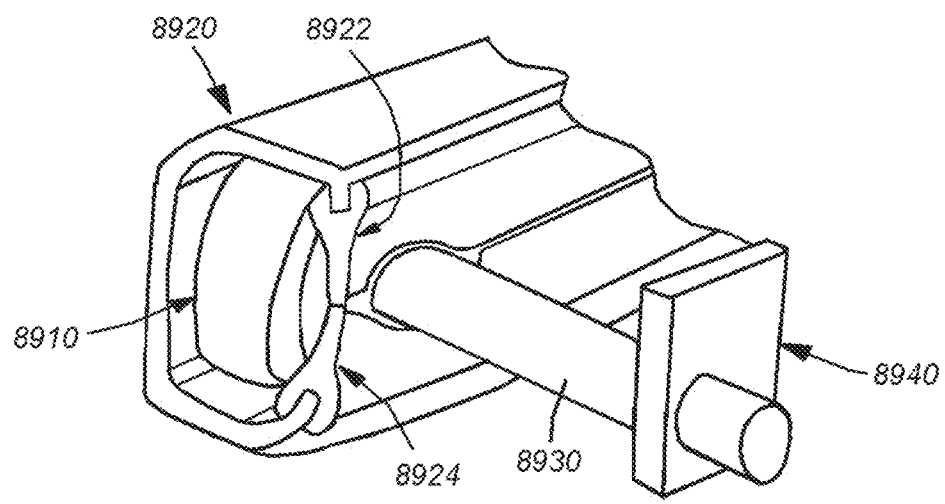
FIG. 89 is a partial cut-out view of a roller assembly residing within a sealed track assembly having a pair of rubber strips for protecting the track and roller assembly, the roller assembly including a bracket for securing the roller axis, in accordance with the illustrative embodiments.

FIG. 87 is a partial cut-out view showing a roller 8710 and associated rolling track assembly 8720 having a pair rubber seals 8722, 8724 that seal the roller and allow the roller axis 8730 to pass in between the seals 8722, 8724 of the track assembly so that the roller rides within the track 8720, in accordance with the illustrative embodiments. Referring now to FIG. 88, the roller 8810 and its respective roller track 8820 are shown. The roller track 8820 includes a pair of seals 8822, 8824 that sealably engage the axle or shaft 8830 of the roller 8810. Similarly, referring to FIG. 89, the roller 8910 and its respective roller track 8920 are shown. The roller track 8920 includes a pair of seals 8922, 8924 that sealably engage the axle or shaft 8930 of the roller 8910, which is supported by a bracket 8940 or other appropriate carrier element.

Roller Track with Particulate Plow

Figure 90:
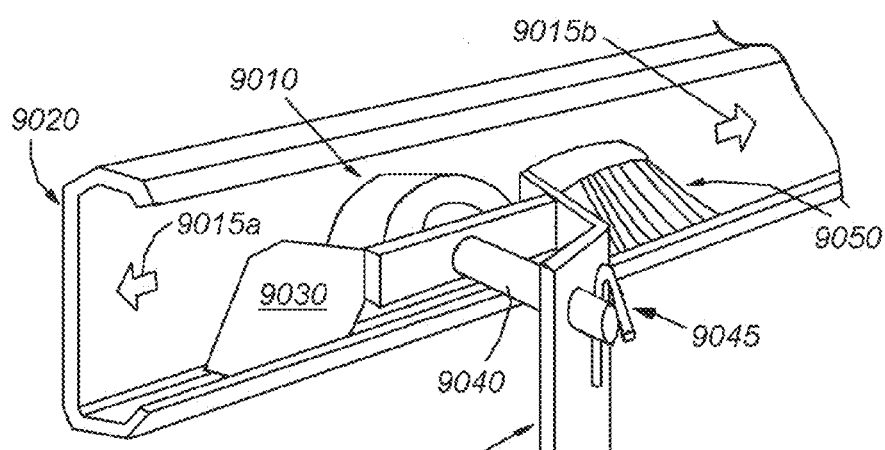
FIG. 90 is a partial cut-out view of a track assembly and associated roller assembly that includes a plow to clear the track, in accordance with the illustrative embodiments.

FIG. 90 is a partial cut-out view of a roller assembly and associated track rolling assembly that includes a plow to clear the track, in accordance with the illustrative embodiments. In accordance with the illustrative embodiments, a roller 9010 is disposed and rolls along the direction of arrows 9015a and 9015b within the rolling track assembly 9020. A plow 9030 is provided as well as a bristle element 9050, secured to the frame 9035 of the roller 9010. The axle 9040 is secured to the bracket 9035 via appropriate cotter pin or other securing elements known in the art.

Figure 91:
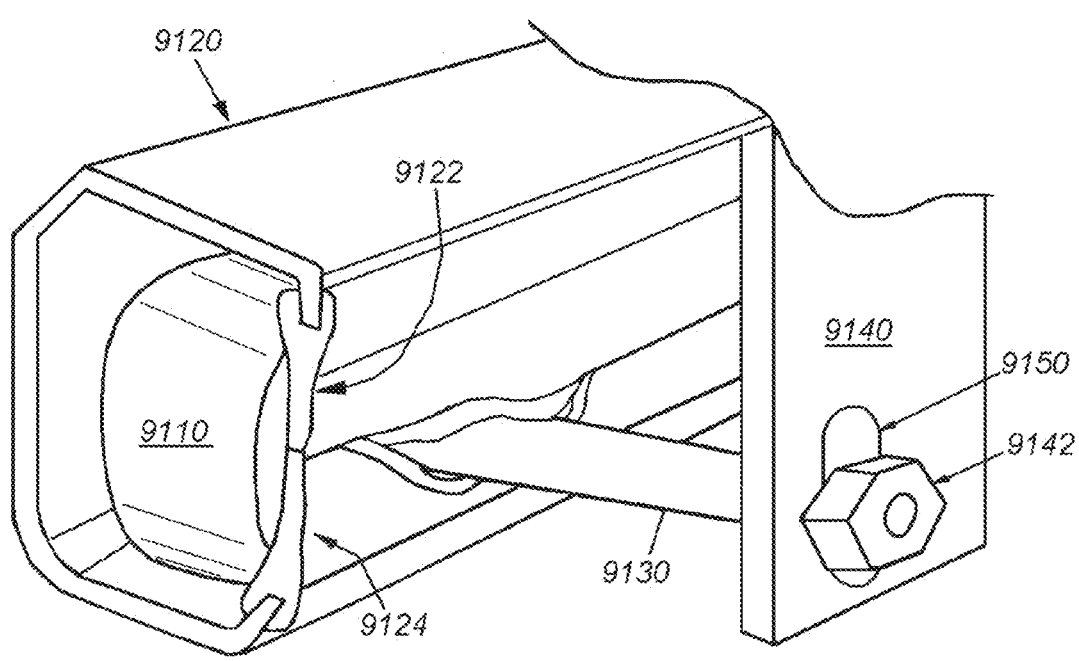
FIG. 91 is a partial cut-out view of the track assembly having rubber strips for protecting the track and the roller, showing the roller assembly secured to an adjustable bracket and slidable within the track assembly, in accordance with the illustrative embodiments.

FIG. 91 is a partial cut-out view of a roller 9110 and associated track assembly 9120 having rubber strips 9122, 9124 for protecting the track 9120 and the roller 9110. As shown, the roller assembly 9110 is secured to an adjustable bracket 9140 secured by a nut 9142 (or other appropriate securing member) within the bracket having an adjustable slot 9150 and slidable within the track assembly, in accordance with the illustrative embodiments.

Curved Roller Track Assembly

Figure 92:
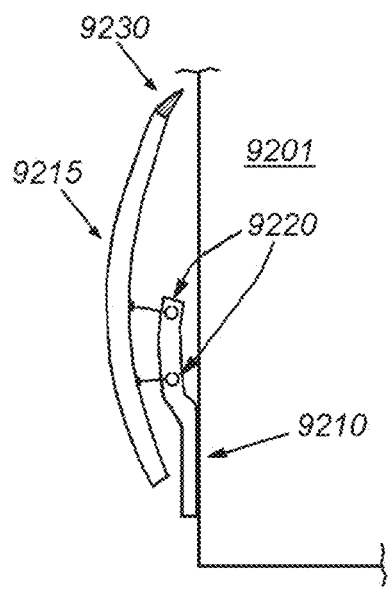
FIG. 92 is a top perspective view of a curved track assembly, showing the panel in a retracted position in accordance with the illustrative embodiment.
Figure 93:
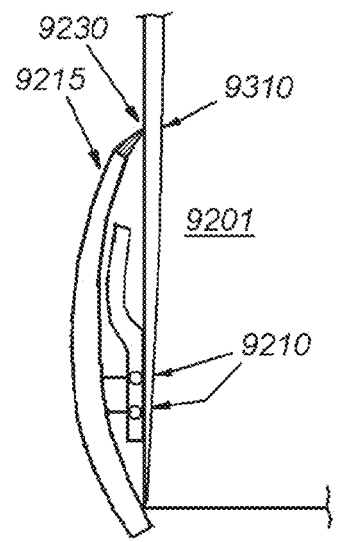
FIG. 93 is a top perspective view of the curved track assembly, showing the panel in a deployed position with the seal engaging a wall of the trailer, in accordance with the illustrative embodiments.

Reference is now made to FIGS. 92 and 93 showing, respectively, a roller and curved rolling track assembly in the retracted and deployed positions. The cargo body 9201 has a curved track 9210 secured thereon. The track is secured to an aerodynamic panel 9215 having a seal 9230 at its leading end. The curved track assembly 9210 is constructed and arranged such that a pair of rollers 9220 reside therein and allow for retraction and deployment of the panel 9215 between the refracted position shown in FIG. 92 and the deployed position shown in FIG. 93.

Leading Edge Seal

Figure 94:
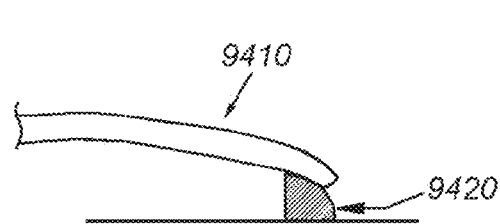
FIG. 94 is a partially cut-out top perspective view of a panel assembly including a stationary leading edge seal, showing the panel in the deployed position with the panel contacting the leading edge seal.
Figure 95:
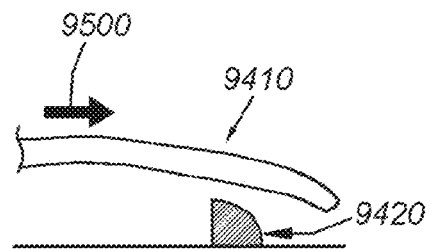
FIG. 95 is a partially cut-out perspective view of a panel assembly including a stationary leading edge seal, showing the panel in the retracted position in which the panel does not contact the leading edge seal.

Reference is now made to FIGS. 94 and 95 depicting, a partially cut-out top perspective view of a panel assembly including a stationary leading edge seal, showing the panel in the deployed position and retracted positions, respectively. In the deployed position shown in FIG. 94, the aerodynamic panel 9410 is in direct contact with the seal 9420. In the retracted position shown in FIG. 95, the panel

9410 is moved (via direction 9500) and does not contact the seal 9420. The seal 9420 comprises a deformable foam, rubber or other deformable element that is attached to a top or side of the trailer body in a position so that, when the device is deployed, it forms a seal with the leading edge of the panel (as shown, for example, in FIG. 94). When the panel moves from the deployed position, it moves independent of the deformable element and does not contact the side or top of the trailer body.

It should be clear that the various embodiments for a deployable and retractable rear aerodynamic fairing herein provides a highly effective system for reducing drag for vehicle bodies (e.g. trailers) with a variety of rear door configurations, while eliminating the undesirable obstruction posed by the fairing when placed against a loading dock. Moreover, the illustrative embodiments provide a fairing that is durable and capable of enduring impacts by off-longitudinal-axis forces without permanent damage. In addition these fairings allow for automatic deployment and retraction that can be accomplished free of operator intervention, and in a manner that ensures retraction during loading/unloading and deployment while underway. Also notably, the panels defined herein are expressly contemplated to fit within the restrictions of the legal width for a vehicle in the U.S. and various foreign jurisdictions. The novel geometry, which effectively guides air off the rear and then tapers it inwardly (for a superior aerodynamic effect), and sliding arrangement described herein enables such compliance.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, additional attachments and improvements can be made to the rear of the vehicle to further enhance the security and capabilities of the aerodynamic structure of this invention. Such enhancements can include extended bumper assemblies that project rearward beyond the folded aerodynamic assemblies, or special reflectors and/or lighting on the edges of the structure and/or spacer frame. Similarly, while not shown, any of the embodiments described herein can include flexible or rigid gaskets or other seal members that extend between the aerodynamic assembly and the trailer body to further streamline the junction therebetween. The panels can be constructed from a variety of durable materials or a combination of materials. Also any spring or powered actuators described herein are sized appropriately to provide needed biasing force to slide and maintain a given panel assembly in the selected deployed or refracted orientation. Such power can be determined by skill in the art after analyzing the expected forces acting upon a panel at expected highway speeds. Where appropriate, actuator assemblies can include (or operate in conjunction with) releasable locking devices (e.g. solenoids) that maintain the panel in the desired deployed or retracted orientation between sliding movements. Additionally, the panel assemblies can include pressure sensors that sense a sudden forward bias force and retract the panels by operating the powered actuator. Another alternative is to have a powered actuator deploy the panels from a biased state in the retracted position if that is deemed functionally superior. Accordingly, this description is meant to be taken only by way of example, and not to otherwise limit the scope of this invention.

What is claimed is:

1. An aerodynamic structure configured to reduce rear drag of a cargo body having at least one rear-facing roll door comprising:
   a panel assembly configured to be moveable separately from at least one door of the cargo body between a first position and a second position on the cargo body, the panel assembly in one of the first position or the second position configured to extend rearwardly and taper inwardly beyond a trailing edge of the cargo body, wherein the panel assembly in the other of the first position or the second position is configured not to extend substantially rearwardly nor to taper inwardly so that the roll door is accessible for loading and unloading of cargo from the cargo body;
   at least one support frame member configured to be rotatably connected to the cargo body and connected proximately to a trailing portion of at least one panel of the panel assembly to maintain an aerodynamic shape of the panel assembly when the panel assembly is in one of the first position or the second position, wherein the at least one support frame member includes an end that is operable to move away from the cargo body; and
   a spring mechanism configured to be operatively connected to the at least one support frame member and the cargo body that directs the panel assembly towards the first position such that a biasing force associated with the spring mechanism can be overcome by an overcoming force to move the panel assembly to the second position.

2. The aerodynamic structure as set forth in claim 1, wherein the second position is a retracted position, wherein the panel assembly includes a top panel having a trailing edge, and wherein in the retracted position, wherein the top panel trailing edge does not extend substantially rearwards of and is substantially parallel to the trailing edge of the cargo body.

3. An aerodynamic structure configured to reduce rear drag of a cargo body having at least one rear-facing roll door comprising:
   an elastically deformable panel assembly including panels, the elastically deformable panel assembly configured to be moveable between a first position and a second position when operatively coupled to the cargo body, the panels in one of the first position or the second position extending rearwardly and tapering inwardly beyond a trailing edge of the cargo body, wherein the panel assembly in the other of the first position or the second position is configured not to extend substantially rearwardly nor to taper inwardly so that the roll door is accessible for loading and unloading of cargo from the cargo body;
   at least one support frame member configured to be connected to the cargo body and connected at or adjacent to a trailing portion of at least one panel of the panel assembly to maintain an aerodynamic shape of the panel assembly when the panel assembly is in one of the first position or the second position, wherein the at least one support frame member includes an end that is operable to move away from the cargo body; and
   a spring mechanism configured to direct the panel assembly towards the first position such that a biasing force associated with the spring mechanism can be overcome by an overcoming force to move the panel assembly to the second position.

4. The aerodynamic structure as set forth in claim 3, wherein the second position is a retracted position, wherein the panel assembly includes a top panel having a trailing edge, and wherein in the retracted position, wherein the top panel trailing edge does not extend substantially rearwards of the trailing edge of the cargo body.

5. The aerodynamic structure as set forth in claim 3, wherein the overcoming force is applied through a powered actuator.

6. The aerodynamic structure as set forth in claim 3, wherein the powered actuator is an actuator that is operatively connected with an actuation control or connected to a speed measurement device.

7. The aerodynamic structure of claim 1, wherein the second position is a retracted position, and wherein the first position is a deployed position.

8. The aerodynamic structure of claim 3, wherein the second position is a retracted position, and wherein the first position is a deployed position.

9. The aerodynamic structure of claim 1, wherein the panel assembly includes at least three panels when deployed.

10. The aerodynamic structure of claim 1, wherein the panel assembly is configured to come into contact with an adjacent structure and the overcoming force is applied through contact between the panel assembly and the adjacent structure.

11. The aerodynamic structure of claim 1, wherein the overcoming force is applied through a powered actuator.

12. The aerodynamic structure as set forth in claim 11, wherein the powered actuator is an actuator that is operatively connected with an actuation control.

13. The aerodynamic structure as set forth in claim 11, wherein the powered actuator is an actuator that is connected to a speed measurement device that measures the speed of the cargo body, wherein the powered actuator supplies the overcoming force based on a reading from the speed measurement device.

14. The aerodynamic structure as set forth in claim 1, further comprising attachment members between adjacent panels of the panel assembly in order to control movement between the first position and the second position.

15. The aerodynamic structure as set forth in claim 1 wherein a material of at least one panel of the panel assembly is selected from the group consisting of: (a) flexible plastic, (b) rigid plastic, (c) rigid metal, and (d) fabric.

16. The aerodynamic structure as set forth in claim 1, wherein the spring mechanism is a gas spring mechanism.

17. The aerodynamic structure of claim 3, wherein the elastically deformable panel assembly includes at least three panels when deployed.

18. The aerodynamic structure of claim 3, wherein the elastically deformable panel assembly is configured to come into contact with an adjacent structure and the overcoming force is applied through contact between the elastically deformable panel assembly and the adjacent structure.

19. The aerodynamic structure as set forth in claim 3, further comprising attachment members between adjacent panels of the elastically deformable panel assembly in order to control movement between the first position and the second position.

20. The aerodynamic structure as set forth in claim 3, wherein the spring mechanism is a gas spring mechanism.

21. The aerodynamic structure as set forth in claim 5, wherein the powered actuator is an actuator that is connected to a speed measurement device that measures the speed of the cargo body, wherein the powered actuator supplies the overcoming force based on a reading from the speed measurement device.

* * * * *